US009483915B2

(12) United States Patent
Gilbertson et al.

(10) Patent No.: US 9,483,915 B2
(45) Date of Patent: Nov. 1, 2016

(54) METHODS AND SYSTEMS FOR ELECTRONIC GAMING

(71) Applicant: Bally Technologies ANZ PTY LTD, Milperra NSW (AU)

(72) Inventors: Ross M. Gilbertson, Ultimo (AU); Qin You, Randwick (AU); Andrew B. Masen, Grafton (AU)

(73) Assignee: BALLY TECHNOLOGIES ANZ PTY LTD, Milperra NSW (AU)

( * ) Notice: Subject to any disclaimer, the term of this patent is extended or adjusted under 35 U.S.C. 154(b) by 62 days.

(21) Appl. No.: 13/963,165

(22) Filed: Aug. 9, 2013

(65) Prior Publication Data

US 2013/0324217 A1 Dec. 5, 2013

Related U.S. Application Data

(63) Continuation-in-part of application No. 13/894,361, filed on May 14, 2013, which is a continuation-in-part of application No. 13/620,217, filed on Sep. 14, 2012, which is a continuation of application No. 13/042,647, filed on Mar. 8, 2011.

(30) Foreign Application Priority Data

Aug. 7, 2010 (AU) ................................ 2010903536
Aug. 8, 2010 (AU) ................................ 2010903538

(51) Int. Cl.
*A63F 13/00* (2014.01)
*G07F 17/34* (2006.01)
*G07F 17/32* (2006.01)

(52) U.S. Cl.
CPC ............... *G07F 17/34* (2013.01); *G07F 17/32* (2013.01); *G07F 17/326* (2013.01); *G07F 17/3248* (2013.01); *G07F 17/3288* (2013.01)

(58) Field of Classification Search
CPC ...... G07F 17/34; G07F 17/26; G07F 17/326; G07F 17/32
USPC ........................................ 463/18–20, 25, 31
See application file for complete search history.

(56) References Cited

U.S. PATENT DOCUMENTS 4,624,459 A 11/1986 Kaufman et al.
4,721,307 A 1/1988 Okada (Continued)

FOREIGN PATENT DOCUMENTS

AU 738363 9/2001
AU 771847 4/2004

(Continued)

OTHER PUBLICATIONS

Third-Party Submission Under 37 CFR 1.290, including a Concise Description of Relevance, submitted Aug. 19, 2013 in U.S. Appl. No. 13/620,217, 8 pages.

(Continued)

*Primary Examiner* — Ronald Laneau
*Assistant Examiner* — Ross Williams
(74) *Attorney, Agent, or Firm* — TraskBritt

(57) ABSTRACT

Methods and apparatuses for administering game play include displaying an electronic reel simulation including a multiple reel array for a wagering game on a display. A user input indicates a selected play option from a plurality of play options. All play options enable all displayed positions of the multiple reel array to be considered in winning outcomes. A game outcome is determined and presented as game symbols on the display. Winning combinations of the game symbols are determined, wherein each winning combination includes three or more matching game symbols appearing in the displayed positions on each of three or more adjacent reels and at least one of the three or more matching game symbols is not used in another winning combination. A payout is determined and multiplied by a multiple correlated to the selected play option when a substitute multiplier symbol appears as one of the game symbols.

24 Claims, 36 Drawing Sheets

(56) References Cited

U.S. PATENT DOCUMENTS

| | | | |
|---|---|---|---|
| 5,647,798 A | 7/1997 | Falciglia | |
| 5,697,843 A | 12/1997 | Manship et al. | |
| 6,004,207 A | 12/1999 | Wilson et al. | |
| 6,033,307 A | 3/2000 | Vancura et al. | |
| 6,089,977 A | 7/2000 | Bennett | |
| 6,093,102 A | 7/2000 | Bennett | |
| 6,155,925 A | 12/2000 | Giobbi et al. | |
| 6,394,902 B1 | 5/2002 | Glavich et al. | |
| 6,663,487 B1 | 12/2003 | Ladner | |
| 6,731,313 B1 | 5/2004 | Kaminkow | |
| 6,780,109 B2 | 8/2004 | Kaminkow | |
| 7,329,179 B2 | 2/2008 | Baerlocher | |
| 7,419,429 B2 | 9/2008 | Taylor | |
| 7,699,699 B2 | 4/2010 | Gilliland et al. | |
| 7,704,141 B1 * | 4/2010 | Marks et al. | 463/20 |
| 7,753,773 B2 | 7/2010 | Baerlocher et al. | |
| 7,828,648 B2 | 11/2010 | Jackson | |
| 8,147,317 B2 | 4/2012 | Plowman | |
| 8,506,380 B2 | 8/2013 | Hughes et al. | |
| 2002/0022509 A1 | 2/2002 | Nicastro et al. | |
| 2004/0048657 A1 | 3/2004 | Gauselmann | |
| 2004/0087361 A1 | 5/2004 | Parker | |
| 2004/0242313 A1 | 12/2004 | Munoz | |
| 2005/0043085 A1 | 2/2005 | Baerlocher | |
| 2005/0096121 A1 | 5/2005 | Gilliland et al. | |
| 2005/0181851 A1 | 8/2005 | Amaitis et al. | |
| 2005/0215311 A1 | 9/2005 | Hornik et al. | |
| 2006/0160613 A1 | 7/2006 | Hornik et al. | |
| 2007/0218975 A1 | 9/2007 | Iddings et al. | |
| 2007/0225060 A1 | 9/2007 | Yoshimura | |
| 2008/0081688 A1 | 4/2008 | Plowman | |
| 2008/0102923 A1 | 5/2008 | Esses et al. | |
| 2008/0132321 A1 | 6/2008 | Pau | |
| 2008/0182650 A1 * | 7/2008 | Randall et al. | 463/25 |
| 2009/0117990 A1 | 5/2009 | Englman et al. | |
| 2009/0170591 A1 | 7/2009 | Fong | |
| 2009/0197667 A1 | 8/2009 | Kim | |
| 2009/0227348 A1 | 9/2009 | Yoshizawa | |
| 2010/0124969 A1 | 5/2010 | Hughes et al. | |

FOREIGN PATENT DOCUMENTS

| | | |
|---|---|---|
| AU | 2007216694 A1 | 4/2008 |
| AU | 2007249148 A1 | 7/2008 |
| AU | 2011201004 A1 | 2/2012 |
| GB | 2335066 A | 9/1999 |
| GB | 2382911 A | 6/2003 |
| WO | 0115055 A1 | 3/2001 |
| WO | 2007130464 A2 | 11/2007 |

OTHER PUBLICATIONS

Third-Party Submission Under 37 CFR 1.290, including a Concise Description of Relevance, submitted May 7, 2014 in U.S. Appl. No. 13/620,217, 9 pages.

Australian Examiner's First Report and Search Information Statement for AU Application No. 2011201004, dated Feb. 7, 2012, 5 pages.

Statutory Declaration by Oliver Crispino regarding Opposition in AU 2011201004 and Exhibit OC-1, dated Aug. 1, 2014, 6 pages.

Statutory Declaration by Benjamin James Ellis regarding Opposition in AU 2011201004 and Exhibits BJE-1 to BJE-8, dated Aug. 6, 2014, 313 pages.

Australian Examiner's First Report for AU Application No. 2011101675, dated Feb. 7, 2012, 2 pages.

Australian Examiner's First Report Response for AU Application No. 2011101675, dated Jul. 27, 2012, 2 pages.

Australian Re-Exam Report for AU Application No. 2011101675, dated May 27, 2014, 6 pages.

Australian Re-Exam Report Response for AU Application No. 2011101675, dated Jul. 28, 2014, 6 pages.

Australian Re-Exam Report for AU Application No. 2011101675, dated Sep. 30, 2014, 4 pages.

Australian Re-Exam Report Response for AU Application No. 2011101675, dated Nov. 28, 2014, 8 pages.

Australian Re-Exam Report for AU Application No. 2011101675, dated Jan. 15, 2015, 2 pages.

Statutory Declaration by Benjamin James Ellis regarding Opposition in AU 2011201004 and Exhibit BJE-9, dated Jan. 12, 2015, 21 pages.

Statutory Declaration by Keiran Daley regarding Opposition in AU 2011201004 and Exhibits KD1, KD2, KD4, and KD6-12, dated Nov. 7, 2014, 115 pages.

Patent Oppositions—Decision Issued for AU Application No. 2011101675, dated Oct. 26, 2015, 16 pages.

Patent Oppositions—Decision Issued for AU Application No. 2011201004, dated Dec. 24, 2015, 22 pages.

Claim Amendments in Australian Patent Application No. 2011201004 and Opposition, Nov. 2014, 33 pages.

Cover Letter from Nick Mountford to the Commissioner of Patents, dated Aug. 6, 2014, regarding Australian Patent Application No. 2011201004 and Opposition, 1 page.

* cited by examiner

FIGURE 5A
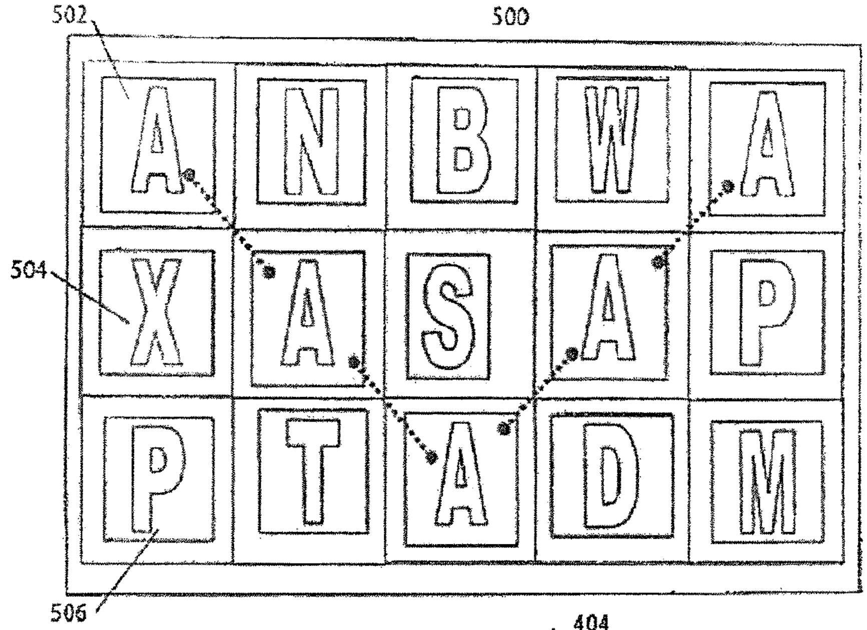
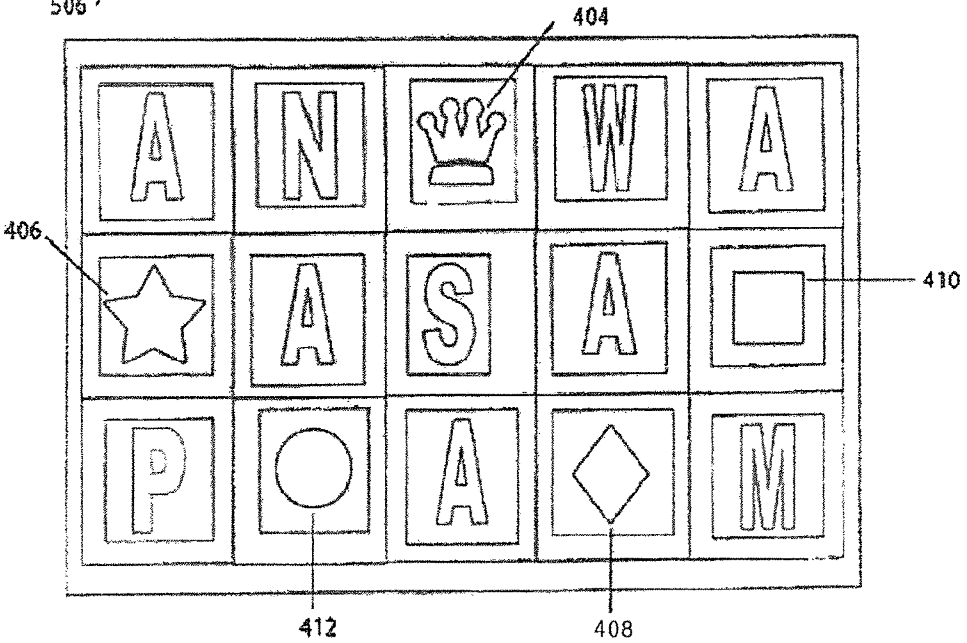
FIGURE 5B

FIGURE 7

| | | Prize |
|---|---|---|
| [A] | 5 of a kind | 80 credits |
| | 4 of a kind | 20 credits |
| | 3 of a kind | 5 credits |
| [K] | 5 of a kind | 80 credits |
| | 4 of a kind | 20 credits |
| | 3 of a kind | 5 credits |
| [Q] | 5 of a kind | 80 credits |
| | 4 of a kind | 20 credits |
| | 3 of a kind | 5 credits |
| [J] | 5 of a kind | 80 credits |
| | 4 of a kind | 20 credits |
| | 3 of a kind | 5 credits |
| [10] | 5 of a kind | 80 credits |
| | 4 of a kind | 20 credits |
| | 3 of a kind | 5 credits |

TABLE 7.1

| 1st PLAY | | | | |
|---|---|---|---|---|
| 1st PLAY OPTION | 2nd PLAY OPTION | 3rd PLAY OPTION | 4th PLAY OPTION | 5th PLAY OPTION |
| [10] | [10]+[J] | [10]+[J]+[Q] | [10]+[J]+[Q]+[K] | [10]+[J]+[Q]+[K]+[A] |
| [1 credit] | [5 credits] | [15 credit] | [30 credit] | [60 credits] |

TABLE 7.2

| | | Prize | Increased prize |
|---|---|---|---|
| [A] | 5 of a kind | 80 credits | 10000 credits |
| | 4 of a kind | 20 credits | 1000 credits |
| | 3 of a kind | 5 credits | 200 credits |
| [K] | 5 of a kind | 80 credits | 1500 credits |
| | 4 of a kind | 20 credits | 300 credits |
| | 3 of a kind | 5 credits | 20 credits |
| [Q] | 5 of a kind | 80 credits | 500 credits |
| | 4 of a kind | 20 credits | 100 credits |
| | 3 of a kind | 5 credits | 5 credits |
| [J] | 5 of a kind | 80 credits | 200 credits |
| | 4 of a kind | 20 credits | 50 credits |
| | 3 of a kind | 5 credits | 10 credits |
| [10] | 5 of a kind | 80 credits | 100 credits |
| | 4 of a kind | 20 credits | 40 credits |
| | 3 of a kind | 5 credits | 10 credits |

TABLE 7.3

GAME RULES

SELECT THE NUMBER OF CREDITS TO BET PER PLAY AND THEN
CHOOSE THE NUMBER OF GOLD SYMBOLS YOU WISH TO PLAY TO START GAME.
ALL WINS LEFT TO RIGHT ONLY EXCEPT SCATTERS WHICH PAY ANY.
ALL WINS ON LINES ONLY EXCEPT SCATTERS.
ALL 25 LINES ARE ACTIVATED DURING GAME.
SCATTER WINS ARE ADDED TO LINE WINS.
HIGHEST WIN ONLY ON EACH LINES.
WINS ON DIFFERENT LINES ARE ADDED.
ALL WINS EXCEPT SCATTERS MULTIPLIED BY THE TOTAL CREDITS BET PER PLAY.
SCATTER WINS ARE MULTIPLIED BY THE TOTAL CREDITS BET.
ALL WINS SHOWN IN CREDITS.
GAMBLE OPTION (WHERE AVAILABLE) MAY BE EXERCISED BY THE PLAYER AFTER ALL WINS.
GAMBLE AMOUNT IS DOUBLE (2X) IF RED/BLACK SELECTION IS CORRECT.
GAMBLE AMOUNT IS QUADRUPLED (4X) IF SUIT SELECTION IS CORRECT.
MAXIMUM OF 5 GAMBLE ATTEMPTS. THE REST OF THE GAMBLE OPTION WILL NOT EXCEED $10,000.
MAXIMUM WIN PER GAME IS $10,000.
MALFUNCTION VOIDS ALL PAYS AND PLAYS.

FIGURE 8

FIGURE 17
FREE GAMES
FREE GAMES ARE TRIGGERED BY 3 OR MORE SCATTERED
FREE GAMES AWARDED DEPENDS ON THE NUMBER OF GOLD SYMBOLS PLAYED AS SHOWN BELOW.
DURING THE FREE GAMES IF ONE OR MORE SUBSTITUTES IN A WIN, THE PAY FOR THAT WIN IS DOUBLED.
IF ONE OR MORE SUBSTITUTES IN A SCATTERED WIN, THE PAY FOR THAT WIN IS DOUBLED.
IF ONE OR MORE SUBSTITUTES IN A OR WIN, THEN THE PAY FOR THAT WIN IS TRIPLED.
3
4
5
2 FREE GAMES
3 FREE GAMES
5 FREE GAMES
6 FREE GAMES
7 FREE GAMES
3 FREE GAMES
5 FREE GAMES
7 FREE GAMES
9 FREE GAMES
12 FREE GAMES
25 FREE GAMES
25 FREE GAMES
25 FREE GAMES
25 FREE GAMES
25 FREE GAMES
DURING THE FREE GAMES A, K, Q AND J DO NOT APPEAR.
THE FREE GAMES CAN BE TRIGGERED AGAIN DURING THE FREE GAMES.
THE CREDITS PER PLAY AND THE NUMBER OF GOLD SYMBOLS CHOSEN ARE THE SAME AS THE GAME THAT TRIGGERED THE FREE GAMES.

FIG. 24
FU BAT JACKPOT FEATURE
THE NUMBER OF GOLD SYMBOLS PLAYED DETERMINES
ELIGIBILITY FOR PROGRESSIVE JACKPOT WINS.
GOLD SYMBOLS PLAYED
JACKPOTS AVAILABLE
PLAY 1
NONE
PLAY 2
MINI
PLAY 3
MINI
MINOR
PLAY 4
MINI
MINOR
MAJOR
PLAY 5
MINI
MINOR
MAJOR
GRAND
SYMBOLS REPRESENTING THE AVAILABLE JACKPOTS ARE DISPLAYED AT THE TOP RIGHT CORNER.
WHEN A APPEARS THE PLAYER MAY BE AWARDED AN AVAILABLE JACKPOT.
IF MORE THAN ONE JACKPOT IS AVAILABLE THEN THE JACKPOT AWARDED IS DETERMINED
BY THE GOLD COIN FEATURE. IF THE PRIZE VALUES DISPLAYED ON
THE OVERHEAD JACKPOT SIGNAGE ARE DIFFERENT TO THOSE
DISPLAYED ON THE GAMING MACHINE, PAYOUTS WILL BE BASED ON
THE OVERHEAD JACKPOT SIGNAGE (WHERE APPLICABLE).

*FIG. 31*
FREE GAMES
8 FREE GAMES ARE TRIGGERED
BY 3 OR MORE SCATTERED LEFT TO RIGHT.
A, K, Q, J, 10 AND 9 DO NOT APPEAR DURING THE FREE GAMES.
DURING THE FREE GAMES MORE MAY APPEAR.
THE CREDITS BET PER PLAY AND THE NUMBER OF GOLD SYMBOLS CHOSEN ARE THE SAME AS
THE GAME THAT TRIGGERED THE FREE GAMES.
FREE GAMES CAN BE TRIGGERED AGAIN DURING THE FREE GAMES.

METHODS AND SYSTEMS FOR ELECTRONIC GAMING

CROSS-REFERENCE TO RELATED APPLICATIONS

This application is a continuation-in-part of U.S. patent application Ser. No. 13/894,361, filed May 14, 2013, pending, which is a continuation-in-part of U.S. patent application Ser. No. 13/620,217, filed Sep. 14, 2012, pending, which is a continuation of U.S. patent application Ser. No. 13/042,647, filed Mar. 8, 2011, pending, which claims priority to Australian Provisional Patent Application No. 2010903538, filed Aug. 8, 2010 and Australian Provisional Patent Application No. 2010903536, filed Aug. 7, 2010, the disclosure of each of which is hereby incorporated herein in its entirety by this reference.

TECHNICAL FIELD

This invention relates to wagering games and bonusing systems for electronic gaming machines.

BACKGROUND

The following discussion of the background art is intended to facilitate an understanding of the present invention only. It should be appreciated that the discussion is not an acknowledgement or admission that any of the material referred to was part of the common general knowledge as of the priority date of the application.

Players who regularly play gaming machines tire of particular games as the entertainment factor or winning opportunities reduce or become staid. Therefore, it has become necessary for manufacturers of these machines to develop innovative games that differ from previous types of games and have variety and bonuses in the form of features or jackpot awards that add interest to the games. In so doing, it is hoped to keep players entertained and, therefore, interested in continuing to play the game, as well as attract new players to the game.

With the growth that has occurred in the gaming machine market, there is intense competition between manufacturers to supply gaming machines to venues that provide for the playing of these machines. When selecting a supplier of gaming machines, the operator of a venue will usually pay close attention to the popularity of various games played by their patrons. Therefore, gaming machine manufacturers are continually devising new games and/or bonuses that are popular with players in order to improve sales, retain customers and attract new customers.

One form of gaming machine that has proven to be particularly popular over the years has been the spinning reel machine. These types of machines have now evolved into displaying a number of simulated, or "virtual," reels displayed on video display systems having various symbols displayed at prescribed locations on the reels. Each reel has a prescribed number of positions that correspond to positions in an array whereby the position and sequence in the array may be represented by a symbol bearing some distinctive value in a sequence of symbols in paylines or generally distributed on the display screen of the same or predefined type.

The individual reels are simulated to rotate during a play, and stop in a position that may be required to be positioned relative to a predefined pattern within the video display to show one or more rows of symbols, paylines or random distributions from adjacent reels or the totality of reels in a window or in a virtual display. In this manner, the reels are usually aligned to form a regular matrix of rows and columns of symbols that are displayed to the player for analysis of winning or losing events by the player or a processor associated with the electronic gaming machine (EGM).

A common window configuration is a matrix of three rows and five columns, but other combinations are also known. By virtue of adopting a regular matrix, it has become common to adopt one or more paylines that are defined across the matrix and can be displayed in the window. For example, the center row, the top row, the bottom row, (all horizontal) and possibly one or more meander lines (e.g., non-straight or zig-zag lines). A payline identifies the particular combination of positions at which symbols are located within the matrix, extending logically across the columns and through rows, that is considered for determining whether the outcome is a winning outcome, or whether a bonus win or trigger symbol occurrence arises from a play or not. Random distributions of particular symbols ("scatter pays") may also be used to provide winning outcomes, bonus triggers and bonus wins. These scatter pay events do not necessarily require the symbols to be adjacent or in any predefined order, but merely appear in sufficient number on the display screen.

In order to increase betting opportunities available to the player, some games have been developed that adopt up to 40 or more paylines. In these and other arrangements, non-straight paylines and scatter pays are also known. Typically, most gaming machines provide for selection of up to 25 paylines.

The player may select (by wagering or purchasing) one or more paylines per game. The paylines are normally automatically selected by a processor in a fixed sequence. For example, if the player selects one payline, this will normally be the central horizontal line. Similarly, selecting two paylines will activate the center payline and the top horizontal payline. The player may also select the amount wagered per line. A payline is active if the player has wagered sufficient amounts of credits or value so that a sufficient amount activates paylines to include a particular payline or specifically selected individual paylines or groups of paylines. Paylines that are not active are inactive.

Most gaming machines are designed so that the player has the highest probability of winning and/or triggering a bonus award or event when the maximum number of paylines is selected. This, however, means that the player has to wager a comparatively large amount for each play, compared to the minimum amount that may be wagered for a play of the machine. Volatility is related to the size of the bonus or pays awarded relative to the frequency of winning. Having bonuses or pays awarded less often for comparatively large amounts is known as high volatility, whereas bonuses or pays being awarded more often for comparatively small amounts is known as low volatility.

Typically, bonuses are triggered when a bonus trigger symbol occurrence (e.g., a specific symbol or multiple specific symbols) is generated by a processor and the specific symbol or multiple specific symbols are displayed in the window. Alternatively, a bonus trigger event may be entirely random and not associated with the symbols displayed in the window at all (e.g., a particular quantum of play is reached on the machine, or an accumulating jackpot threshold is reached, unbeknown to the player). Bonuses or bonus events may be triggered by animations, or the combination of animations and a bonus symbol or symbols appearing on the display.

Symbols on a reel are generally divided up between standard symbols and other special symbols, such as bonus symbols or symbols with enhanced payouts or that have other functions. The relative mix and number of bonus symbols to standard symbols appearing on a reel and across reels, and their placement on the reels, provide a prescribed bonusing scheme for the game. When this bonusing scheme is combined with the paytable adopted for a particular game, it also provides a particular volatile character or feel to the game, which is conveyed to the player.

Multiple line games, as well as for providing an easy means of delivering linearity (i.e., ensuring that the probability of winning is maintained proportional to the credits bet per play), also allow the player to choose the particular level of volatility they desire. This provides greater utility for the one game appealing to players who prefer different levels of volatility by choosing the number of paylines they wish to play with.

Some games are designed without defined paylines. In such games, it is common practice to allow players to choose their volatility (and play cost) by rendering certain positions in the matrix inactive and unable to take part in winning combinations. Hence reducing win size and/or frequency.

Games are precisely designed mathematically to provide a prescribed bonusing scheme in combination with a paytable that achieves a return to player requirement that complies with gaming regulations mandated for a particular jurisdiction. Consequently, it is a constant challenge for gaming machine manufacturers to come up with new games that appeal to players that may satisfy their variable need for volatility and provide an entertainment experience.

Accordingly, gaming machine manufacturers are continually designing new and innovative combinations of games and bonusing schemes that have more appeal to players than others in order to add to the sales appeal of a particular gaming machine.

SUMMARY

Embodiments of the present disclosure include a computer implemented method of administering game play. The method includes displaying an electronic reel simulation of a wagering game on a game display, the electronic reel simulation including a multiple reel array. A user input is accepted indicating a selected play option from a plurality of play options, wherein all play options of the plurality enable all displayed positions of the multiple reel array to be considered in winning outcomes. A game outcome is determined and presented on the game display, the game outcome comprising a plurality of game symbols for the displayed positions of the multiple reel array. One or more winning combinations of the game symbols are determined. Each winning combination includes three or more matching game symbols appearing in the displayed positions on each of three or more adjacent reels and at least one of the three or more matching game symbols is not used in another winning combination. A payout is determined responsive to the one or more winning combinations and an appearance of a substitute multiplier symbol as one of the plurality of game symbols, wherein the substitute multiplier symbol includes a multiplier correlated to the selected play option and the payout is multiplied by the multiplier.

Embodiments of the present disclosure also include an electronic gaming machine, which includes a player input device, a game display, and a processor operably coupled to the player input device and the game display. The processor is configured to execute computing instructions to cause the electronic gaming machine to display an electronic reel simulation of a wagering game on the game display, the electronic reel simulation including a multiple reel array. The processor also causes the electronic game machine to accept a user input indicating a selected play option from a plurality of play options, wherein all play options enable all displayed positions of the multiple reel array to be considered in winning outcomes. The processor also causes the electronic game machine to determine a game outcome and causes the game outcome to be presented on the game display, the game outcome comprising a plurality of game symbols for the displayed positions of the multiple reel array. The processor also causes the electronic game machine to determine one or more winning combinations of the game symbols. Each winning combination includes three or more matching game symbols appearing in the displayed positions on each of three or more adjacent reels and at least one of the three or more matching game symbols is not used in another winning combination. The processor also causes the electronic game machine to determine a payout responsive to the one or more winning combinations, wherein the payout is multiplied by a multiple correlated to the selected play option when a substitute multiplier symbol is displayed as one of the plurality of game symbols.

Further embodiments of the present disclosure include a computer implemented method of administering game play. The method includes providing a plurality of play options on at least one of a player display and a player input device, each play option having a corresponding set of possible bonus prizes associated therewith. An indication of a selected play option of the plurality of play options is received from the player input device. The method also includes determining a game outcome comprising a plurality of game symbols for displayed positions of a multiple reel array. The method also includes determining a payout responsive to one or more winning combinations of the plurality of game symbols, wherein the payout is multiplied by a multiple correlated to the selected play option when a substitute multiplier symbol appears at a displayed position. The method also includes triggering a bonus event responsive to a wild symbol appearing at another displayed position.

Still further embodiments of the present disclosure include an electronic gaming machine, which includes a player input device, a game display, and a processor operably coupled to the player input device and the game display. The processor is configured to execute computing instructions to cause the electronic gaming machine to provide a plurality of play options on at least one of the game display and the player input device, each play option having a corresponding set of possible bonus prizes associated therewith. The processor also causes the electronic game machine to receive an indication of a selected play option indicating a player election from the player input device to elect a play option of the plurality of play options. The processor also causes the electronic game machine to determine a game outcome comprising a plurality of game symbols for displayed positions of a multiple reel array. The processor also causes the electronic game machine to determine a payout responsive to one or more winning combinations, of the plurality of game symbols wherein the payout is multiplied by a multiple correlated to the selected play option when a substitute multiplier symbol appears at a displayed position. The processor also causes the electronic game machine to trigger a bonus event responsive to a wild symbol appearing at another displayed position.

BRIEF DESCRIPTION OF THE DRAWINGS

The invention is described with reference to the following drawings of different specific embodiments of a mode for carrying out the invention, wherein:

FIGS. 5A and 5B illustrate the window display of an EGM showing a matrix format of symbols selected from an array for play, wherein FIG. 5A shows only standard symbols displayed, and FIG. 5B shows a combination of both standard and bonus symbols;

FIG. 7 is a series of tables illustrative of a game in accordance with a first embodiment of the mode for carrying out the invention;

FIG. 8 shows game rules for playing a game in accordance with a second embodiment of the mode;

FIGS. 18A to 18C show a window with the same arrangement of symbols displayed as a result of a play with different active symbols selected for the bonus symbols used in the game of the third embodiment, wherein:

FIG. 18A shows the window with only a base special symbol activated;

FIG. 18B shows the window with only the base and next level special symbol activated; and FIG. 18C shows the window with all of the special symbols activated;

DETAILED DESCRIPTION

Figure 1:
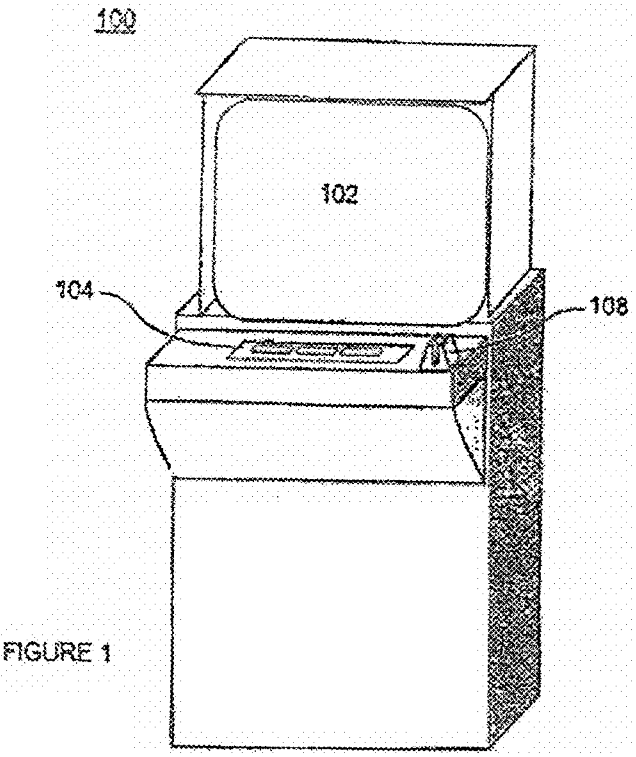
FIG. 1 is a diagram illustrative of an electronic gaming machine (EGM)

In the following detailed description, reference is made to the accompanying drawings which form a part hereof, and in which is shown by way of illustration specific embodiments in which the invention may be practiced. These embodiments are described in sufficient detail to enable those of ordinary skill in the art to practice the invention. It should be understood, however, that the detailed description and the specific examples, while indicating examples of embodiments of the invention, are given by way of illustration only and not by way of limitation. From this disclosure, various substitutions, modifications, additions rearrangements, or combinations thereof within the scope of the present invention may be made and will become apparent to those of ordinary skill in the art.

In accordance with common practice the various features illustrated in the drawings may not be drawn to scale. The illustrations presented herein are not meant to be actual views of any particular method, device, or system, but are merely idealized representations that are employed to describe various embodiments of the present invention. Accordingly, the dimensions of the various features may be arbitrarily expanded or reduced for clarity. In addition, some of the drawings may be simplified for clarity. Thus, the drawings may not depict all of the components of a given apparatus (e.g., device) or method. In addition, like reference numerals may be used to denote like features throughout the specification and figures.

Those of ordinary skill would appreciate that the various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments described herein.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Headings are included herein to aid in locating certain sections of detailed description. These headings should not be considered to limit the scope of the concepts described under any specific heading. Furthermore, concepts described in any specific heading are generally applicable in other sections throughout the entire specification.

A mode for carrying out embodiments described herein will be described with reference to an electronic gaming machine (EGM) being programmed and configured to implement one or more different wagering games. Several specific embodiments of games designed in accordance with the embodiments will be subsequently described as part of the mode.

Embodiments of the present disclosure are applicable, although not exclusively, to electronic gaming machines that have one or more bonus symbols included with other symbols in an array of symbols that are to be displayed on a video screen and, where prescribed, sets of these symbols are randomly selected from the array and displayed in a matrix as a result of a play.

As shown in FIG. 1, an EGM 100 includes a display means in the form of a display screen 102, player input buttons 104, and credit (or currency) input 108. The EGM 100 is configured so that when a player has entered sufficient credits from the credit input 108, the player is permitted to select play options, and/or a game from a menu of games using the player input via buttons 104 or touch screen buttons (not shown) displayed on the screen 102, if the EGM 100 is designed to play one of multiple games such as games that can be downloaded. Alternatively, the EGM 100 invokes a routine for playing all or part of a prescribed game automatically.

In the presently described mode, once a particular game is invoked, the EGM 100 is specifically configured so that the player can then select one of a number of different play options and credits per play that are provided as part of the game, using the player input buttons 104.

Figure 2:
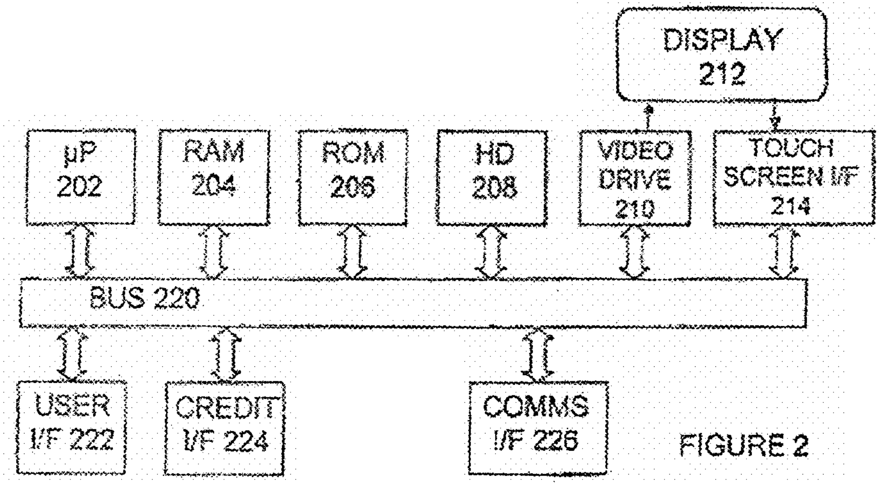
FIG. 2 is a functional block schematic diagram of functional elements of an EGM.

As shown in FIG. 2, the EGM includes a control means in the form of a processor 202 shown for illustrative purposes as connected via bus 220 to a plurality of functional elements. The EGM includes a display 212 with associated video driver 210 and touch screen interface 214, various storage devices such as RAM 204, ROM 206 and hard drive 208, and/or EPROMS (not shown), a user interface 222, credit interface 224, and communication interface 226. The EGM can be a stand-alone machine, or it can be connected to a network via the communication interface 226, to enable the machine to participate in multi-game jackpots to communicate game data to back-end data analysis systems, or both. In addition, the EGM may be programmed via the communication interface 226 from a central control and management processor, so that, for example, new games can be programmed and downloaded into the EGM.

In the presently described mode, the EGM produces a reel display that comprises a different reel design or reel activity depending upon which particular play option is invoked by the selection of a player as previously described. In other modes, the EGM may impose a limitation on the activity of frames, spaces or symbols within a fixed array by means other than a reel. Each reel has a plurality of symbols L associated with it, the symbols being elements of an array that comprises all of the symbols associated with all of the reels. In this manner, each reel represents a subdivision of the array, so that the array is notionally divided into discrete sub-arrays, each sub-array comprising the symbols associated with a corresponding reel. The relative position of the symbols L on the reel during a play of a game is notionally or logically fixed, so the player sees a portion of each reel formatted in the form of a matrix. The matrix appears in a window displaying a number of rows in which a sequence of symbols virtually scrolls down the column in which the reel is displayed during a play. The symbols of the reel can thus be defined in terms of the particular reel and the corresponding sub-array of specific symbols associated with it, and the placement of a symbol in the sequence of symbols comprising the sub-array.

In some embodiments, there may be different sized windows for one or more reels. In such a case, a rectangular matrix or array is not formed but the game will still work in the same way.

As previously described, each play option has a predetermined design and mix of symbols associated with it, which are stored in the memory of the EGM for subsequent loading to fill the array with symbols corresponding to the particular reel design associated with the selected play option.

Figure 3:
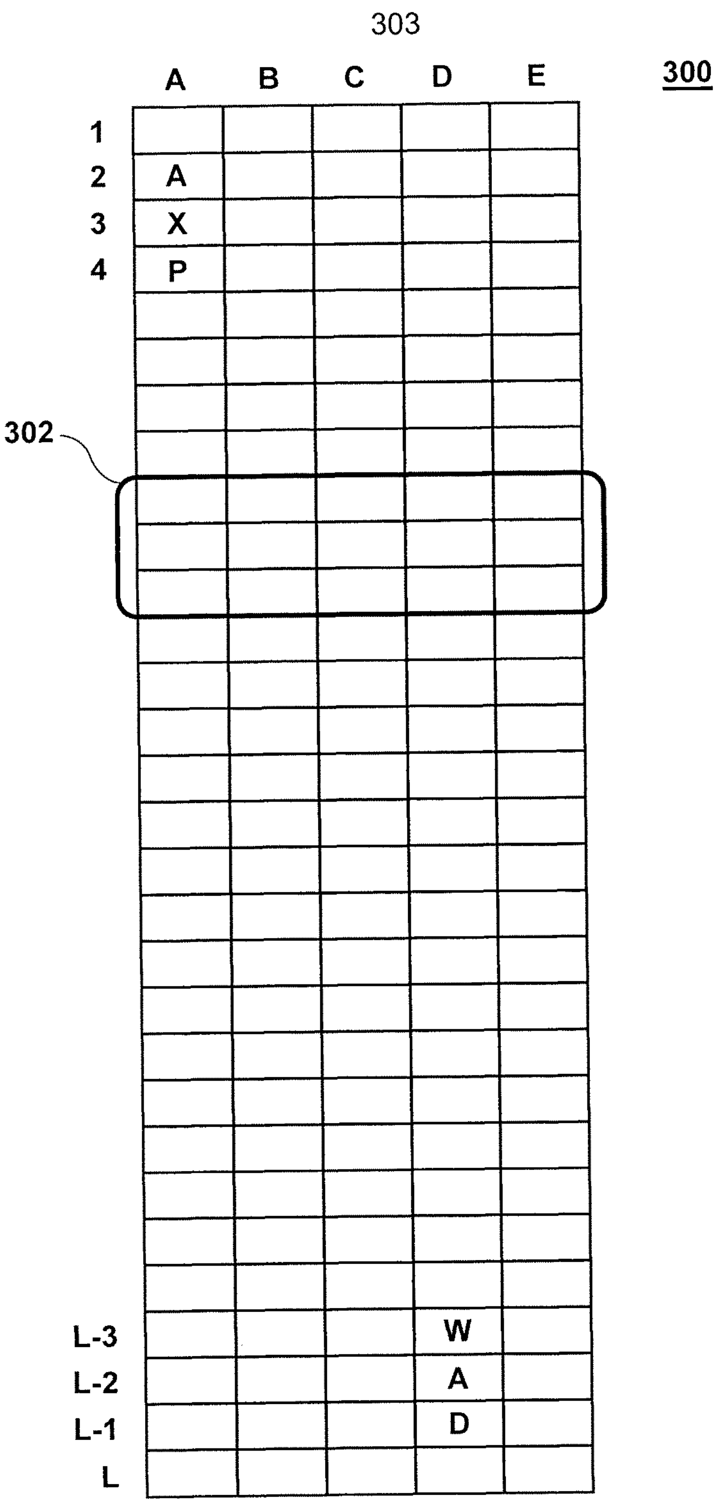
FIG. 3 represents a five-reel array.

As shown in FIG. 3, the matrix of symbols displayed, as provided by a five-reel array 300, has reels A, B, C, D, and E, each reel having L symbols. The symbols are displayed in a repeating sequence, so that 1 follows L (or, alternatively, L follows 1) in a loop until the reel stops. The symbols are divided into game-specific standard symbols and bonus symbols logically filling fixed positions in the array 300 in a prescribed manner.

A window 302 spanning three rows and the five columns is shown to indicate a pay window on the screen. Thus, a symbol can be represented by the column identifier (A, B, etc.) and the row number, where one symbol is notionally assigned as the start symbol 1. An image of a symbol is displayed by action of the processor and signals sent to the display means, and the images and/or combinations of images on a payline are allocated different values and provide different winning opportunities depending upon the occurrence in prescribed combinations as determined by a paytable prescribed for the wagering game played on the EGM. When the EGM is programmed, the program thus includes the parameters of each symbol, including the reel, the symbol position, and the image details (the symbol type).

The probability of a particular symbol being displayed on a reel or a virtual reel is determined by the number of that type of symbol in a reel divided by the total number of symbols in the reel (L), in the absence of mathematical weighting of the symbols, as is known in the art. In one embodiment, no mathematical weighting is applied to the individual symbols other than their natural frequency of occurrence from within the total number of available symbols. Thus, where there is only one of a particular symbol in a reel, its probability of appearing in a specific position, such as the centerline of the window, is 1 /L. In other embodiments, certain symbols may be weighted such that the probability of appearance is altered.

In playing a game, the program uses a pseudo-random number generator to determine which symbols will be displayed in the window 302 for each reel by selecting a number between 1 and L for each reel to appear, for example, on the centerline 303. Thus, a particular symbol and its neighboring symbols (each symbol typically being independently selected randomly or pseudo-randomly) will appear in the window 302 where three horizontal lines are displayed. It will be understood that in different embodiments of the invention, and indeed in different play options associated with the same game of each embodiment, the reels A, B, C, D and E may be of the same or different lengths and that the lengths of each reel are independent of one another. That is, there is no requirement that the reel lengths be equal, multiples of each other, or have any other dependency on one another, between the different play options. Accordingly, the probability of a particular symbol appearing in a specific position in the window 302 is dependent on the number of that particular symbol contained on that particular reel and the length of that reel.

As shown in FIG. 3, three consecutive symbols A, X, and P are shown in reel A at positions 2, 3, and 4, and a further three consecutive symbols W, A, and D are shown in reel D at positions L-3, L-2, and L-1. FIG. 3 illustrates the position of the reels at the beginning of a selected play option for a particular game. For the sake of explanation, row 1 is shown at the top of the matrix. In practice, the symbol corresponding to row 1 will be in a position determined by the result of the previous game.

FIG. 5A shows a window 500 after a game spin of the selected play option. During the playing of the game, the symbol A3 (FIG. 3), which is shown as the letter X (504), is randomly chosen as the symbol to be displayed on the middle line of the window 500, so the symbol A2 (the letter A 502) and the symbol A4 (letter P 506) are shown in the first column in the window 500 on either side of the X. Similarly, for reel D, the symbol A corresponding to the position L-2 in FIG. 3 has been randomly selected to be displayed on the center row of the window 500.

Also shown in FIG. 5A are five A symbols, one on each reel. The five A symbols are located on the fourth payline, which is illustrated by the dotted lines. In such a scenario, this will result in the awarding of a payout in accordance with the paytable of the gaming machine corresponding to this particular play outcome.

In the present mode, the symbols designed for inclusion in a particular reel design of a play option comprise both standard symbols and bonus symbols. Standard symbols have a relatively low value and, optionally, pay lower returns for specific combinations appearing on a payline than do bonus symbols.

Figure 4:
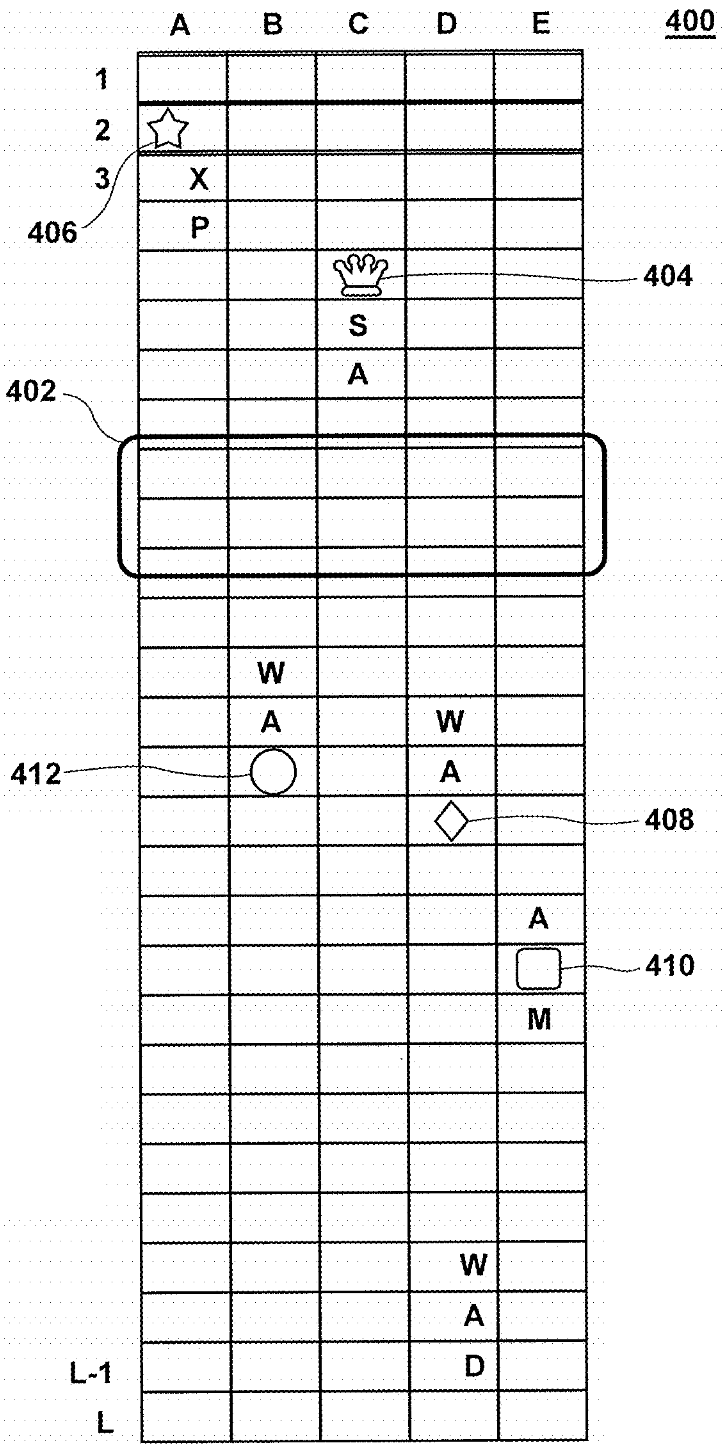
FIG. 4 shows a reel arrangement with the addition of a number of bonus trigger symbols.

FIG. 4 shows a reel arrangement 400 and window 402 similar to that of FIG. 3 with the addition of a number of bonus symbols 404, 406, 408, 410, 412 to standard symbols W, X, A, P, D, M, S, etc., as described with respect to FIGS. 3 and 5A. The particular mix and number of bonus symbols to standard symbols and their order appearing in the reel positions of a particular play option is predetermined by the various game designs and when the individual game is selected. The particular mix of game-specific standard symbols and number of bonus symbols is provided for filling the array to be invoked by the game program in response to the selection of the particular play option by the player. The bonus symbols are shown as crowns 404, stars 406, diamonds 408, squares 410 and circles 412, but other symbols can be used, such as iconic characters or symbols in keeping with the theme of the game.

The bonus symbols are graded, ranked or given a hierarchy in terms of their bonus value. For example, a crown is valued higher than a star, which, in turn, is valued higher than a diamond, which, in turn, is valued higher than a square, which, in turn, is valued higher than a circle.

Depending upon the game, some bonus symbols can also be enhanced to be of higher value than in their base state. For example, the enhancement may be a color, such as gold. So, in their base state, the bonus symbols may be of one or more flat colors, but in their enhanced state, they may be gold in color. For example, one of the bonus symbols could be a green turtle and the corresponding enhanced symbol may be a gold turtle of the same design, except for the color. In terms of game design, these enhanced symbols logically constitute additional bonus symbols but follow a theme in terms of their selection between an enhanced and unenhanced state, according to the particular play option selected. In this manner, the same theme can be maintained between different play options to provide the player with the experience that they are playing the same game, regardless of the particular game option selected, but, in reality, involves a different bonusing scheme (and thus player experience between the play options) that arises from effectively playing a different game in each play option.

In an alternative embodiment, there might be more that two states for some symbols, for example, a standard, silver, gold, and platinum version of a symbol, each level superior to the last.

To achieve this dynamic effect between the play options, certain symbols may be included in some reels but not in others, or in different numbers, or in different mixes of bonus and standard, depending upon the particular play option involved. For example, in one particular play option, the crown may not be included in reel A or E, or may be included in reduced number, but may be included in the other reels in greater numbers, whereas the other symbols may be included in all reels. In another play option, the crown may be included in relatively greater numbers in reels A or E, and fewer numbers in other reels. In specific embodiments of the game described later, the enhanced bonus symbols are selectively included in particular reels according to the particular play option that is selected, and not included in others, and are also graduated in bonus value. In this manner, the enhanced symbols provide increased returns as a proportion of the amount bet as a player moves through the different play options in order to balance against progressively decreasing returns of standard and unenhanced symbols in the event that the bonusing scheme is maintained relatively constant between the play options, as a consequence of adopting the same paytable.

Superior symbols, (i.e., enhanced value symbols) are of greater value than their counterparts. This greater value may be achieved by a better paytable, being a substitute, being able to trigger a bonus feature, having an increased chance of forming a winning combination (e.g., no longer required to be left to right), apply a multiplier, and/or some other method.

By including such flexibility in the different design of reels between different play options, the game designer is provided with more variables to design a game within prescribed parameters of return-to-player (RTP), hit rate, and bonusing scheme for a common paytable, while seeking to achieve the elusive goal of the game being fun to play.

In the presently described mode, there are five play options available. In other modes, different numbers of play options may be used.

In this mode, there is a correspondence between the number of play options and the number of bonus symbols available. Furthermore, there is a correspondence between the number of bonus symbols that are enhanced and the number of the play option. For example, if the first play option is chosen, then there is one enhanced bonus symbol that is activated. If the second play option is chosen, then there are two enhanced bonus symbols activated, and so on, until in the fifth play option, all five enhanced bonus symbols are activated.

In addition, in keeping with the theme of the games that embody the described mode for carrying out the invention, the grading in value of the bonus symbols corresponds with the particular play option chosen. For example, having regard to the set of symbols referred to above, the circle is the lowest graded bonus symbol, and will be enhanced for the first play option. The square is the next graded bonus symbol and will be enhanced in the second play option, and so on. In some embodiments, the enhanced and non-enhanced versions of the same symbol may form winning combinations. In that case, a "mixed" paytable would be provided. In some embodiments, when a symbol appears in an enhanced state, it does not appear in the unenhanced state in that play option.

Furthermore, once a bonus symbol is enhanced in a particular play option, it is retained in an enhanced state for all higher play options. In this manner, the enhanced bonus symbols accumulate with increasing the number of the play option, and the number of unenhanced symbols decrease with each increasing play option.

In this arrangement, logically, the lowest valued bonus symbol, e.g., the circle, will always be in an enhanced state.

The logic of the aforementioned rules of the game is implemented by way of a computer program that is effected by the processor 202. This is conveniently illustrated in the flow and state diagrams shown in FIGS. 6A and 6B and the process structure diagram in FIG. 6C.

Correlating the flowcharts to the example above, reference to gold symbols corresponds to enhancement of a bonus symbol. The symbol types will be as follows: A=circle; B=square; C=diamond; D=star; and E=crown.

Figure 6A:
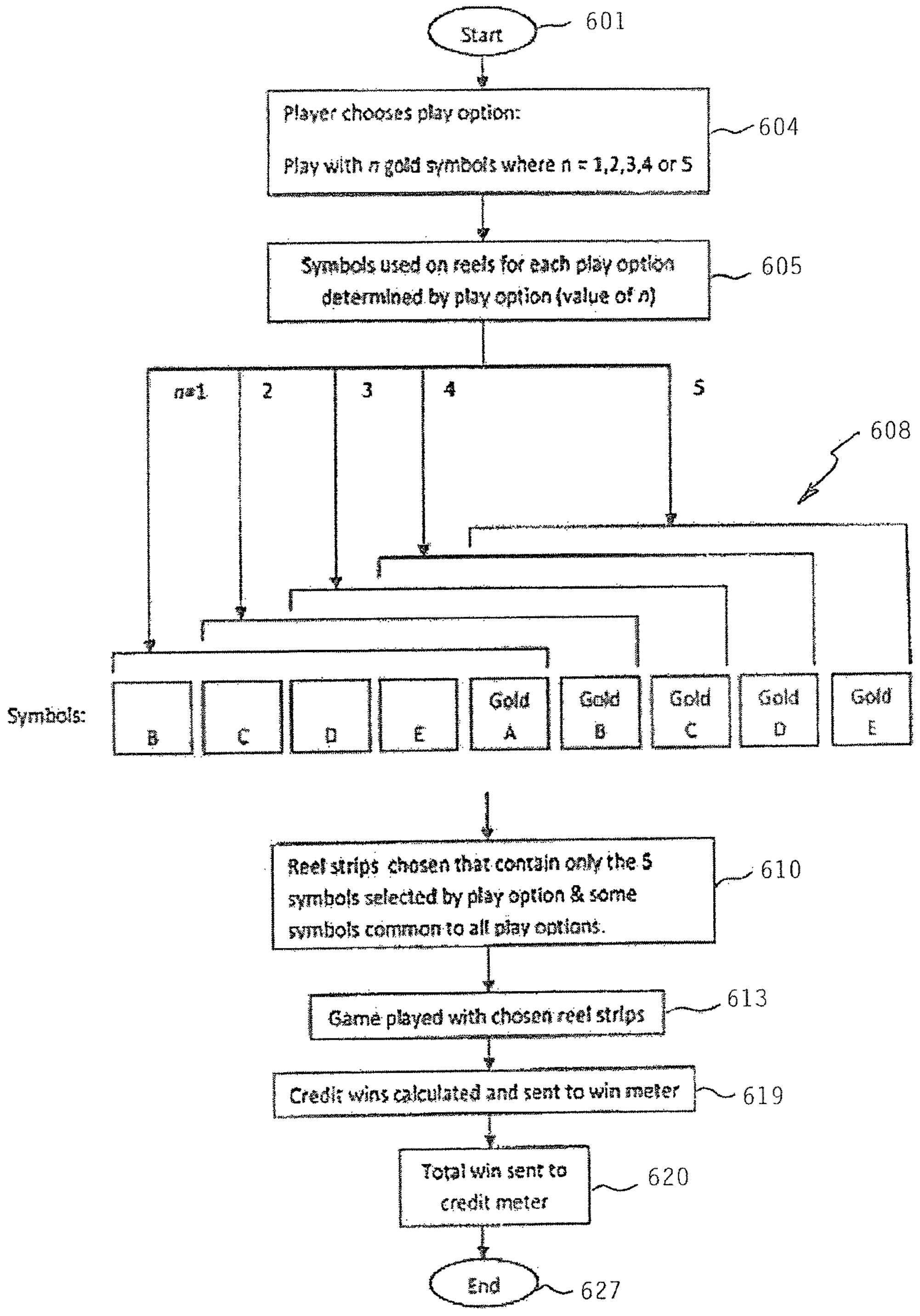
FIG. 6A is a flow diagram showing an overall program flow common to each of the specific embodiments of the mode for carrying out the invention.
Figure 6B:
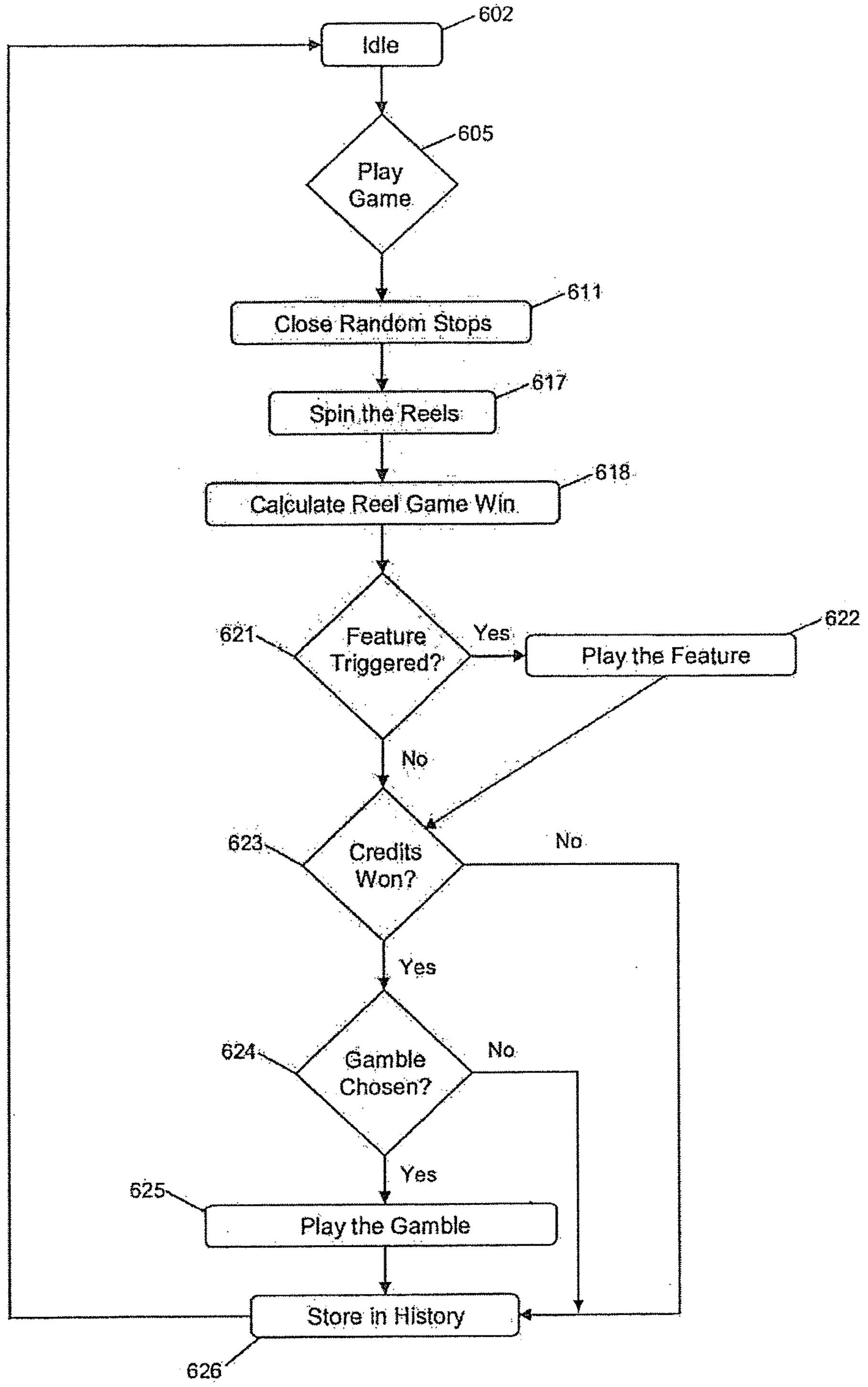
FIG. 6B is a flow diagram showing various states of software in synthesizing a program flow.
Figure 6C:
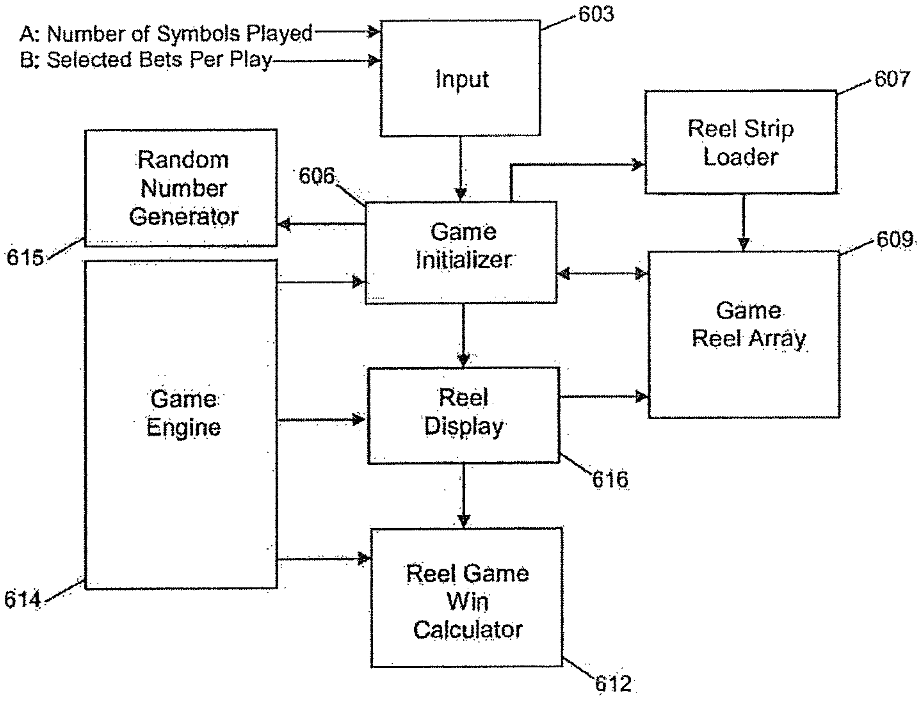
FIG. 6C is a block diagram showing a process structure of a control means.

As shown in FIGS. 6A and 6B, the program starts at 601 in an idle state 602, where in FIG. 6C, an input process 603 waits to receive two principal inputs A and B from the player, namely the number of gold symbols that are to be played A, and the number of credits to be bet per play B. In one embodiment, the player selects a multiplier that is applied to the credits associated with the selected play option. The number of gold symbols corresponds to the particular play option to be selected, where different play options provide for different numbers of gold symbols to be played in a game.

In one embodiment, different credit multiplier choices within a play option will result in different placement of symbols on the reels to vary the volatility of the game.

The player then at 604 chooses the particular play option they wish to play, which corresponds to a game designed to include n number of gold symbols. As indicated at 605, this selection determines the prescribed mix of symbols to be used on the reels, corresponding to the play option n chosen. The steps 604 and 605 then invoke a play game state, when both input parameters A and B are selected. In process terms, a game initializer process 606 is activated by the input process 603, which, in turn, invokes a reel strip loader 607 to load the reel symbols corresponding to the particular play option selected from a table of symbol lists 608, stored in memory, into a game reel array 609.

The process is shown at step 610, whereby the particular reel strips of symbols selected will contain the five bonus symbols in either an enhanced (gold) or unenhanced state, depending upon the play option involved and the standard symbols common to all play options. In some embodiments, one bonus symbol only appears in an enhanced state for all play options.

The process is performed as part of a random stops state 611, which automatically selects the maximum number of paylines that are available for a play, e.g., 25, and the play cost, which is determined by accessing a table of costs (not shown) using the number of enhanced or gold symbols played n as an index. For example:

1 gold symbol played→gold symbol play cost=1
2 gold symbols played→gold symbol play cost=5
3 gold symbols played→gold symbol play cost=15
4 gold symbols played→gold symbol play cost=30
5 gold symbols played→gold symbol play cost=60

The total credits bet calculation in the reel game win calculator process 612 is then set up according to the formula:

Total credits bet=gold symbol play cost×multiplier per play

The credit meter (not shown) is decremented by the total credits bet and the reel strips determined by accessing the table of reel strip lists 608 using the number of gold symbols n again as an index. For example:

1 gold symbol played→reel strips containing 1 gold symbol 2 gold symbols played→reel strips containing 2 gold symbols 3 gold symbols played→reel strips containing 3 gold symbols 4 gold symbols played→reel strips containing 4 gold symbols 5 gold symbols played→reel strips containing 5 gold symbols The game is played at 613 by a game engine process 614 invoking a random number generator 615 to randomly choose reel stops from the particular reel strip selected by the game initializer 603 and display the reel symbols using a reel display process 616.

This involves invoking a spin the reels state 617, where the reel strips of the previous game are spun off the display (e.g.,—removed) and the current reel strips are spun onto the display (e.g.,—added).

A calculate reel game win state 618 is then invoked at step 619 using the reel game win calculator 612. This process involves determining the paylines by using the reels stops within the reel strips and calculating line wins from each line. Scatter wins are also calculated from the reel stops within the reel strips and total wins are summed and are sent to the credit meter at 620.

A feature triggered state 621 is invoked to test for the existence of a trigger condition after each play, and if a trigger condition exists, then a play the feature state 622 is invoked. In either case, a credits won state 623 is invoked to test to see if any credits have been won.

Optionally, a gamble state 624 may be invoked, and if the player chooses to gamble on the winnings of the play, a play the gamble state 625 is then invoked. For example, the amount of winnings can be doubled for guessing the displayed color (black or red) or the total winnings lost if the non-displayed color is selected.

Ultimately, the state play that has proceeded is stored in a history table by invoking a store in history state 626, and the process ended at 627.

The state flow is then returned to the idle state 602 ready to repeat again for the next play.

From a game design perspective, in the present mode, the reels for each of the play options are designed having regard to a number of key parameters. As an example, these could be:

1) The RTP for each play option needs to be within a prescribed range. For example, by regulation, the variation in RTP across all play options must be no more than 0.2%. In other jurisdictions where regulations require minimum returns, a minimum value would be a key parameter.

2) The hit rate for each play option needs to be approximately the same, although not necessarily identical, within each play option. For example, a non-limiting example of a hit rate is one that would occur approximately every 2 or 3 plays.

3) The distribution and types of wins are determined in order to provide optimum player excitement and entertainment. This is achieved by providing the maximum number of paylines to trigger wins, different bonusing schemes for each of the play options (i.e., the number and mix of standard to bonus symbols appearing on the different reels and between different play options), and varying the number of free games or spins awarded in features between the different game options.

Given these parameters, the game designer is provided with a reasonable amount of scope to design a game that has appeal to a variety of different types of players, and provide excitement and entertainment.

The first specific embodiment of a game designed for carrying out the mode of the invention is described with respect to the table shown in FIG. 7 and uses symbols corresponding to common playing cards with a standard 3×5 matrix with five spinning reels.

In this embodiment, the following bonus symbols make up the reels:

[A], [K], [Q], [J], [10]

and the game uses a typical left-to-right payline rule, with prizes awarded according to the paytable shown in Table 7.1.

A traditional set of 25 paylines are used and are fixedly activated automatically for each play.

Significantly, instead of the player selecting the number of lines to play to start the game, one of five play options is selected. These five play options, or betting options, are shown diagrammatically in Table 7.2.

In this setup, each successive bet option "activates" prescribed bonus symbols to their enhanced state. The game then provides increased prizes when the enhanced bonus symbols occur in a win. The increased prizes that apply in the present game are shown in the paytable in Table 7.3.

Thus, when playing the first play option, combinations of [10] will be paid according to the increased pay column in Table 7.3. For the second play option, both [10] and [J] will pay the increased prize, and so on, until the fifth play option is selected, where all combinations of [A], [K], [Q], [J], [10] will pay the increased prizes.

For effect, the bonus symbols would appear on the reels in an enhanced state once activated, but in other embodiments, this need not be the case. In either case, an indicator screen is included (e.g., in the top right-hand corner of the game screen) that indicates to the player which play or bet option is in play. For example, the indicator screen may include check boxes against the bonus symbols, and be illuminated for those bonus symbols that are in an enhanced state, e.g.:

□[A] □[K] ■[Q] ■[J] ■[10]

would indicate that the third play option has been selected with the [Q], [J], [10] bonus symbols activated to function in their enhanced state.

In addition, the game will have the same "credit options" as are usual for most other kinds of spinning reel games. However, instead of the concept of "credits bet per line," which applies to a line-selective-based game, the present arrangement would connote a concept of "credits bet per play," where the number of credits bet would be automatically extended across all paylines in operation.

An example of this implementation is shown below:

| | | | | |
|---|---|---|---|---|
| 1 credit x play option | 2 credits x play option | 5 credits x play option | 10 credits x play option | 20 credits x play option |

So if, for instance, the 2 credits bet per play option was selected with the fifth play option selected (i.e., costing 60 credits), then this would cost the player 120 credits per play.

The second embodiment of a game designed for carrying out the mode of the invention is illustrated in FIGS. 8 to 12.

In this embodiment, a Chinese theme is adopted. The program for this game follows the same format as shown in FIGS. 6A through 6C and adopts the same concepts as described for the game in the first embodiment.

Figure 9:
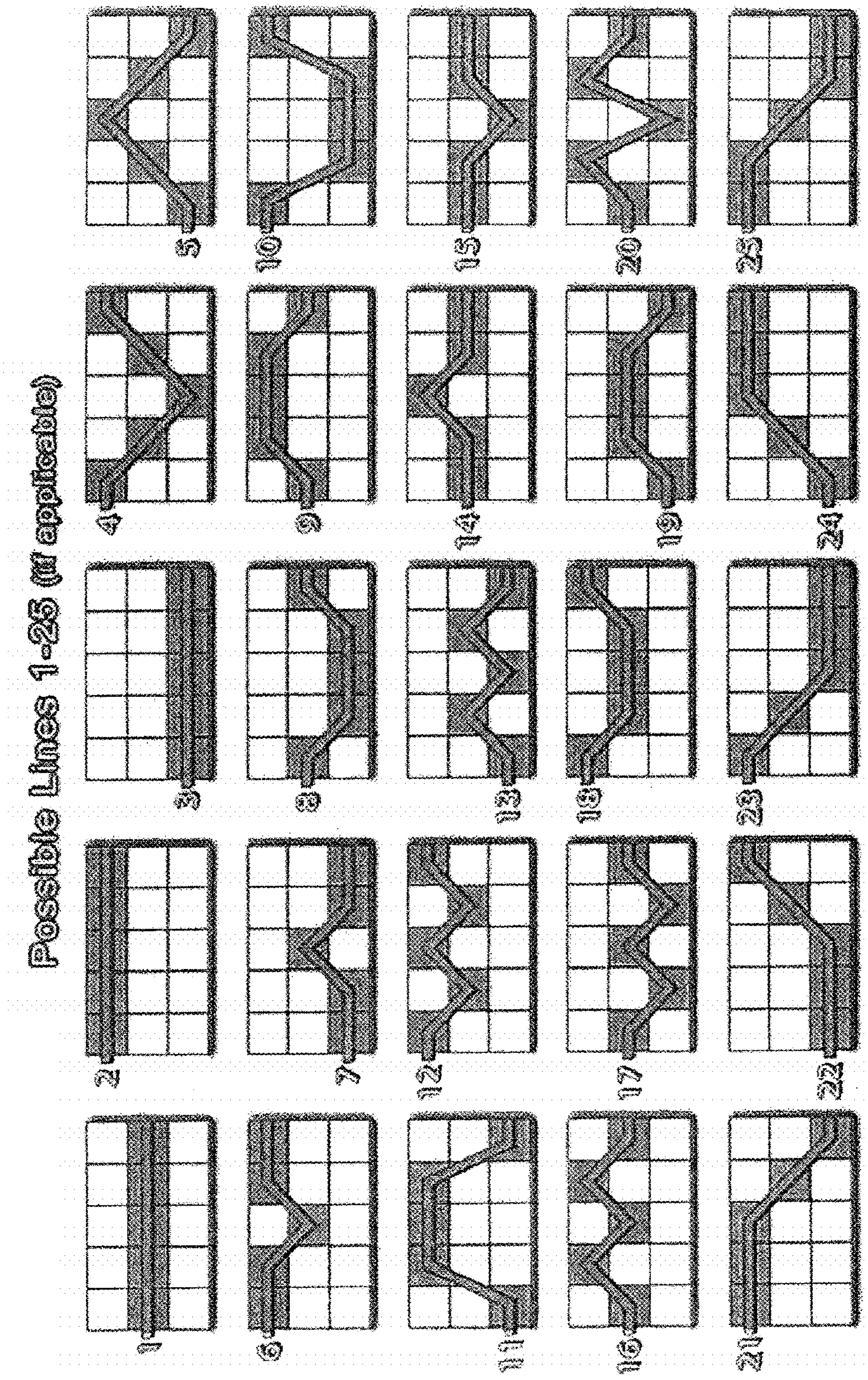
FIG. 9 shows paylines that are applied in the game of the second embodiment.

The specific game rules are shown in FIG. 8 and the paylines that are fixed for each play are shown in FIG. 9.

Figure 10:
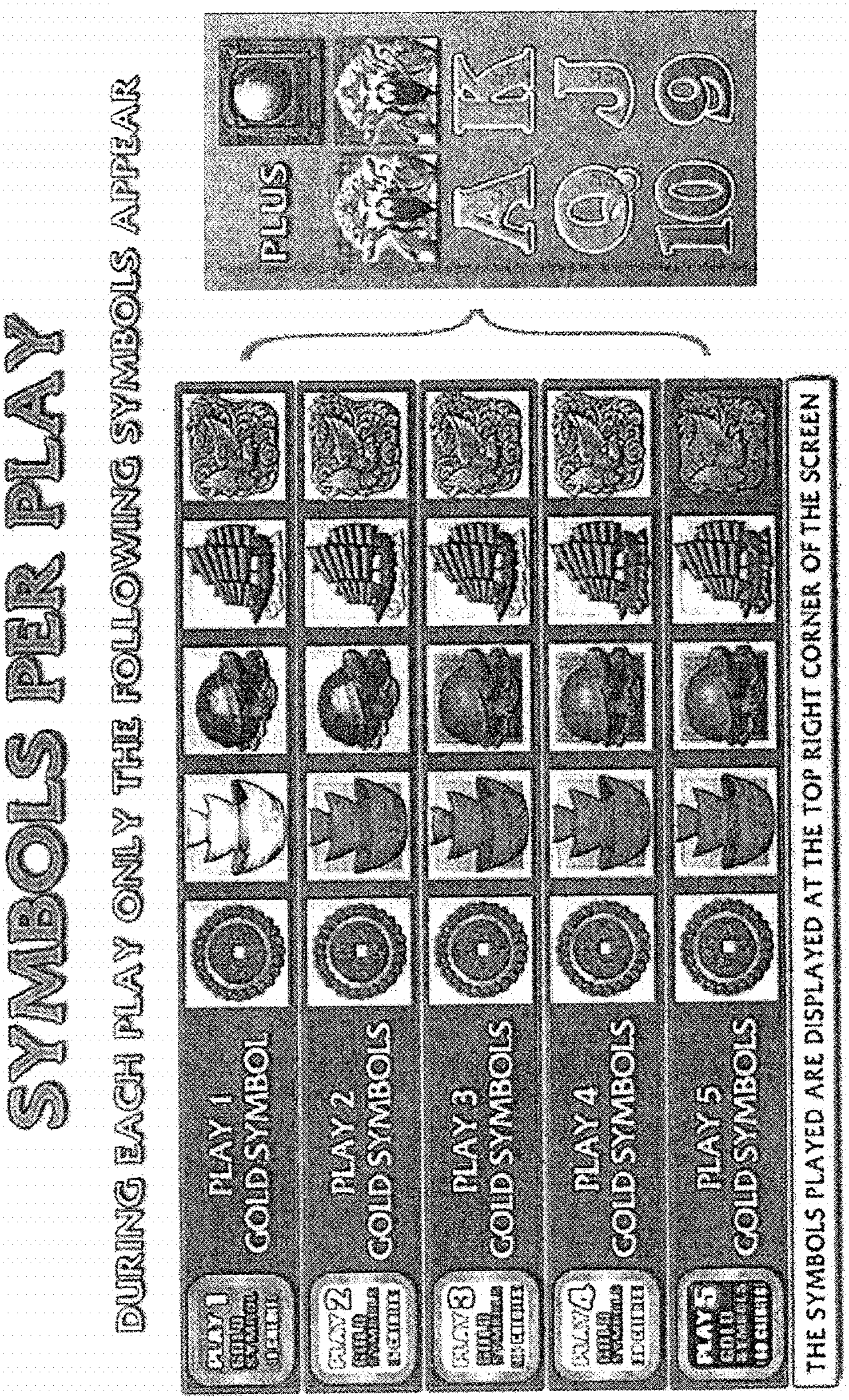
FIG. 10 shows standard and bonus symbols that are used in the game of the second embodiment.
Figure 11:
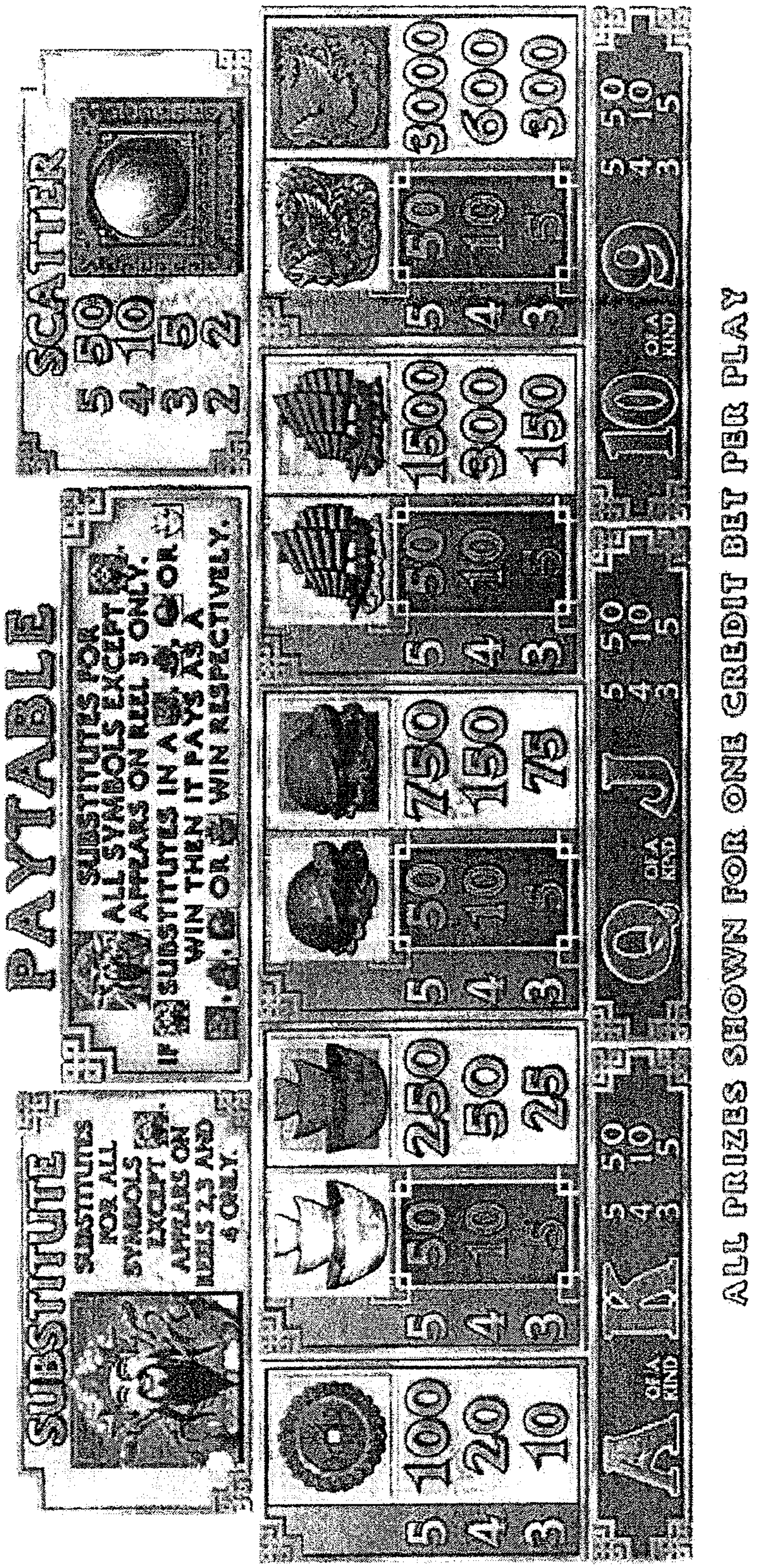
FIG. 11 shows a paytable applicable for each play option corresponding to the bonus symbols available for play in the game of the second embodiment.

As shown in FIGS. 10 and 11, the symbols comprise: five Chinese icons as the bonus symbols, the qualifier "gold" as the enhancement of these symbols, and the top six playing cards as standard symbols in addition to the bonus symbols. In addition, a special bonus symbol is included to function as a substitute symbol, which is also able to be enhanced, and a scatter symbol is provided. In one example, a Chinese male character is the special bonus symbol.

Scatters and substitutes are common gaming machine concepts for bonusing, and add to the character and appeal of the game.

In the present embodiment, as shown in the paytable in FIG. 11, the special bonus symbol in a base state appears only on reels 2, 3 and 4, and, in its enhanced state, appears only on reel 3. Significantly, as a consequence of providing enhanced bonus symbols, when the substitute special bonus symbol appears in its enhanced state with a prescribed combination of bonus symbols in their base state on a payline, the prize amount will be elevated by the program to the equivalent of that applying to the bonus symbols, as if they were in their enhanced state.

Figure 12:
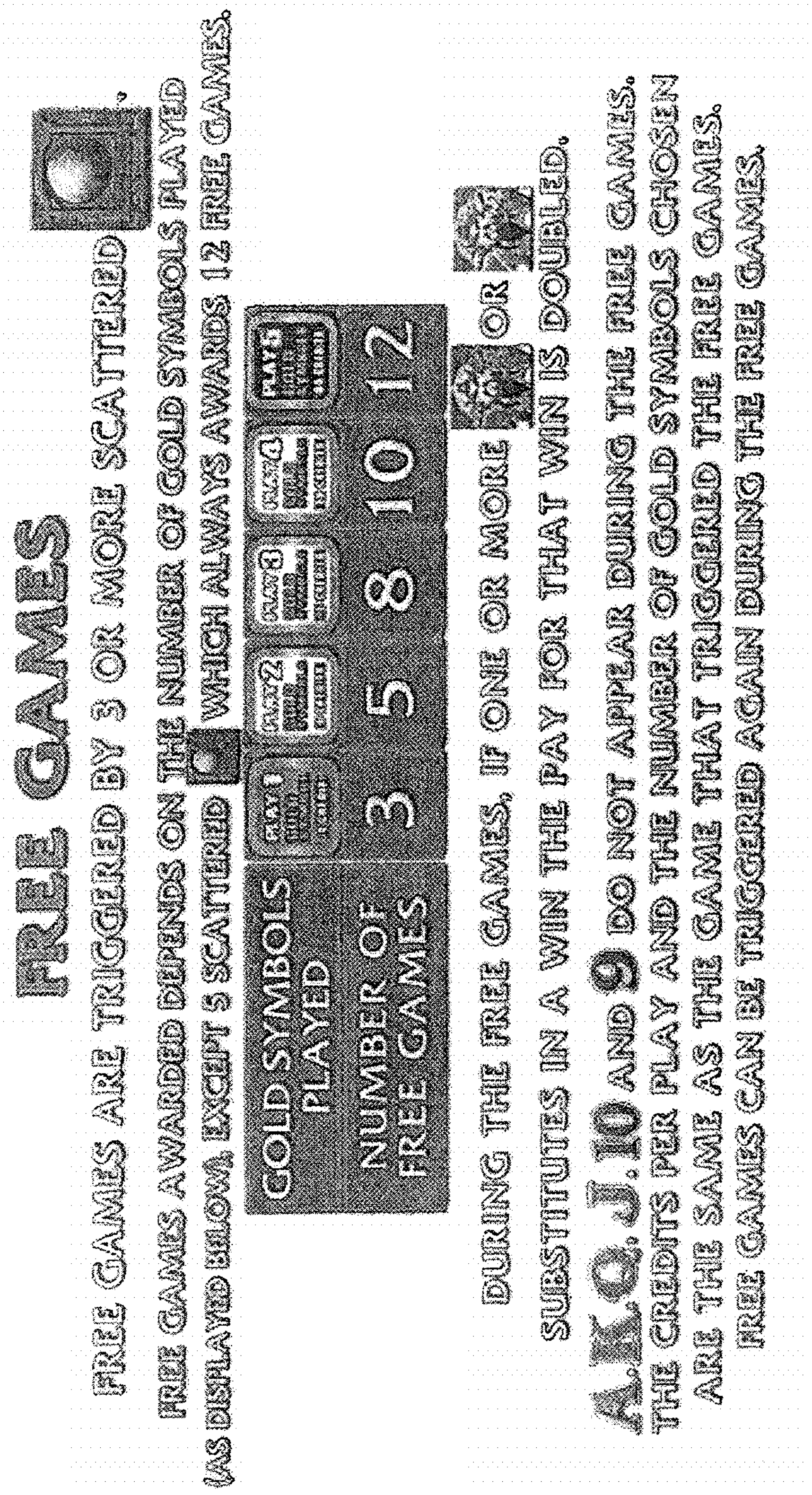
FIG. 12 shows free games rules that are applied in the game of the second embodiment.

FIG. 12 shows the rules applying to the provision of free games, which are triggered by a prescribed number of scatter symbols appearing in the matrix and which are graded in magnitude according to the number of enhanced bonus symbols in play. As previously described, the number of enhanced bonus symbols corresponds to the particular play option selected.

The third embodiment of a game designed for carrying out the mode of the invention is illustrated in FIGS. 13 to 20.

Figure 14:
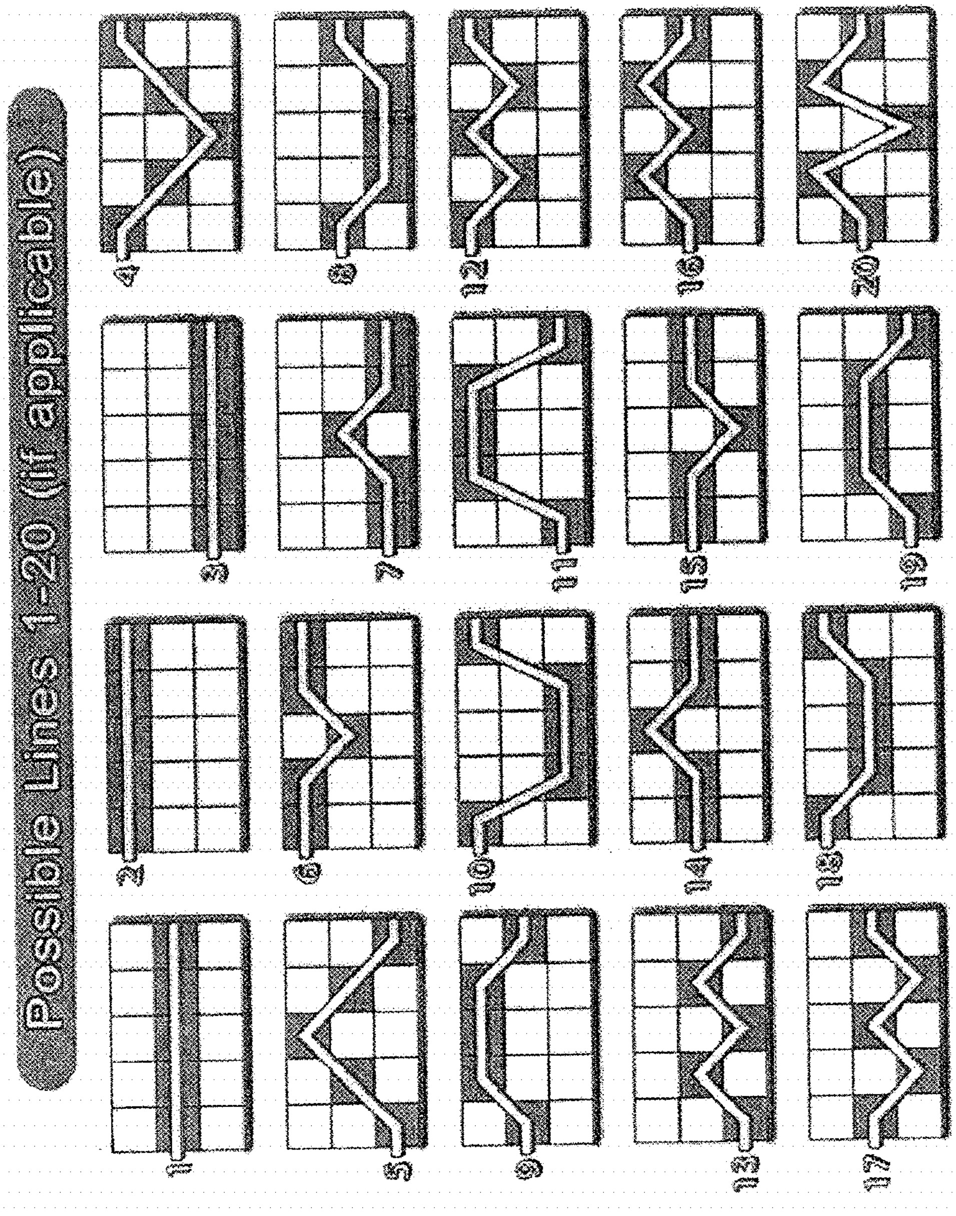
FIG. 14 shows paylines that are applied in the game of the third embodiment.

This game, for all intents and purposes, is substantially similar to that described in the preceding embodiment, except that it: has an "Australiana" theme, reduces the number of paylines to 20 as shown in FIG. 14, consolidates the function of the special bonus symbol with that of a bonus symbol, and provides for a feature or jackpot award in response to a particular bonus triggering system.

Figure 13:
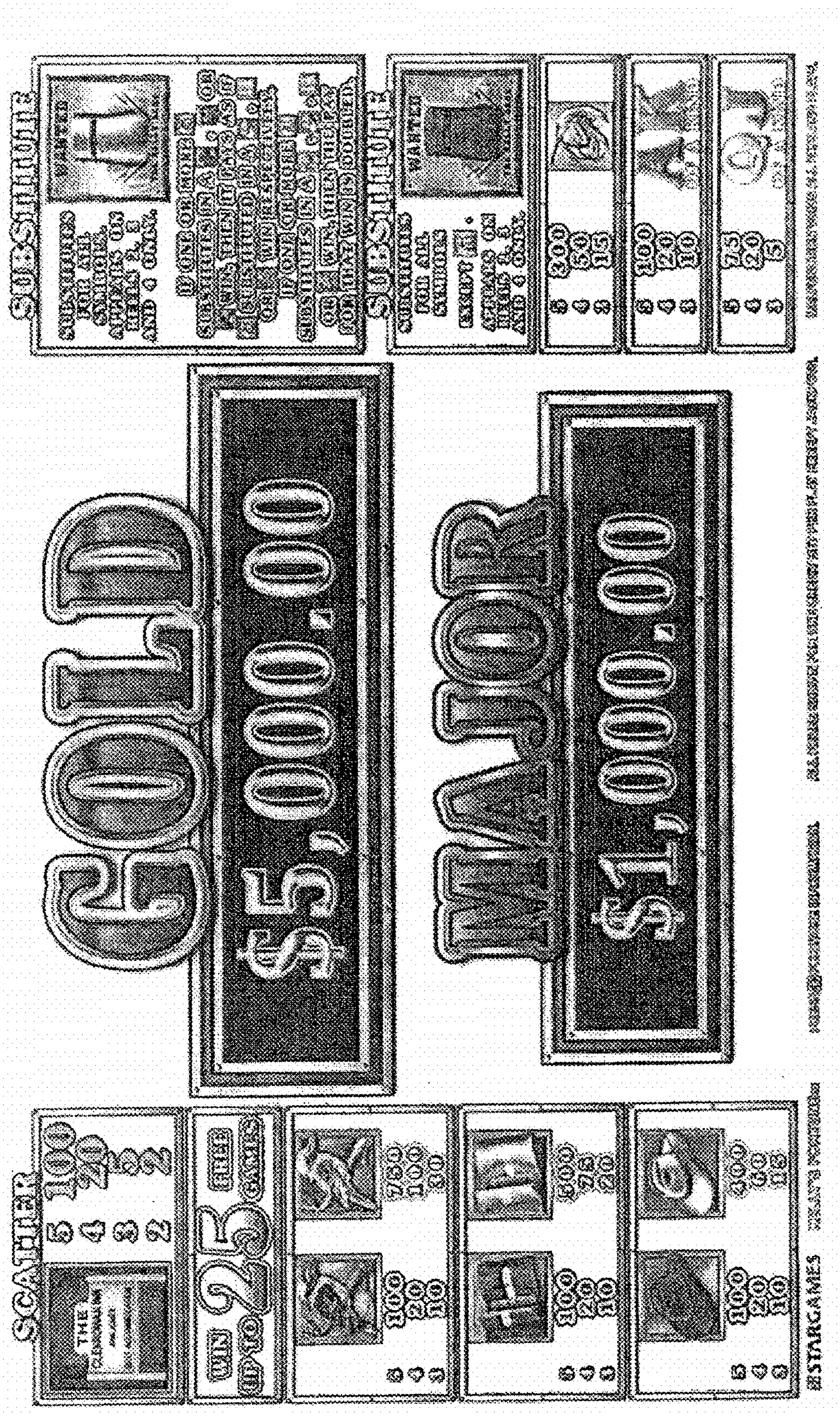
FIG. 13 shows a top box used for a game in accordance with a third embodiment of the mode.
Figure 15:
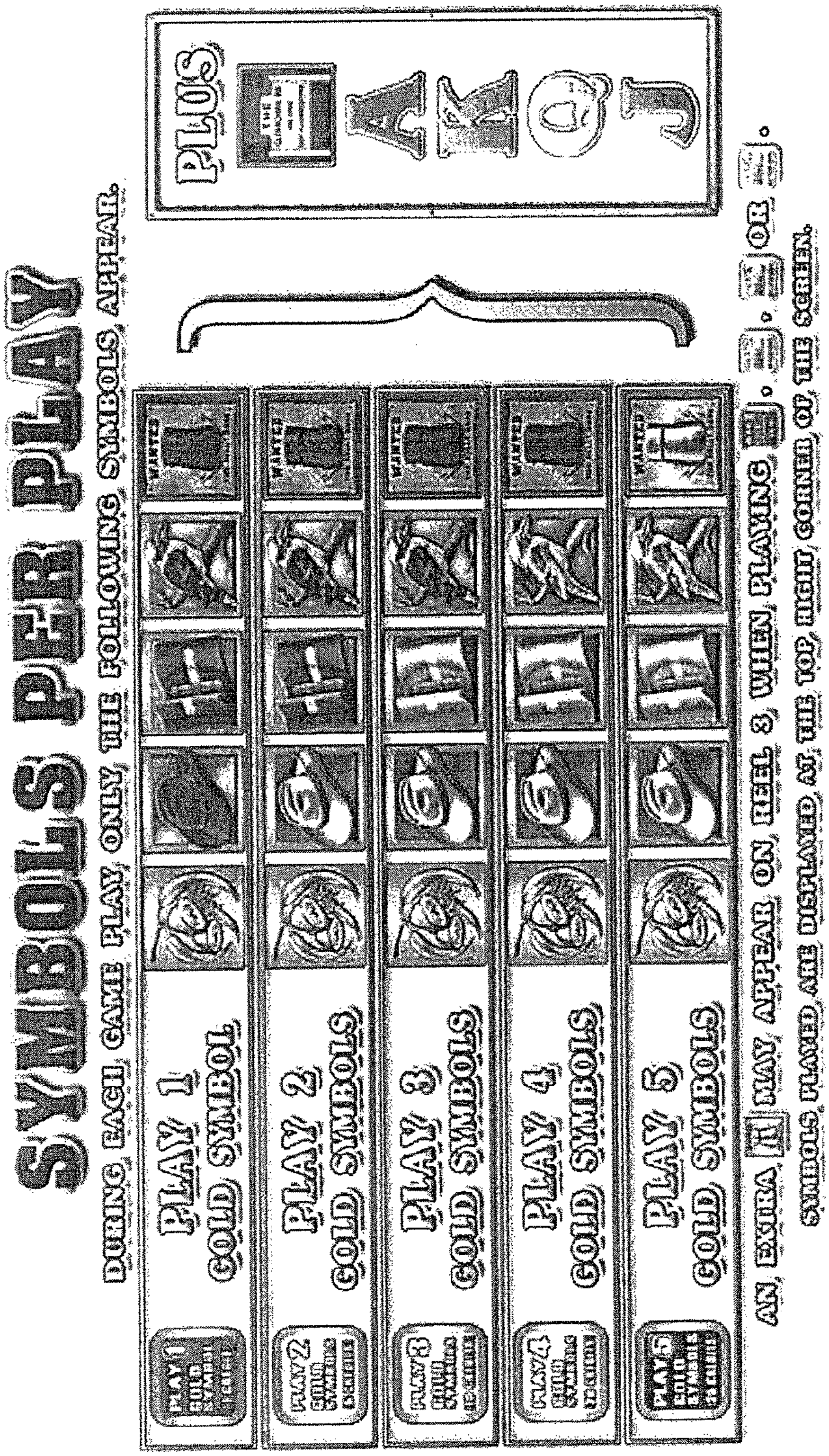
FIG. 15 shows standard and bonus symbols that are used in the game of the third embodiment.
Figure 16:
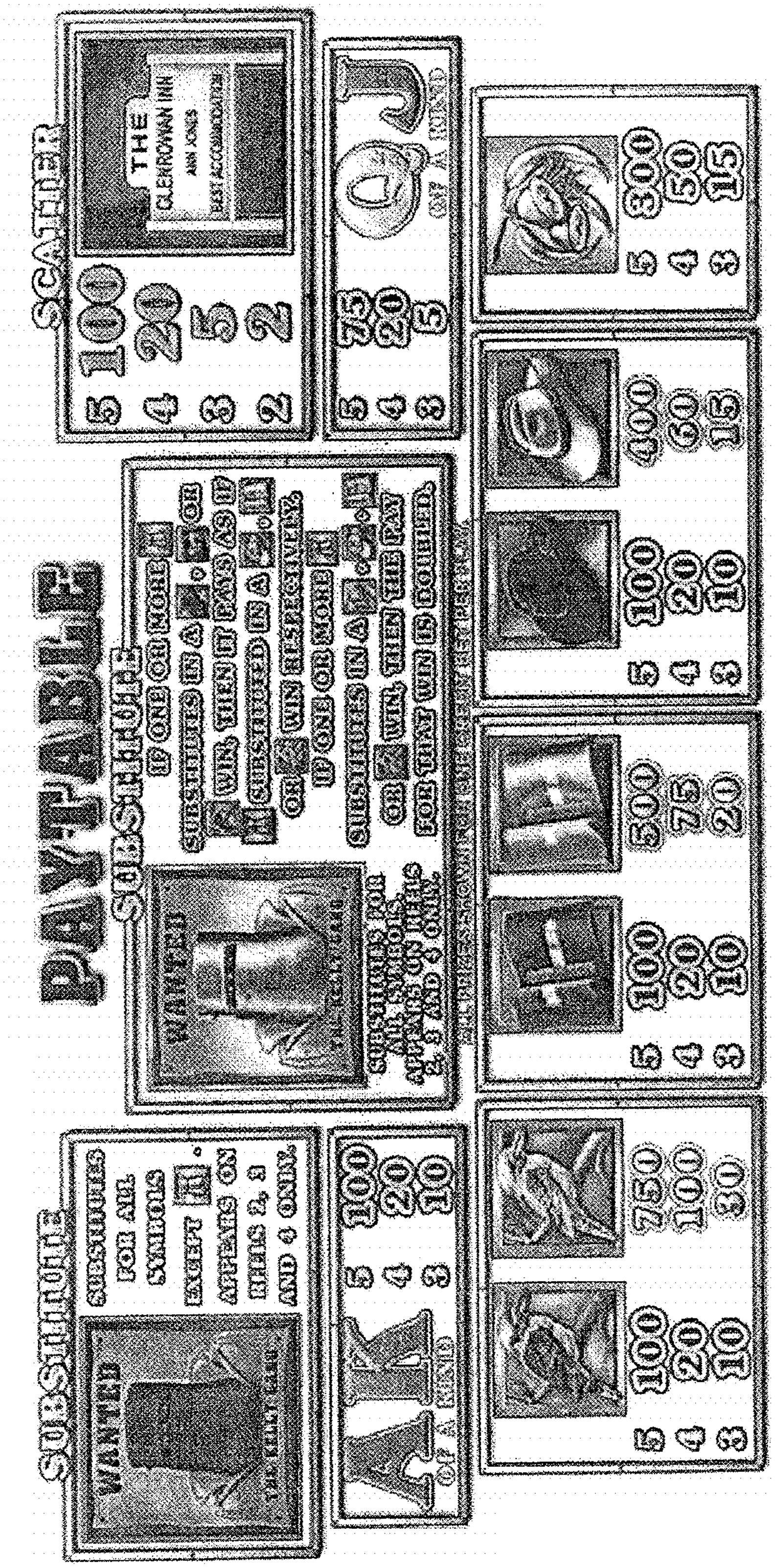
FIG. 16 shows a paytable applicable for each play option corresponding to bonus symbols available for play in the game of the third embodiment.

As shown in FIGS. 13, 15 and 16, the substitute special bonus symbol functions also as the highest valued bonus symbol, thereby serving a dual function, and can operate in a base state and in an enhanced state. Further, when operating in an enhanced state, it doubles the prize amount when substituting for an enhanced symbol of a lesser value.

Figure 17:
FIG. 17 shows free games rules that are applied in the game of the third embodiment.

The rules for free games provided by the scatter symbol are shown in FIG. 17, along with the paytable, which provides for additional free games with additional scatters beyond the three.

Figure 18A:
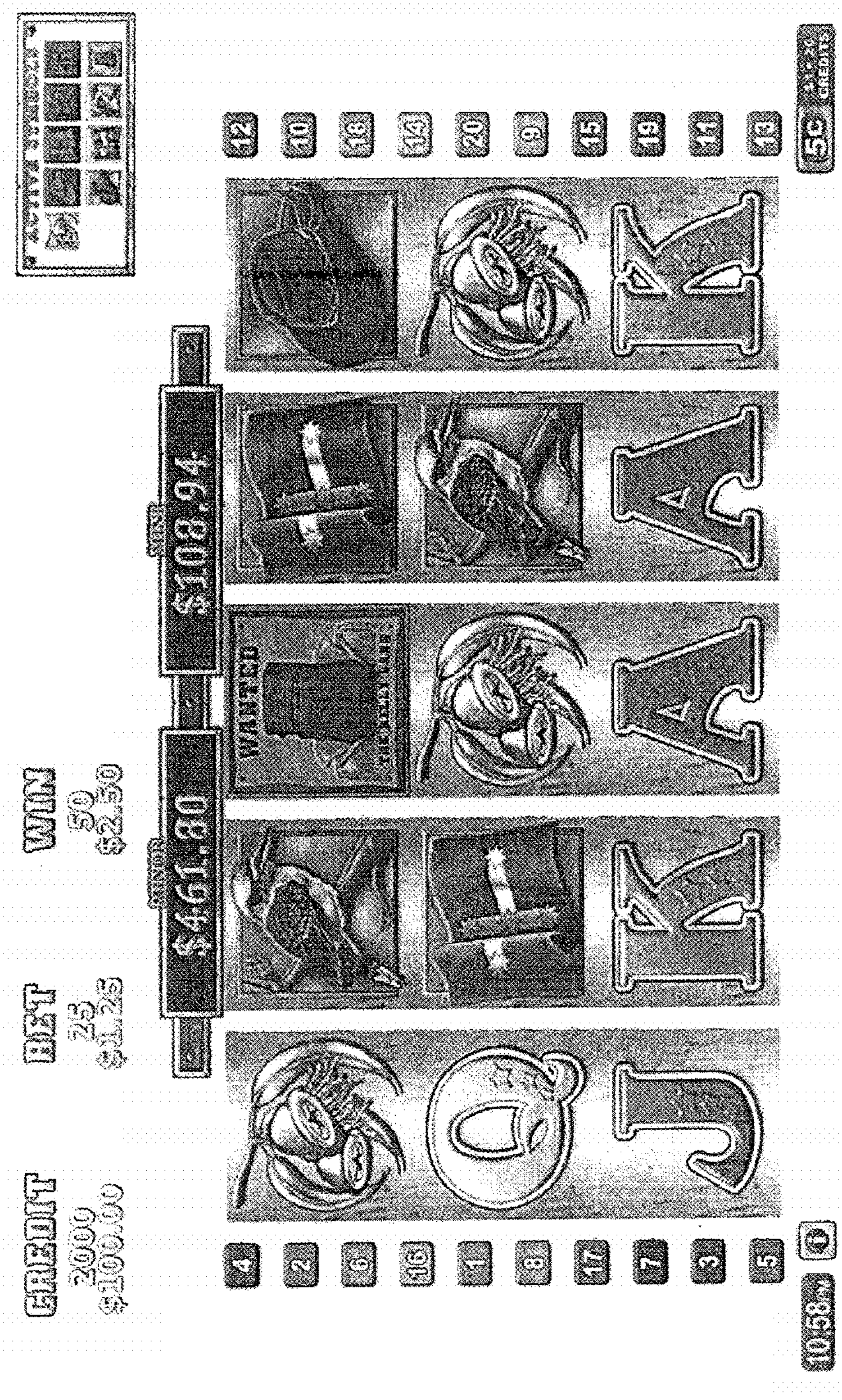
Figure 18B:
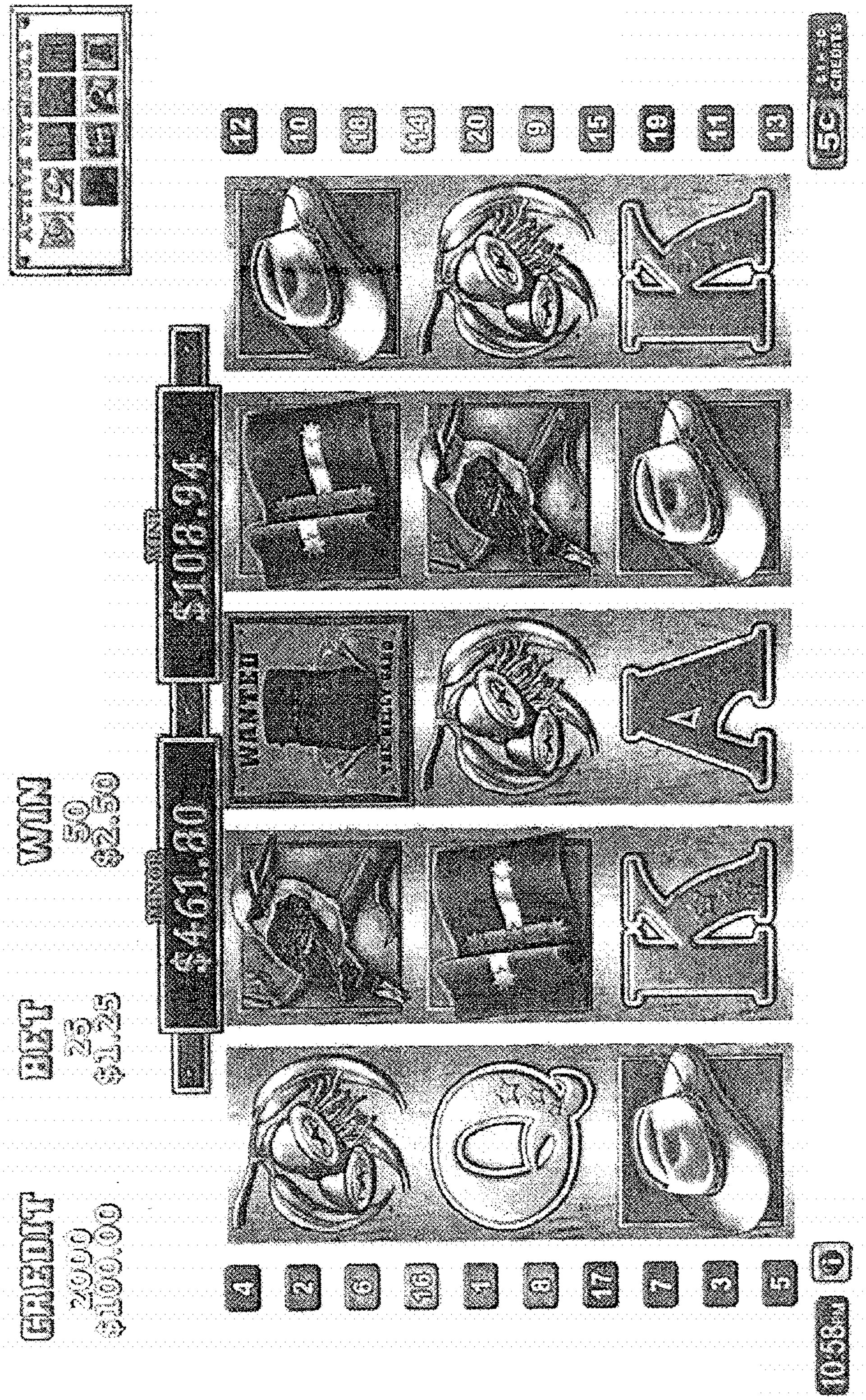
Figure 18C:
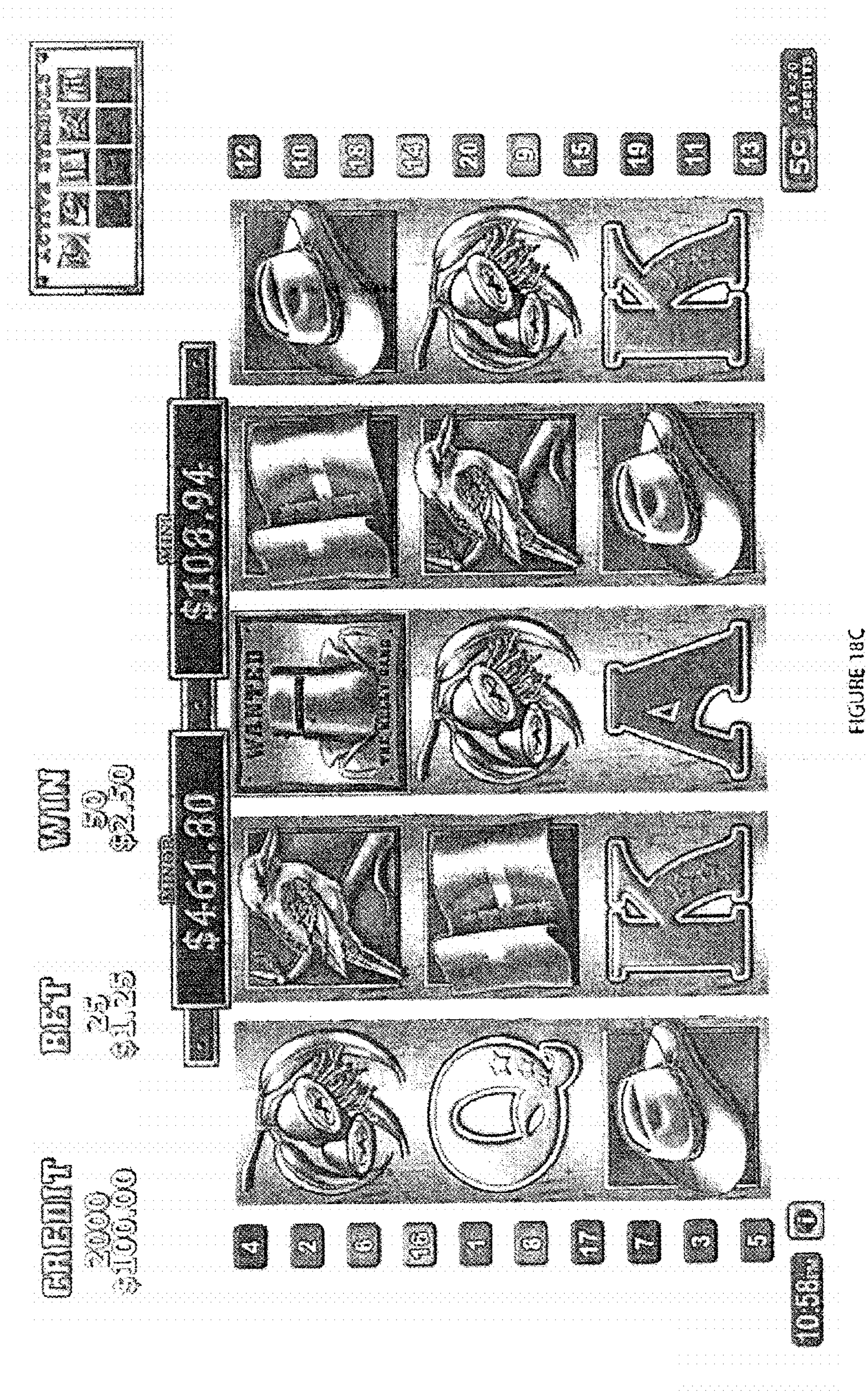

FIGS. 18A through 18C show the effect of changing play options on bonus symbols appearing in the play window and in the activation box.

In FIG. 18A, the first play option is selected, which is the equivalent of selecting a single enhanced bonus symbol for play. In the present embodiment, an enhanced bonus symbol is termed a "gold symbol," and in the first play option corresponds to the "gold gumleaf." As shown in the activation box in the top right-hand corner, the top row depicts the bonus symbols that can be enhanced and highlights those that have been activated to their enhanced state. The bottom row depicts those bonus symbols that can be in a base state and highlights those that are in an enhanced state. As in the preceding embodiment, the lowest valued gold symbol is the "gold gumleaf" and this will be in a permanently enhanced state. Hence, it does not have a symbol appearing in the bottom row. In the window, all bonus symbols appear in their base state, apart from the "gold gumleaf," which is always in its enhanced state.

In FIG. 18B, the second play option is selected, which is the equivalent of selecting two "gold symbols" for play. In this case, the next highest valued bonus symbol is the "hat," and so this appears enhanced as a "gold hat" in both the activation box and the window. It should be noted that the state of a bonus symbol is alternate, i.e., it can either be in an enhanced state or a base state, depending upon the particular play option selected, but it cannot be both.

In FIG. 18C, the fifth play option is selected, which is the equivalent of selecting all five "gold symbols" for play. In this case, all "gold symbols," comprising the "gold gumleaf," the "gold hat," the "gold flag," the "gold kookaburra" and the "gold Ned," are activated, as shown in the activation box. This play option provides the maximum number of opportunities for the player to win, invoking the highest level of the paytables.

Figure 19:
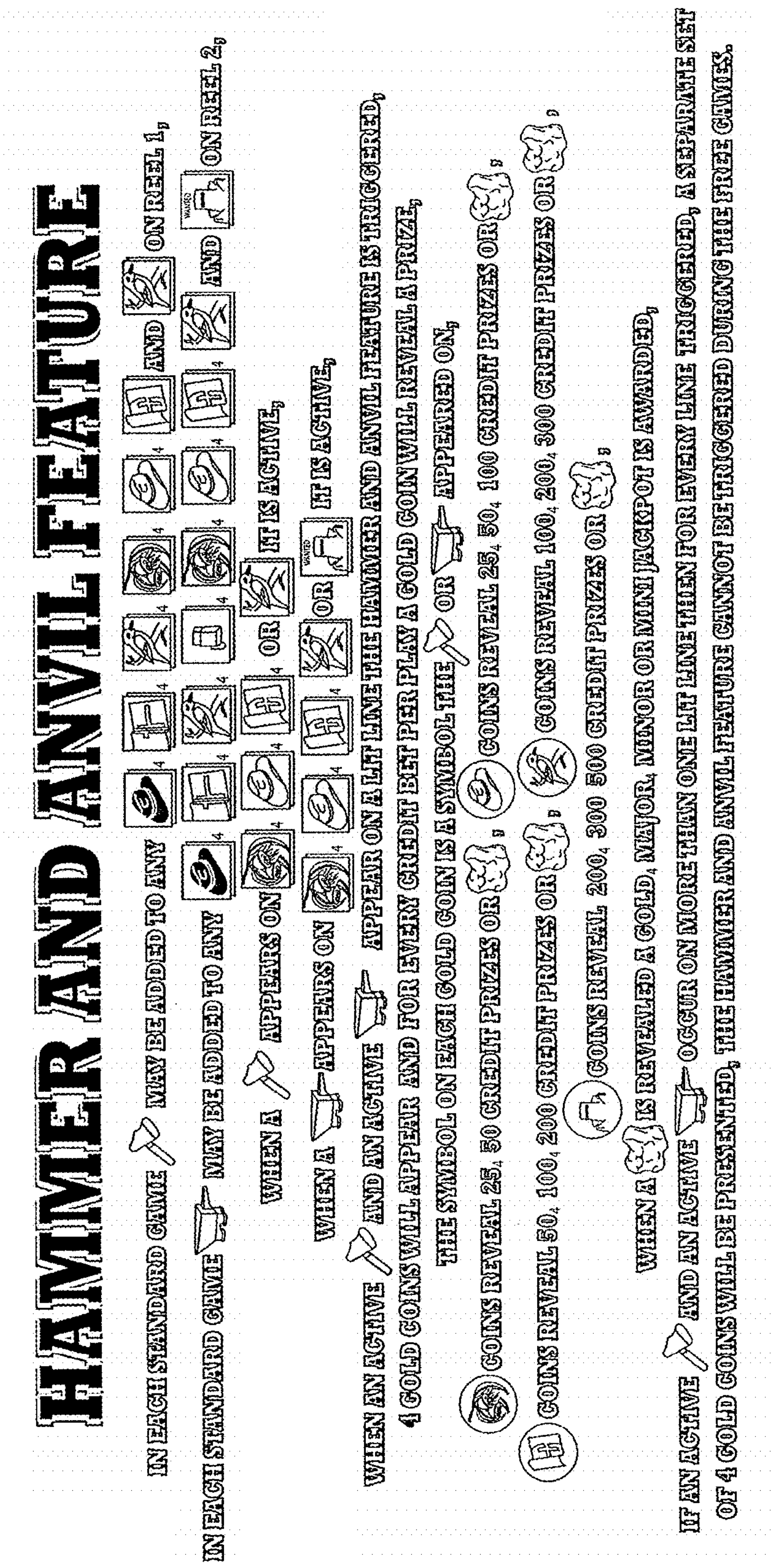
FIG. 19 shows the rules applicable to a feature and jackpot award system associated with the game of the third embodiment.
Figure 20:
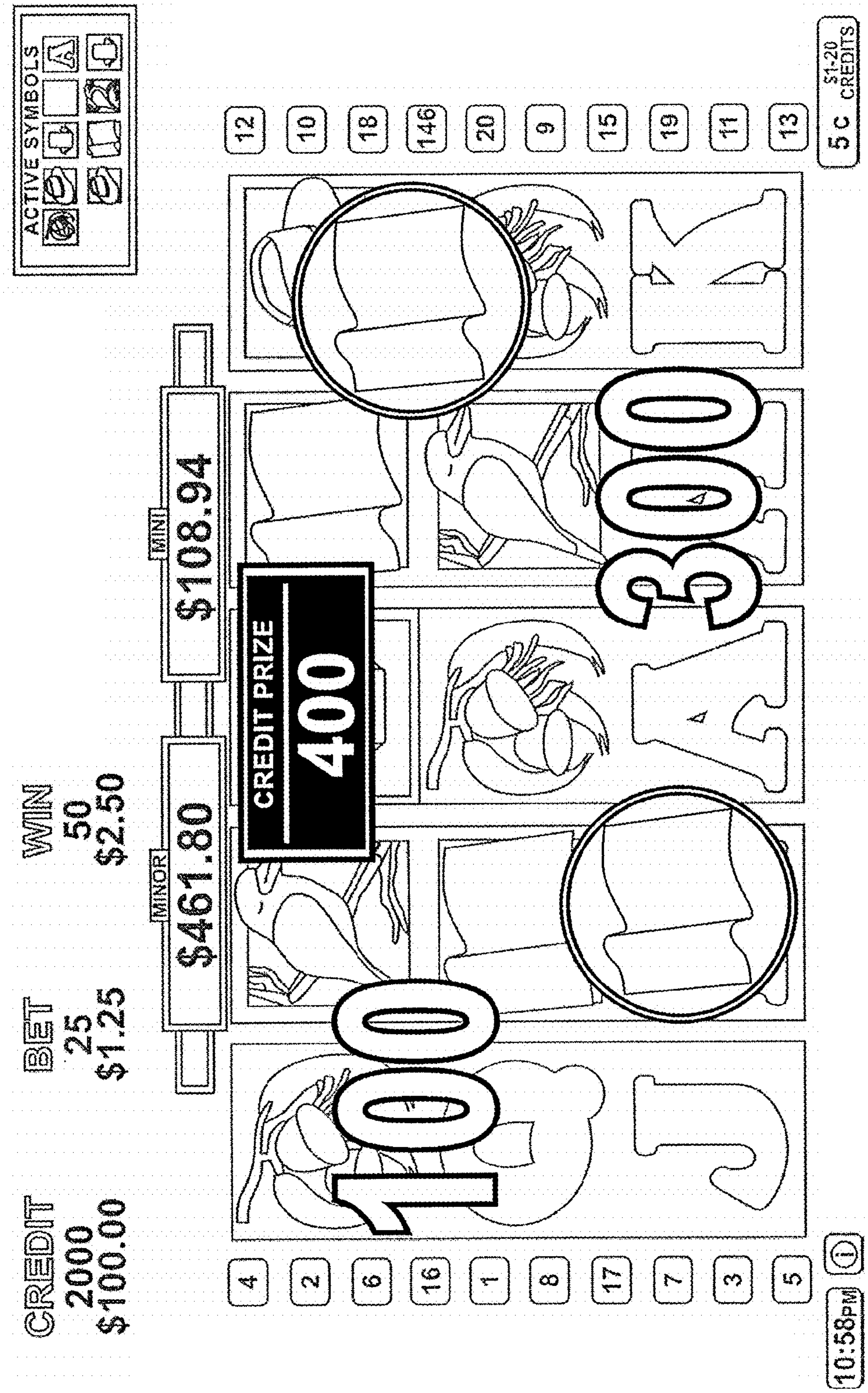
FIG. 20 shows the window displaying an outcome of the feature and jackpot award system on triggering and playing, with the game of the third embodiment.

Significantly, as shown in FIGS. 13, 15 and 16, and referred to in FIGS. 19 and 20, the game has a bonus feature or jackpot award that is separately triggered from the rules that apply to the base game. In the present embodiment, the jackpot award is fixed. However, in other embodiments, the jackpot may be a progressive jackpot and be accumulated from the gaming machine in either a standalone arrangement, or, alternatively, be part of a pool where the gaming machine is linked into a network with other gaming machines that all contribute to the jackpot pool.

The rules defining the operation of the triggering system for the bonus feature or jackpot award are shown in FIG. 19, and are based on the independent and random operation of a pair of bonus trigger symbols that are confined to appearing in Reels 1 and 2.

As indicated in the rules, and consistent with the operation of the substitute special bonus symbol, which also functions as the highest valued bonus symbol, this symbol does not appear on Reel 1, and so does not interact with the bonus trigger symbol operating on this reel. However, it is included on Reel 2, and so does interact with the bonus trigger symbol operating on that reel.

The bonus trigger symbols only become active when they appear on an enhanced bonus symbol. Further, they only trigger the bonus feature or jackpot award when they are active and appear together on a payline.

Once triggered, a second screen feature/jackpot mode is invoked, which, in the present embodiment, suspends the base game and enters a feature/jackpot phase or game. In the feature/jackpot phase of the present embodiment, a plurality of even-numbered award symbols appear presented in the form of gold coins. Half of the bonus awards depict one of the activated enhanced bonus symbols that triggered the bonus on one of the reels, and the other half of the bonus awards depict the other activated enhanced bonus symbol on the other reel that triggered the bonus.

Each bonus award is randomly linked to either a credit prize or a jackpot award, providing an even chance of either being awarded. The credit prizes are scaled in accordance with the paytable to different ranges of credit prizes, which correspond to the graded value of the enhanced bonus symbol, one of the prizes in the range being randomly selected as the prize.

As indicated, the lowest valued enhanced bonus symbol (i.e., the "gold gumleaf") provides the lowest range of credits (25 and 50 credits);

the next highest valued enhanced bonus symbol (i.e., the "gold hat") includes a higher credit prize in its range (25, 50 and 100 credits);

the next highest valued enhanced bonus symbol (i.e., the "gold flag") provides a higher range again (50, 100 and 200 credits);

the next highest valued enhanced bonus symbol (i.e., the "gold kookaburra") provides a higher range again (100, 200 and 300 credits); and the highest valued enhanced bonus symbol (i.e., the "gold Ned") provides the highest range (200, 300 and 500 credits).

The jackpot award provides for a plurality of jackpot prizes as shown on the topbox display in FIG. 13. In the present embodiment, there are four jackpot awards, scaled down in value from the top jackpot prize, the "Gold Jackpot," to the "Major Jackpot," then the "Minor Jackpot," and lastly, the "Mini Jackpot."

Triggered bonus awards are accumulated for every triggering event occurring on a payline, and will sequence through discrete feature/jackpot phases until all triggered bonuses are awarded.

FIG. 20 shows a partially completed feature/jackpot phase, where the first two bonus awards have revealed awards, in this case being a 100-credit and a 300-credit prize. As shown, a totaling box showing the accumulated value of the credit prizes is displayed in the center of the display.

The two remaining bonus awards, being two "gold flags," are yet to reveal their awards, which, in both cases, will be either a credit prize from the range of 50, 100 or 200 credits, or a jackpot award.

The fourth embodiment is substantially the same as the preceding embodiment, except that the paytable adopted provides the same value for each of the bonus symbols, rather than an incrementing value.

In this manner, the game is simplified and can be designed so that the jackpot feature can be made to scale linearly, helping to meet compliance requirements in particular jurisdictions where linearity is a regulated requirement.

Furthermore, in this embodiment, the game is configured to have a scatter-type jackpot feature triggerable in either a base game or in a free spin game. In the case of the base game, a mini jackpot can be awarded in response to any of the same type of bonus symbol appearing, for example, 8 to 9 times in a 3×5 matrix window, or a minor jackpot in response to the same type of bonus symbol appearing, for example, 10 to 14 times. In the case of a free spin feature being triggered, a major jackpot can be awarded in response to any of the same type of bonus symbol appearing, for example, 8 to 9 times, or a grand jackpot in response to the same type of bonus symbol appearing, for example, 10 to 14 times. In either case, an ultimate jackpot can be awarded in response to the same type of bonus symbol appearing the maximum number of 15 times. In some embodiments, a mix of any gold symbols will pay. In that case, a separate gold symbol paytable is provided.

The mode for carrying out the invention has several advantages. Significantly, the player is effectively offered the choice of different levels of volatility with each play option chosen. These play options are offered on a play-by-play basis following a common game theme and style, but with different paytables operating according to the play option chosen. This is a significant difference from the common types.

Furthermore, the player gets the value of playing with all paylines active on every play. Accordingly, a conservative player can achieve the satisfaction of playing with all paylines operating while wagering at the lowest play option.

On the other hand, more volatile players will be attracted to the highest play option to achieve the best perceived value from a play.

It should be appreciated, however, regardless of the perception, the game designer can modify the mathematics with bonus symbol placement and frequency on the reels arbitrarily, but, in doing so, ensure that the overall return to player requirement remains fixed. Consequently, great flexibility to the game designer is provided to ensure maximum enjoyment from the game, while ensuring compliance with the game regulators at all times.

For clarity and ease of description, some embodiments described below may be referred to as one or more specific embodiments with a commercial name of 88 FORTUNES™ . However, such descriptions should not be construed to be limited to functionality and elements that may be available in an EGM specifically configured to be available under the 88 FORTUNES™ name. Rather, 88 FORTUNES™ embodiments discussed herein should be considered as general embodiments that may include one or more of the features, elements, or combination thereof presented in the discussion below.

Some embodiments of the present disclosure may include different ways of determining winning combinations relative to those discussed above that are based on the symbols displayed on the reels. This alternative scheme for determining winning combinations may be referred to herein as "all ways" and "reel ways." Various examples of reel ways combinations and how they might differ from line pays and what is sometime referred to as "scatter pays" are explained below.

As one example, 88 FORTUNES™ is a video slot game that pays for the occurrence of three or more identical symbols on any position on adjacent but different reels, from left to right starting on the leftmost reel (i.e., pays any left to right). In some embodiments, a wild symbol may substitute for one or more of the identical symbols required for a winning combination. The reels may be displayed as a 3×5 array (i.e., 5 reels with 3 positions shown for each reel) so there may be as many as 243 ways to have winning combinations in the array. In other words, there are 243 possible 5 of a kind combinations for each symbol. All wins except for jackpots are from 3 or more of a kind combinations paying any left to right (i.e., the same symbol appearing on at least reels 1-3).

1. All Ways Winning Combinations

All ways allows players to win on symbols appearing anywhere in the game outcome display, regardless of the play elections, and regardless of the selected multiplier.

Unlike play elections that restrict the number of paylines being played, or the number of reel positions that can be used to determine game outcome, this scoring method allows the player to win on any symbol appearing in the 3×5 display matrix. It is contemplated that other symbol array configurations can be used, such as a 1×5, 2×6, 4×4, etc., array.

Figure 20A:
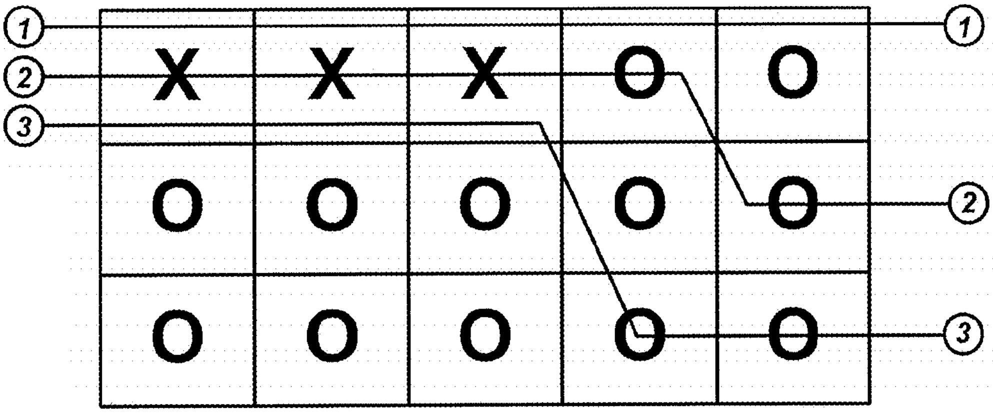
FIG. 20A shows a window showing three line pay wins for three matching X symbols appearing on adjacent reels.

Unlike line pays, the "all ways" pay structure pays for combinations of matching symbols appearing on adjacent reels. At least one of the matching symbols is unique to each pay. For example, in the following array, as shown in FIG. 20A, with X's representing matching symbols and O's representing all other non-matching symbols, there would be a total of 3 line wins, but using the all-ways scoring structure, there is only one win of 3x's on the top position of reels 1-3.

Figure 20B:
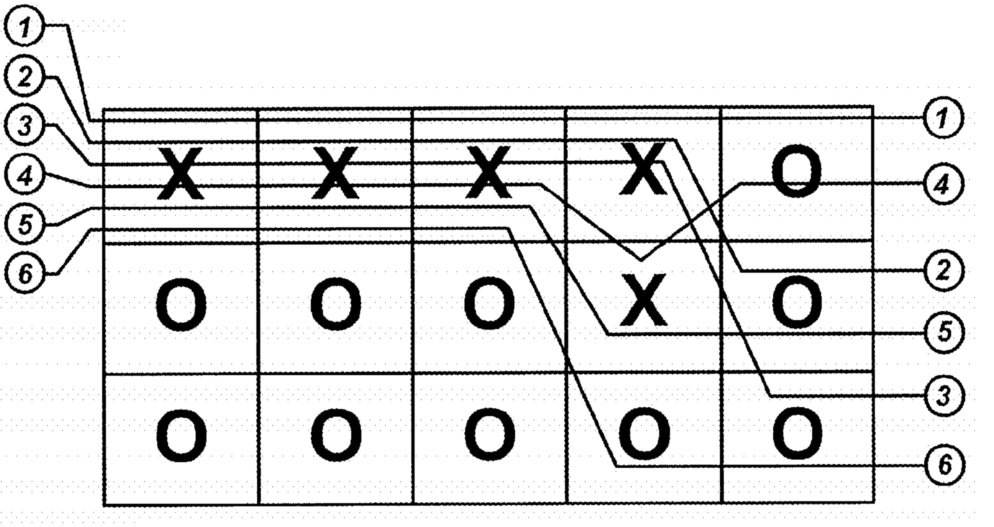
FIG. 20B shows a window showing six line pay wins for four matching X symbols on adjacent reels.

As shown in FIG. 20B, in this array, there are 2-four of a kind wins, 4 along reels 1-4 in the top position, and the second is 3×3's on the top position of reels 1- 3 and in the middle position of row 4.

Once again, the 4 matches along the top in a line pay game results in 3 different line pays. 4 matches, with 3 along the top positions on reels 1-3 and the $4^{th}$ on the second position of reel 4 results in six line wins. The "all ways" pay structure yields two different 4-of-a-kind pays.

All-ways differ from scatter pays in that scatter pays pay for multiple scatter symbols appearing anywhere on the display, or on specific reels on the display, in any frequency. For example:

| | | | | |
|---|---|---|---|---|
| S | | | | |
| | S | | | |
| S | | | | |

The above outcome would pay for 3 scatter symbols "S", while this would not be an all-ways winning event because there are no matching symbols on 3 adjacent reels (left to right).

2. Play Options

An electronic gaming machine (EGM) with games that may include a multi-level bonus feature is disclosed. The game may be available in non-progressive, stand-alone progressive, and linked-progressive formats. Linked-progressive formats include multiple EGMs linked together such that jackpots and other possible special features or payouts may be combined between linked EGMs.

In a basic play format, players make a play election from one of five game play options, which qualify the player to participate in zero to four bonus events without making additional wagers. The play elections also qualifies the player to play with one or more enhanced value symbols with higher payout amounts for winning combinations.

In general, embodiments under 88 FORTUNES™ may be considered "all up" in a manner that game rules and the number of symbol positions available for wins do not change between play options. In such embodiments, some paytables are just not used, as their symbols are not used.

The play election selected by the user from the play options determines the minimum wager, as well as a set of one or more enhanced value symbols that yield higher payouts. In some embodiments, trigger symbols are provided that trigger additional game features, including possible animations displayed on the game display.

In some embodiments, animations provide an indication to the player that a jackpot is growing and is likely to hit soon. In some embodiments, animations provide an indication to the player that the results of a particular game have caused the jackpot to grow by showing one or more special symbols in the matrix of displayed symbols transporting tokens (e.g., gold coins and/or gold flying bats) to a jackpot symbol. As a non-limiting example, animations may be caused by a Fu symbol appearing in one or more positions on the reels. In one example, bats carrying coins in its mouths fly from the Fu symbol in the matrix of display symbols to a bowl. Upon reaching the bowl, the bats drop the coins into the bowl such that coins fill the bowl as games are played. When the bowl reaches a certain stage of being full, it explodes, triggering the jackpot. However, the bowl does not necessarily need to be full to explode, and the bowl does not necessarily explode as soon as it appears full.

A multi-tiered bonus structure may be included such that each jackpot is awarded according to an interactive feature, with lower paying jackpots occurring at a higher frequency than higher paying jackpots. When a player is eligible for multiple jackpots, an additional "gold coin" interactive feature is provided to select the specific jackpot won. Each of the five play elections corresponds to a predetermined wager amount, and one or a number of preselected enhanced (e.g., gold) symbols is played.

Figure 21:
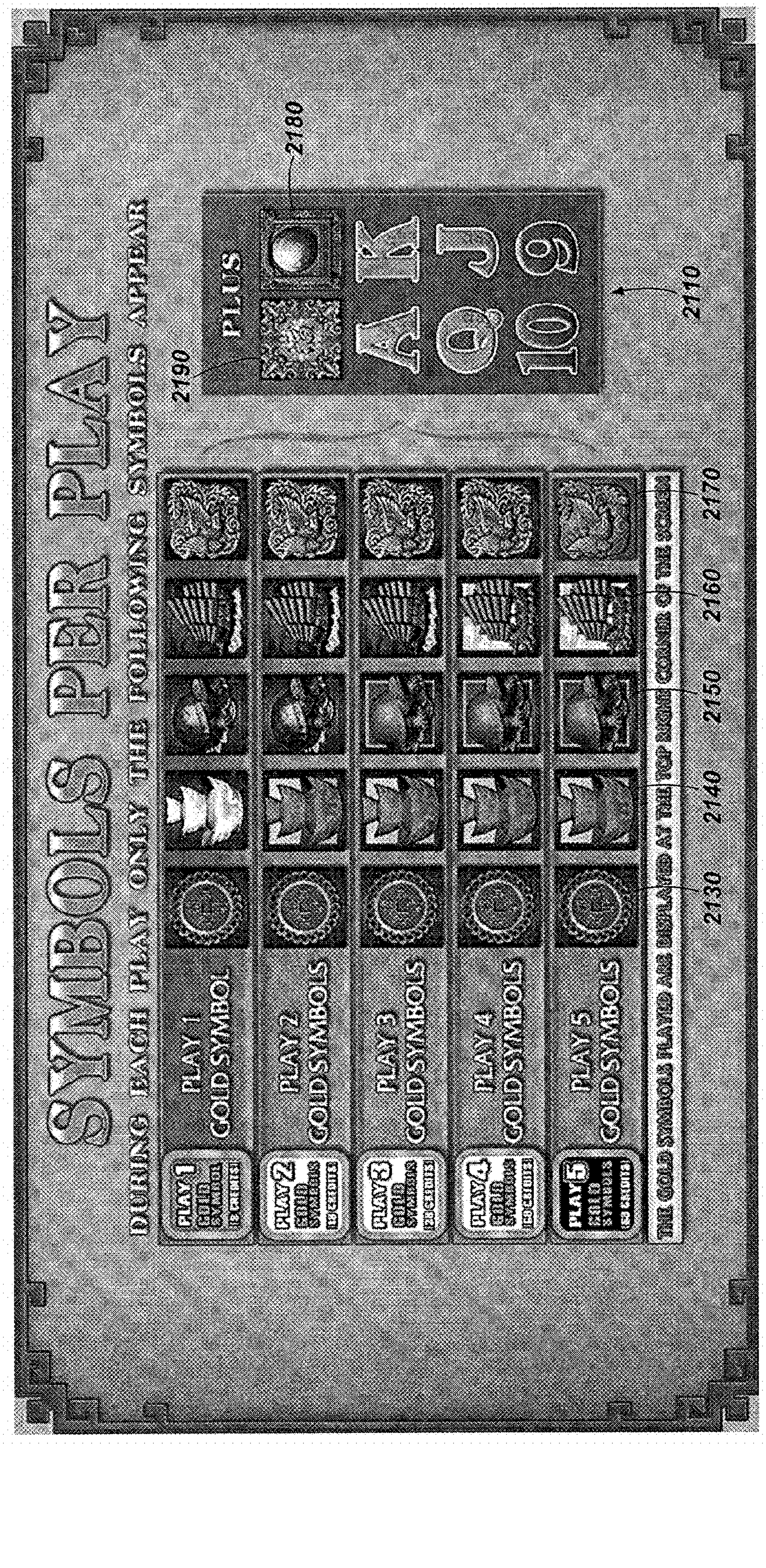
FIG. 21 shows symbols available for game play in one embodiment of the present disclosure.

FIG. 21 shows symbols available for game play in one embodiment of the present disclosure. As shown in FIG. 21, game symbols may include standard symbols 2110, special standard game symbols and enhanced value symbols. In some embodiments, the standard symbols 2110 may be configured as card symbols, such as, for example, A-K-Q-J-10-9. In some embodiments, there may be five enhanced value symbols, which may be depicted as a gold coin 2130, a gold ingot 2140, a gold turtle 2150, a gold junk 2160, and a gold phoenix 2170. In some embodiments, there may be four corresponding special standard game symbols, which may be the same depiction as the enhanced value symbols, but with a color difference to show that they are not enhanced value symbols. In other embodiments, other types of differences may be used to show the difference between any special standard game symbol and a corresponding enhanced value symbol. For the embodiment of FIG. 21, the enhanced value symbols are depicted as a gold coin 2130, a gold ingot 2140, a gold turtle 2150, a gold junk 2160, and a gold phoenix 2170.

In one embodiment, all standard game symbols are of equal value, and generate the same payouts for the same number of matches. For example, the following paytable identifies winning combinations for all of the standard game symbols (A, K, Q, J, 10, 9):

| Matches | Pays |
|---|---|
| 5 | 50 |
| 4 | 10 |
| 3 | 5 |

The special standard game symbols in one embodiment (i.e., ingot, turtles, junk, phoenix (non-gold) generate the same payouts as standard game symbols. When one or more of the special standard game symbol types are replaced with an enhanced value symbol, the enhanced paytables may replace the paytable corresponding to the standard game symbols and special standard game symbols.

In FIG. 21, the first line illustrates the coin 2130 as an enhanced value symbol and the ingot 2140, turtle 2150, junk 2160, and phoenix 2170 are special standard game symbols. The second line illustrates the coin 2130 and ingot 2140 as enhanced value symbols and the turtle 2150, junk 2160, and phoenix 2170 as special standard game symbols. The third line illustrates the coin 2130, ingot 2140, and turtle 2150 as enhanced value symbols and the junk 2160 and phoenix 2170 as special standard game symbols. The fourth line illustrates the coin 2130, ingot 2140, turtle 2150, and junk 2160 as enhanced value symbols and the phoenix 2170 as a special standard game symbol. The fourth line illustrates all of the symbols as enhanced value symbols.

As stated earlier, the enhanced value symbols logically constitute additional game symbols with corresponding special standard game symbols. The enhanced value symbols can be thought of as following a theme in teems of their selection between an enhanced and unenhanced state, according to the particular play option selected. In this manner, the same theme can be maintained between different play options to provide the players with the experience that they are playing the same game, regardless of the particular game option selected, but, in reality, each game play option involves a different bonusing scheme (and thus player experience between the play options) that arises from effectively playing a different game in each play option.

The standard symbols generate wins when multiple matching symbols appear on adjacent reels. When the standard symbols are playing card ranks, no poker rules are used to evaluate possible pay combinations. Thus, there are no pays for flushes, full houses, straights, etc. Only 3, 4 or 5 matching symbols pay the various possible pay combinations for an array of 3×5 symbols. Each standard symbol combination has the same value. In other words, 3-K's pay the same as 3-9's.

Within the group of standard symbols and special standard game symbols, each symbol has an equal value. In other words, three matches from left to right for a given wager all pay the same equal payout for matches of all standard game symbols and all special standard game symbols. In other embodiments, the standard symbols have different values with different payouts. However, with enhanced value symbols, the payouts are enhanced. In addition, the enhanced bonus symbols generate payouts that have increasing value, depending on the symbol.

In some embodiments, a scatter symbol such as a gong symbol 2180 may be included as part of the game design. Games may be configured such that the scatter symbol 2180 pays 50:1 for 5 gongs, 10:1 for 4 gongs, and 5:1 for 3 gongs in a scatter arrangement, left to right. In some embodiments, the first three gong symbols 2180 must appear on reels 1, 2 and 3 each to pay a scatter pay. In other embodiments, the gong symbols must appear on reels 2, 3 and 4. In one 88 FORTUNES™ embodiment, gong symbols 2180 are not considered special standard game symbols and do not have a corresponding enhanced (e.g., gold) value symbol.

In some embodiments, the gong symbol 2180 can appear on all 5 reels in the base game or in a free game. Three or more gong symbols in a scatter arrangement on the first three reels not only triggers a payout, but also triggers free play in some forms of the invention. In some embodiments, scatter pays are multiplied by a player-selected multiplier to calculate a payout. In other embodiments, the player-selected multiplier is not applied to scatter pays. In still other embodiments, a fixed number of free plays (e.g., 10 free plays) may be awarded regardless of play election (and player-selected multiplier).

Figure 22:
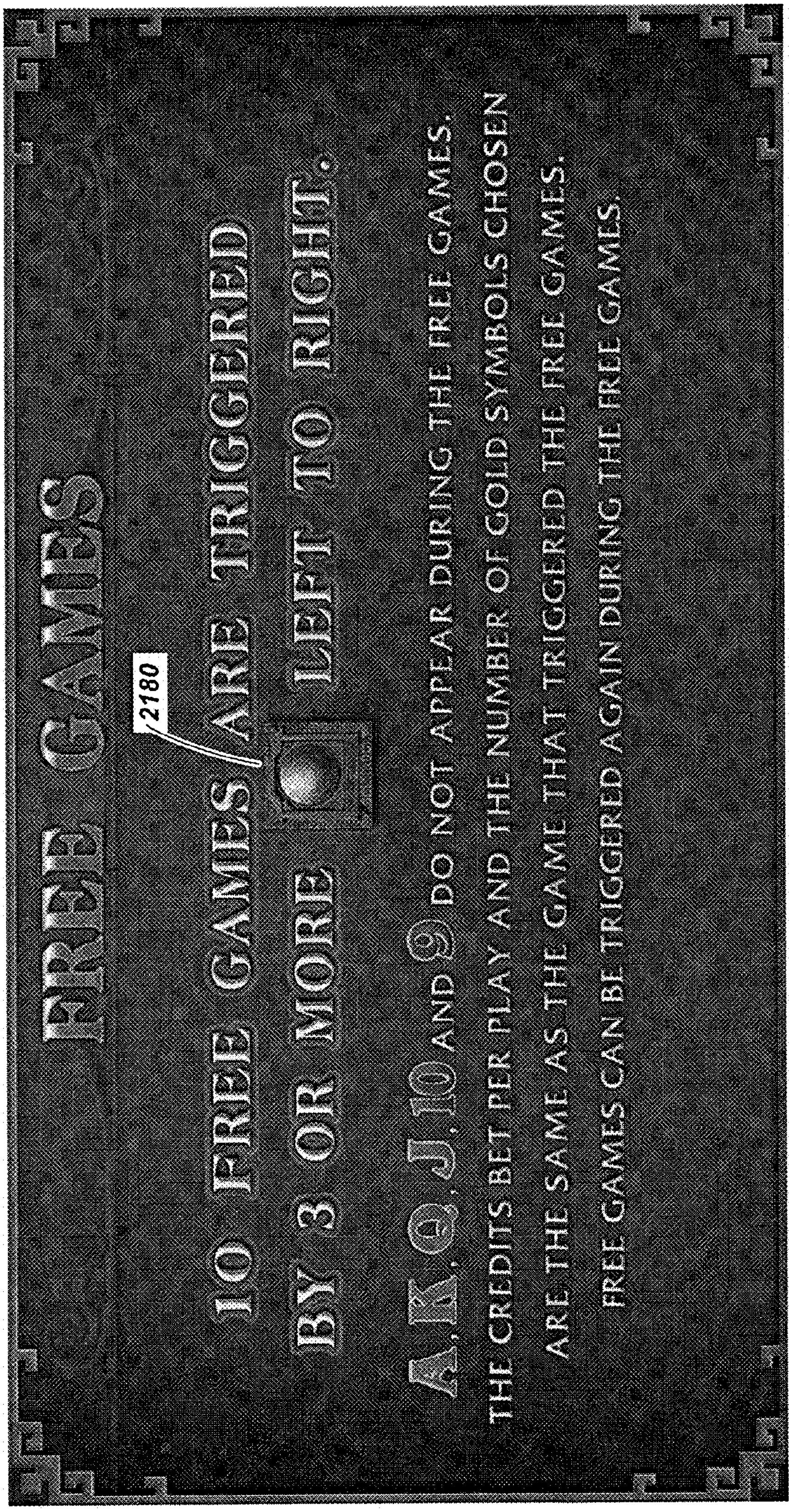
FIG. 22 shows a window indicating free plays that may be awarded responsive to a proper combination of scatter symbols.

FIG. 22 shows a window indicating free plays that may be awarded responsive to a proper combination of scatter symbols 2180. In one embodiment, the number of free plays depends on the player election made in the play just prior to free play. In one 88 FORTUNES™ embodiment, regardless of amounts wagered, when three gong symbols 2180 appear anywhere on the first three reels, 10 free plays are awarded. Players must play with at least one enhanced value symbol (e.g., the coin 2130) to be eligible for possible free plays. In the 88 FORTUNES™ embodiment, all plays qualify the player to play with at least one enhanced value symbol. Therefore, players can win free play regardless of play election. Free play awards may be more frequently awarded with higher level play options in one embodiment. In other embodiments, the player may obtain fewer free plays playing with only one enhanced value symbol than when playing with more enhanced value symbols.

In some embodiments, in free play, the standard symbols (A-K-Q . . . 9) do not appear. The number of enhanced bonus symbols and the multiplier (applied to the amounts wagered only) from the prior game play are used during free play. As a result, depending upon the game play election, there may be bonus symbols that are not shown as enhanced bonus symbols during free play. In other words, the number of symbols that function as standard symbols is lower during free play than during regular game play. Additional free games can be triggered from free play. The symbols used in free play may be different and may appear in different frequencies as compared to regular game play.

In some embodiments, free play is triggered when 3 gong symbols appear on the first three reels, left to right. See FIG. 3. The credit meter records free play differently as compared to base game play. A "credits won" meter is provided on the player screen which normally records the pays for a given play. When the game is in the free play mode, all wins and losses are added and subtracted from the "credits won" meter. Additionally, free play proceeds automatically, without requiring the player to hit the "spin" button or another button to continue play. Free play progresses very rapidly and the total win is displayed on the "credits won" meter at the conclusion of a free play session.

Returning to FIG. 21, some embodiments may include a "Fu symbol" 2190 as a wild symbol as well as a trigger symbol 2190. The symbol 2190 may be considered as wild (i.e., matching any symbol) in various reel way combinations. In some 88 FORTUNES™ embodiments, a Fu symbol 2190 can substitute for a gong symbol 2180. In other embodiments, the Fu symbol 2190 does not substitute for a gong symbol 2180.

The Fu symbol 2190, when appearing on the 3×5 matrix of displayed symbols may trigger an animation of Fu Bats that fly from the Fu symbol 2190 to a bowl that retains a collection of gold coins. As the Fu Bats fly into the bowl, the bats turn into gold coins. Additional details of this animation are discussed below with reference to FIGS. 24 and 25. In addition, it is not necessary for the Fu symbol 2190 to be part of a paying combination to trigger the Fu Bat animation. This animation may occur when the Fu symbol 2190 appears, regardless of whether or not it is associated with a paying combination in a regular game play.

A wild symbol 2190 may also have a corresponding enhanced value wild symbol (not shown) with an enhancement depiction similar to the enhanced value symbols. As a non-limiting example, there may be a gold Fu symbol as an enhanced value wild symbol corresponding with the Fu symbol 2190 as a wild symbol 2190.

In some embodiments, a wild symbol 2190 acts in a "wild" manner (i.e. substitutes for other symbols, functions as a condition necessary to trigger a bonus payout or bonus selection event, triggers a Fu Bat animation, and also multiplies all payouts that include the gold Fu symbol 2190 in the pay by 2×, unless the payout is a scatter pay or a progressive payout. Winning combinations of special standard game symbols with enhanced equivalents that include the gold Fu symbols 2190 also pay as if the special standard game symbols were enhanced bonus symbols.

To play, the player makes one play election from five possible play options. In FIG. 21 these play options are illustrated by the five rows, each row showing a different number of gold symbols (i.e., enhanced value symbols) to be used in the game. Regardless of the play election, the player is selecting a set of special value symbols to simultaneously play up to 243 possible pays.

In one embodiment, the reel strips for each possible play option includes gong symbols 2180, Fu symbols 2190, and standard symbols 2110. Different play options include different combinations of special standard game symbols and enhanced value symbols as follows:

Election 1: enhanced value coin symbol 2130, non-enhanced special standard game symbols for the ingot 2140, turtle 2150, junk 2160, and phoenix 2170.

Election 2: enhanced value symbols for the coin 2130 and ingot 2140, special standard game symbols for the turtle 2150, junk 2160, and phoenix 2170.

Election 3: enhanced value symbols for the coin 2130, ingot 2140, and turtle 2150 and special standard game symbols for the junk 2160 and phoenix 2170.

Election 4: enhanced value symbols for the coin 2130, ingot 2140, turtle 2150, and junk 2160 and a non-enhanced symbol for the phoenix 2170.

Election 5: enhanced value symbols for all of the coin 2130, ingot 2140, turtle 2150, junk 2160, and phoenix 2170. There are no special standard games associated with this play option.

In some embodiments, a button panel on the EGM may offer play election buttons that also indicate the number of enhanced value symbols associated with the play election. The buttons identify a play election with a pre-assigned number and types of enhanced value symbols associated with each play election, as shown above and in FIG. 21.

Players can win by achieving identical combinations of 3 or more standard symbols, special standard game symbols or enhanced value symbols on adjacent reels, as discussed above relative to the "all ways" game resolution method.

In some embodiments, each play election dictates a pre-determined minimum wager amount. For example, each play option may dictate the following wagers (assuming a 1× multiple):

| | Play Election | | | | |
|---|---|---|---|---|---|
| | 1 | 2 | 3 | 4 | 5 |
| Example 1-credits | 1 | 5 | 15 | 30 | 60 |
| Example 2-credits | 8 | 16 | 24 | 48 | 88 |

In other embodiments, accepting other credit wager amounts for each play option is contemplated. For example, a player may select a number of credits to play, i.e., 18, which defaults to the highest available pre-selected wager (i.e., 16) for a game that offers 8, 16, 24, 48 or 80 credit options.

In some cultures, certain numbers may be considered unlucky either because of the numbers themselves, or how the numbers sound when pronounced. As a result, some wager amounts and progression of wager amount for the different play elections may be chosen to avoid such "unlucky" numbers.

Figure 23:
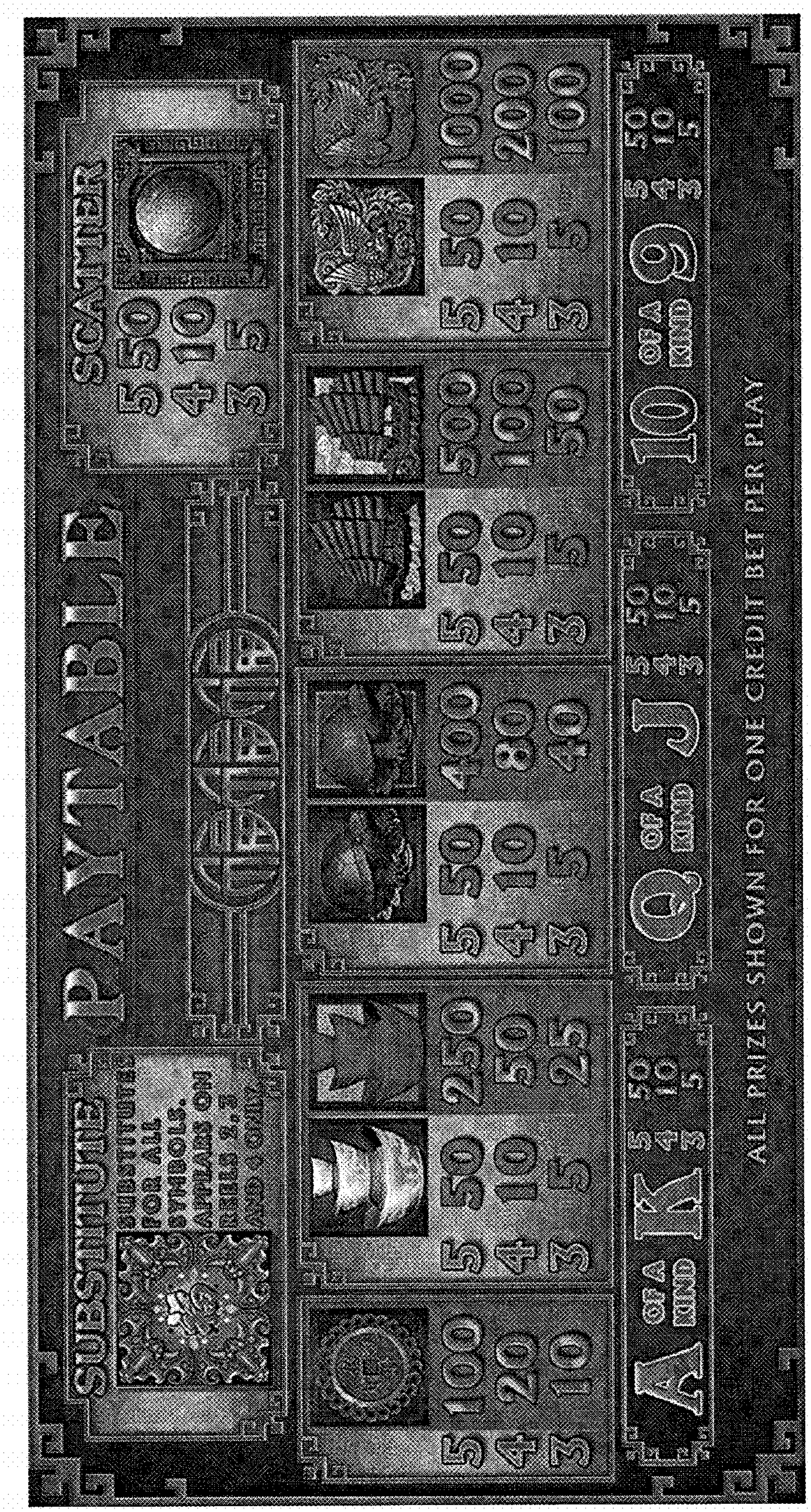
FIG. 23 shows a paytable for one embodiment with payout ratios for standard symbols, bonus symbols, enhanced bonus symbols, scatter symbols, wild symbols, and enhanced wild symbols.

FIG. 23 shows a paytable for one embodiment with payouts relative to number of matches for standard symbols, special standard game symbols, enhanced value symbols, scatter symbols, trigger and/or wild symbols, and enhanced trigger and/or wild symbols. Each line within a cell for a symbol indicates the number of matches for any given reel pay combination (i.e., 3, 4, or 5) and its corresponding payout. Below is an example of a paytable for one embodiment similar to that depicted in FIG. 23 except in a somewhat different format.

| Symbol | Non-Gold Pays | Gold Pays |
|---|---|---|
| Gong | 5-50<br>4-10<br>3-5 | none |
| Fu | Substitutes on reels 2-3-4 | Substitutes on reels 2-3-4 |
| A-K-Q-J-10-9 | 5-50<br>4-10<br>3-5 | none |
| Coin | none | 5-100<br>4-20<br>3-10 |
| Ingot | 5-50<br>4-10<br>3-5 | 5-250<br>4-50<br>3-25 |
| Turtle | 5-50<br>4-10<br>3-5 | 5-400<br>4-80<br>3-40 |
| Junk | 5-50<br>4-10<br>3-5 | 5-500<br>4-100<br>3-50 |
| Phoenix | 5-50<br>4-10<br>3-5 | 5-1000<br>4-200<br>3-100 |

Some embodiments may include wagers with multipliers. In such embodiments, before game play begins, the player selects one of five play multipliers. The exact multipliers per play option can vary. The table below illustrates some non-limiting examples of multipliers that may be used for the different play elections.

| | Multiplier Election | | | | |
|---|---|---|---|---|---|
| | 1 | 2 | 3 | 4 | 5 |
| Example 1 | 1x | 2x | 3x | 6x | 10x |
| Example 2 | 1x | 2x | 3x | 4x | 5x |
| Example 3 | 1x | 2x | 3x | 5x | 8x |
| Example 4 | 1x | 2x | 3x | 5x | 10x |

In some embodiments, including some 88 FORTUNES™ embodiments, the multiplier elections are not tied to the game play elections. The player's decision to select a multiplier is made independently from the game play election decision. The multiplier is applied to the credits wagered, as well as some or all of the payouts. In the 88 FORTUNES™ example, the minimum wager is 8 credits (with a 1× multiple) and the maximum wager is 88 credits times a 10× multiple, which equals 880 credits.

The pays on the paytable above are payouts assuming a 1× multiplier. The following table compares different examples of calculated payouts for a game that requires 8, 16, 24, 48 and 8 credits wagered for play elections 1-5, respectively, for different play elections:

| Play Election | Base Wager | Multiple Wager | Total Wager | Non-Gold Wins | | Gold Wins | |
|---|---|---|---|---|---|---|---|
| 1 | 8 | 1× | 8 | 3 Turtles | 5 | 3 Gold Turtles | 40 |
| 1 | 8 | 2× | 16 | 4 Ingots | 20 | 4 Gold Ingots | 100 |
| 2 | 16 | 2× | 32 | 3 Gold coins | — | 3 Gold coins | 20 |
| 2 | 16 | 3× | 48 | 3 Gold coins | — | 3 Gold coins | 30 |
| 3 | 24 | 3× | 72 | 5 Phoenix | 150 | 5 Gold Phoenix | 3,000 |
| 3 | 24 | 4× | 96 | 3 Junk | 20 | 3 Gold Junk | 200 |
| 4 | 48 | 4× | 192 | 5 Ingots | 200 | 5 Gold Ingots | 1,000 |
| 4 | 48 | 5× | 240 | 4 Junk | 50 | 4 Gold Junk | 500 |
| 5 | 88 | 5× | 440 | 5 Phoenix | 250 | 5 Gold Phoenix | 5,000 |
| 5 | 88 | 1× | 88 | 5 Phoenix | 5 | 5 Gold Phoenix | 1,000 |

Generally, the payouts for the standard symbols and special standard game symbols will pay less or pay higher pays for play elections that qualify a player to participate in more jackpot events with potentially higher jackpot payouts.

In other embodiments, the paytable payouts are absolute payout amounts, regardless of amounts wagered. When a paytable says it pays 250 credits for 5 gold ingots, that means regardless of what is wagered (i.e., 8, 16, 24, 48, 88 credits at a 1× multiple), that absolute payout is 250 credits. However, the gong symbol 2180 is a scatter symbol 2180 that pays a multiple of a player's bet (like an odds payout).

In some embodiments, players may only elect one play option, and one multiplier option during a round of play. In one embodiment, the multiplier is applied to the amount wagered, and the amounts won (excluding progressive pays and scatter pays) and the multiplier elections are not tied to the play option elections. The player can select any play election and any multiplier election from the available options.

In general, the player does not directly select a number of credits wagered, a number of ways that pay, or the specific enhanced bonus symbols to be played. A predetermined set of pays are automatically played, regardless of play election or wager amount, including a minimum wager amount (for example, election 1, 1× multiple) based on the play option selected.

In 88 FORTUNES™, all pays are played regardless of wager amount. This "all-up" feature may be applied to one or more of base game play, bonus play, free play, or other plays. However, there may be other games with special pay lines dedicated to bonus play.

In some embodiments, if a certain reel "all-way" combination can result in more than one pay, only the highest pay is counted. For example, within a 5 matching symbol outcome, there is a 3 matching symbol and a 2 matching symbol outcome. Only the highest pay counts, i.e., 5 matching symbols. The pays are summed, and all the pays are multiplied by the multiplier selected by the player at the beginning of game play to calculate a payout.

When a player election results in play using certain enhanced value symbols, The reel strips will include enhanced value symbols rather than regular special standard game symbols, depending on the play election. Moreover, the number and position of enhanced value symbols relative to their corresponding enhanced value symbols may be different. As a result, each play option may be a completely different game (just with the same rules) offering a different style of play experience. The number and position of all symbols may be different between play elections.

The number and position of any and all symbols may also be different between credit multiplier elections. Conversely, the position of all symbols may be the same except for enhanced symbols replacing their corresponding equivalent in some play elections. As a non-limiting example, suppose the player makes play election 2. The following enhanced value symbols and special standard game symbols are available during play: gold coin, gold ingot, non-gold turtle, non-gold junk and non-gold phoenix. As long as the player continues to play election 2, the coin and ingot will be available as enhanced value symbols in all play, and the enhanced coin and ingot will be unavailable in all play, qualifying the player for payouts in higher paying paytables associated with the gold symbols being played. The remaining special standard game symbols function similar to the standard symbols.

Each game includes standard symbols (e.g., card symbols A, K, Q, J, 10 and 9). As defined in the paytable of FIG. 23, these standard symbols are all of equal value and under the reel pay scheme they pay (assuming play election 1, 8 units wagered, 1× multiple):

50 for 5-of-a-kind;

10 for 4-of-a-kind; and 5 for 3-of-a-kind.

Multipliers are applied to these payouts if the player selects a multiplier greater than 1×.

To reiterate, some games have four special standard game symbols (ingot, turtle, junk, phoenix). These symbols may appear as normal standard game symbols or enhanced value symbols depending on the game option selected. Normal special standard symbols generate pays that are identical to the standard symbols. In other words, the bonus symbols have equal earning power to standard symbols. However, enhanced value symbols have more earning power, and within the set, different enhanced bonus symbols have different earning capacities. In terms of earning power, the enhanced value coin symbol earns the lowest payout and the enhanced phoenix symbol earns the highest payout. The earning power of the enhanced value symbols is graduated, in the following order (lowest to highest): coin, ingot, turtle, junk and phoenix. In one example of the invention, the gold coin enhanced value symbol does not have a corresponding special standard game symbol.

3. Bonus Features

Some embodiments feature jackpot play. When playing play option 3-5, players are eligible to win one of multiple bonus prizes. In some embodiments, players qualify for eligibility to win a jackpot with play election 2, and qualify for a jackpot selection event from two or more jackpots in play elections 3-5.

Figure 24:
FIG. 24 shows a window indicating different jackpot eligibilities for different paly options that can be selected.

FIG. 24 shows a window indicating different jackpot eligibilities for different play options that can be selected. Jackpots can be non-progressive or progressive. The progressive jackpots can be stand-alone progressives or linked progressives. Unlike many EGM games that require "max bet" wagers to qualify for bonus play, players can qualify for varying levels of bonus play simply by electing one of play options 2-5.

As discussed above, play elections dictate player eligibility to participate in one of four possible bonus prizes (i.e., jackpots), which can be fixed payouts, progressive payouts, or other payouts. In some embodiments, and as shown in FIG. 24, play election 1 does not qualify the player for bonus play. Play election 2 qualifies the player for eligibility to participate in a chance to win the smallest jackpot (MINI jackpot). Players qualify to play for multiple jackpots if the player selects play elections 3-5. Play election 3 allows the player to qualify to win one of two jackpots (MINI jackpot and MINOR jackpot). Play election 4 qualifies the player to win one of three jackpots (MINI jackpot, MINOR jackpot, and MAJOR jackpot). Play election 5 qualifies the player to win one of 4 jackpots (MINI jackpot, MINOR jackpot, MAJOR jackpot and GRAND jackpot). Which jackpot is won when the player is eligible to win two or more jackpots is determined by a separate jackpot selection process, described below. In general, play does not proceed to a jackpot payout or separate jackpot selection event until a "pot explosion" occurs, as discussed below.

In some embodiments, when the player qualifies for multiple jackpots, an algorithm determines which jackpot is won. In some 88 FORTUNES™ embodiments, the probabilities are weighted, with the smaller jackpots having higher hit frequencies than the larger jackpots. In other embodiments, the probabilities are not weighted.

According to one embodiment, when the player makes the play election, the player cannot select which specific gold symbols are to be played. The player only selects the play option and a multiplier. The play election dictates which symbols remain as special standard game symbols and which are enhanced value symbols. The play election also dictates which jackpots the player is eligible to win. The table below shows a combination of the bonus symbols that are enhanced in combination with the eligible jackpots for each play election.

| Play Election | Enhanced Symbols | jackpots |
|---|---|---|
| Election 1 | 1 gold symbol (coin) | none |
| Election 2 | 2 gold symbols (coin, ingot) | mini |
| Election 3 | 3 gold symbols (coin, ingot, turtle) | mini, minor |
| Election 4 | 4 gold symbols (coin, ingot, turtle, junk) | mini, minor, major |
| Election 5 | 5 gold symbols (coin, ingot, turtle, junk, phoenix) | mini, minor, major, grand |

Fu symbols 2190 can, but do not always, trigger a bonus event. In some embodiments, a Fu symbol 2190 must appear on reels 2, 3 or 4 for a jackpot event to commence. However, along with a jackpot event triggered by a Fu symbol 2190, in one embodiment, the pot must also explode. The pot does not explode unless a Fu symbol is present, but a Fu symbol can appear without the pot exploding. Fu symbols can also substitute for any game symbol. In some embodiments, more Fu symbols appear on the reel strips if the player makes a higher play election (e.g., the 5th election will generally trigger more Fu symbols to be available). In one embodiment, a gold Fu symbol doubles the payouts.

In one embodiment, the number of Fu symbols available on the reel strips for electing play options 1-4 is the same. In other embodiments, the number of Fu symbols available increases with the play election.

Generally, in non-progressive versions of the game, the bonus payouts are more frequent, so more Fu symbols are available on the reel strips compared to the reel strips used in progressive forms of the game. However, some embodiments may adjust the chance of a bonus without adjusting the number of Fu symbols.

When a single wild Fu symbol appears on the 3×5 game outcome matrix, a jackpot event may or may not be triggered. The game election determines which jackpot events the player is eligible to play, if the jackpot play is triggered.

For progressive forms of the game, four jackpot meters, each with a different jackpot amount may be displayed on the player screen. In non-progressive forms of the game, the player is generally only awarded a fixed payout (or payout times a multiple) according to a posted paytable. Generally, when the player selects higher level elections, the number of higher paying symbols on the reel strips increases. There are different reel symbol sets for each of the 1 to 5 selected play options, each with increasing payout potential.

In non-progressive forms of the game, when the player qualifies for more than one jackpot, there can be an equal chance to win all four jackpots when the jackpot event is triggered. In other forms of the game, such as embodiments of the 88 FORTUNES™ game, the chances of winning each pot can vary according to an algorithm or bonus feature that weights the outcomes. The determination is still randomly made, even though the outcomes are weighted.

In some embodiments, if two Fu symbols appear on the reel array in one game outcome, or the player is playing with a 2× multiple, the chance that a Fu symbol will cause the jackpot to explode is doubled. This chance scales similarly for more than two Fu symbols as well as higher multipliers than 2×. For example, three Fu symbols landing in the matrix at 10× has 30 times the chance of causing the pot to explode as 1 Fu symbol landing in the matrix at 1×.

In some embodiments, and within a play option, the chances of winning may scale linearly with amounts wagered. If the player, for example, has elected play option 2 and has selected a 3× multiple, that player has 3× the chance of winning the jackpot compared to a player who is playing at play option 2 with a 1× multiple. When a player elects play option 3, for example, he qualifies to win the MINI jackpot and the MINOR jackpot. The player will only win one of the two jackpots. The actual jackpot won may be determined randomly, pseudo-randomly, or be pre-determined. In addition, not every occurrence of a Fu symbol will result in a jackpot trigger. The pot must explode as a condition precedent to advancing to jackpot play.

In more detail, different numbers of Fu symbols may appear on the reels for each play option. The chance that a single Fu landing will trigger a jackpot while playing at 1× is called the base trigger probability. The base trigger probability is usually different for every play option. Below is the base trigger probabilities for one embodiment of 88 FORTUNES™

| options (Gold Symbols) | X | | Y |
|---|---|---|---|
| Election 5 - 5 Gold | 208 | in | 20069 |
| Election 5 - 4 Gold | 697 | in | 72778 |
| Election 5 - 3 Gold | 526 | in | 98283 |
| Election 5 - 2 Gold | 369 | in | 145556 |

In this embodiment, the base trigger probabilities were chosen so that the average turnover per jackpot would be approximately the same across all eligible play options. This selection means the chance of winning a jackpot scales linearly with bets across the eligible play options.

The base trigger probability is multiplied by the number of Fu symbols that land in a displayed position (i.e., twice the chance for two Fu symbols, no chance with no Fu symbols). The base trigger probability is also multiplied by the credit multiplier (i.e., ten times the chance when playing at 10×). Thus, the credit multiplier also causes the jackpot to scale linearly within play options. These two multipliers for the trigger probability compound to determine a final trigger probability (e.g., if three Fu symbols land while playing 10×, then the trigger probability is the base trigger probability times 3 times 10, which is times 30). In some embodiments, the jackpot is non-progressive and the credit multiplier increases the size of the jackpot rather than the jackpot chance.

In another embodiment, rather than a single chance per play of triggering a jackpot, the player can get multiple chances (and can theoretically win multiple jackpots). Either (or both) of the above multipliers for the trigger probabilities could increase the trigger attempts instead of the probability an attempt will work (i.e., two Fu symbols landing means two chances at triggering rather than a single chance with double the probability).

In another embodiment, both multipliers could scale non-linearly. For example, a reward for betting the maximum 10× is 15 times the chance of triggering the jackpot but other multipliers scale as in the previously discussed embodiments. In other words, getting Fu symbols in certain combinations or positions gives you different win probabilities in a manner similar to the symbol paytable.

In still another embodiment, the base triggers probability could be made different for every possible play option and credit multiplier such that none of the combinations scale linearly.

4. Bonus Animations

Figure 25:
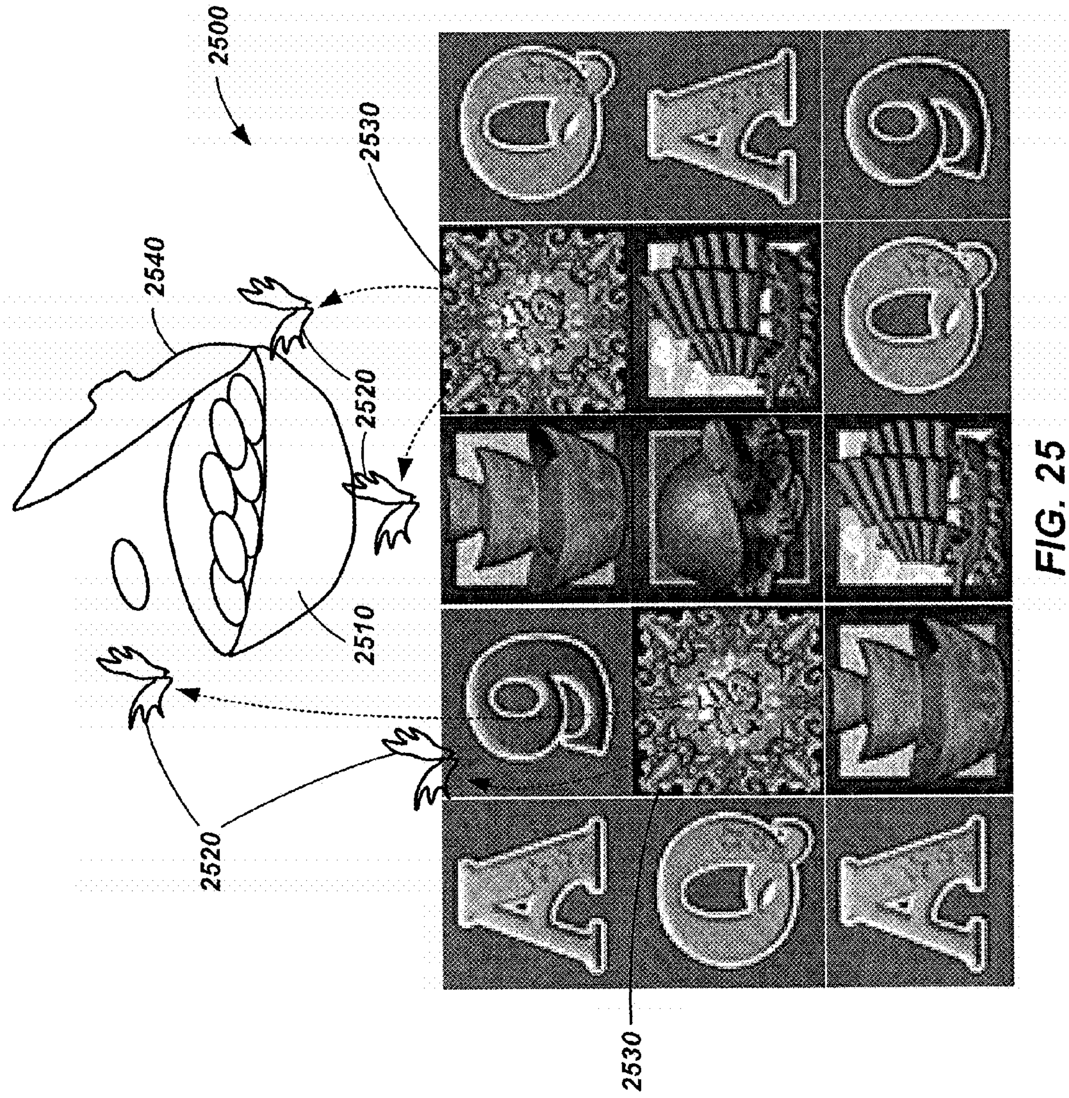
FIG. 25 shows a window illustrating an animation of a jackpot accumulator and an animation of a jackpot expander.

FIG. 25 shows a window 2500 illustrating an animation of a jackpot accumulator 2510 and an animation of a jackpot expander 2520. In some embodiments, the jackpot accumulator 2510 may be shown graphically on the player display as an animation of a bowl 2510. The bowl 2510 may be thought of as a type of meter that may or may not fill in different versions of the game, for regulatory reasons.

Whenever a Fu symbol 2530 appears somewhere on the 3×5 matrix of displayed positions, an animation of a jackpot expander 2520 may be triggered. In some embodiments, the jackpot expander 2520 may be configured as "Fu bats" 2520 that fly from the Fu symbol 2530 to the bowl 2510. As the Fu bats 2520 near the bowl 2510, they turn into gold coins, which drop into the bowl 2510 and the bowl 2510 gradually fills. These gold coins are different from and should not be confused with the enhanced value symbol that may appear as a coin that is gold in the 3×5 matrix of symbols. As the bowl 2510 fills, it indicates to the player the jackpot may be ripe in time to hit. The Fu Bat animations may or may not accompany winning pays in the base game.

When the player selects a play election that uses more enhanced value symbols, such as Election 5, more Fu bats 2520 fly into the bowl 2510 for a particular Fu symbol appearing as compared to when the player selects a lower play election. As a result, the bowl 2510 generally fills faster for the higher play elections. In other words, there is a correspondence between the number of Fu Bats 2510 flying and the wager amounts. Player selections of higher betting multiples also result in more Fu bats 2520 flying into the bowl 2510 per win. For example, when the player makes play election 5, which determines that all five enhanced bonus symbols are played, the player bets 88 credits, and selects a 1× multiple, five Fu bats 2520 fly into the bowl 2510 for each Fu symbol 2530 that appears on the matrix. When the player has elected play election 5, and a 10× multiple, twelve Fu bats 2520 fly into the bowl 2510 for each Fu symbol 2530 that appears on the matrix. In other words, the number of Fu bats 2520 that fly is scaled to the wager level, but not necessarily linearly. In other embodiments, the number of Fu bats 2520 does not correspond with wager amount.

The number of animated Fu bats 2520 may increase with the size of the player's bet if the player is eligible for jackpots. As a non-limiting example, a player selecting a play option to play 5 gold symbols at 1× will see less bats than a player selecting a play option to play 2 gold symbols at 10×. The table below shows an example of number of Fu bats 2520 for one particular embodiment.

| | | Selected Multiple/# of Fu Bats | | | | |
|---|---|---|---|---|---|---|
| option | (credits) | ×1 | ×2 | ×3 | ×6 | ×10 |
| 5 | 88 | 5 | 6 | 7 | 9 | 12 |
| 4 | 68 | 3 | 6 | 7 | 8 | 10 |
| 3 | 38 | 2 | 3 | 5 | 7 | 8 |
| 2 | 18 | 1 | 2 | 3 | 5 | 6 |

In one embodiment, the bowl is filled in increments. When the player qualifies for only one jackpot, the jackpot is awarded after the bowl explodes. If the player qualifies for multiple jackpots, the game advances to a bonus event that includes a 12-coin display each of which may reveal up to 4 types of Fu babies, one for each of four possible bonuses. The number of different Fu Baby types that are incorporated into the event corresponds to the number of jackpots the player qualifies to win.

In one embodiment of the bonus event, the player selects coins, which reveals a concealed Fu Baby. After three babies of the same type are selected, a payout is awarded that corresponds to the bonus event assigned to the Once the player advances to the 12-coin display, a bonus award is guaranteed. The display only functions to select which bonus will be paid, based on the eligibility of the player. The outcome of the bonus event is randomly determined. Similarly, the result of the coin feature is not predetermined in any way and is the result of multiple random events. For example, if the four babies are B1, B2, B3 and B4 and the player selects B2, then B1, then B1, then B3, then B1, the player is awarded jackpot 1, corresponding to B1.

The jackpot expander 2520 may be shown and animated in other ways. As non-limiting examples, the number of Fu bats 2520 flying may scale with jackpot chance, total bet, or credit multiplier. The jackpot expander 2520 may be presented as different objects, such as teleporting coins rather than flying bats. The Fu bats 2520 may have different representations, such as, for example, bats carrying different denominations of coins. In addition, the bowl 2510 may be configured to only increment when a Fu bat 2520 flies.

With respect to the jackpot accumulator 2510, there is some correlation between the fill level of coins in the bowl 2510 and the timing of when the jackpot hits. Players might believe there is a direct connection, so play generally increases when the bowl 2510 begins to look full. The display is merely suggestive of how close a jackpot is to hitting (i.e., turning). The display may not be completely accurate, but it is suggestive. An algorithm determines when the jackpot randomly or pseudo-randomly turns.

In some embodiments, when a predetermined number of Fu bats 2520 fly into the bowl 2510, the level of the bowl 2510 increments. In such embodiments, ten incremental levels of coins in the bowl 2510 may be displayed. More often than not, a high fill level indicates the jackpot will hit. But sometimes this indication can be a false indication.

In some embodiments, the more credits that are being wagered, the faster the jackpot grows, and the sooner the bowl 2510 fills. The appearance of a filled bowl 2510 is some indication the pot is likely to hit.

As one more specific, but non-limiting example, every time a Fu symbol 2530 lands, the game logic checks to see if the bowl 2510 should fill to another level. The game does this by checking for turnover since the last jackpot awarded on the machine and compares to a table indicating fill level. This fill level roughly corresponds to the number of Fu bats 2520 that flew into the bowl 2510. However, the correspondence is only because the number of Fu bats 2520 roughly corresponds to turnover since the last jackpot. If a player is particularly unlucky, the player could fill the bowl 2510 completely with only one Fu bat 2520.

Thus, the filled state of the bowl 2510 is not a reliable indication of the size of the jackpots. Because the bowl 2510 may be a link to other machines, another machine could have just won the jackpot while a particular player's machine is showing a bowl 2510 filled to the brim.

The filled state of the bowl 2510 has little or no bearing on the chance of a jackpot being awarded (which generally never changes). The turnover required for each fill level may be calculated on a logarithmic scale such that the machine will spend an equal amount of time in each filled state if played at a constant rate. In other words, the bowl 2510 begins to fill fast and slows down at the end.

There may be a number of alternate implementations for the jackpot accumulator 2510. As some non-limiting examples, the level of coins in the bowl 2510 may reflect the actual size of the jackpots rather than the turnover since an award, and the bowl 2510 may represent the turnover since anyone on the link won a jackpot. As other non-limiting examples, there may be a separate bowl 2510 for every jackpot level, the bowl 2510 may fill on a non-logarithmic scale, the bowl 2510 may fill smoothly rather in set stages, and the chance of a jackpot win may be reflected by fill size.

Another example is that every Fu-bat represents a fixed chance of triggering a jackpot, (e.g., 1% for each bat). This could be calculated cumulatively (e.g., 10% for 10 bats) or separately. There could be multiple types of bats each with a different probability (e.g., gold bat is 5%) filling the bowl with different speeds.

Other presentations may be used for the animation of the jackpot accumulator, such as, for example, a color change instead of filling a meter, gauge, thermometer of even a cat getting fatter. There may be a maximum jackpot size (as in mystery jackpots) and the top filled state may represent this level. In such a case, the chance of triggering would increase as the maximum fill state approached.

When the algorithm determines a jackpot will turn, a Fu symbol may appear on the matrix, and the bowl 2510 may explode, indicating the player has won a jackpot or qualified for a jackpot level selection event. The bowl explosion may be animated with a lid 2540 that is placed on the bowl 2510, and then the bowl 2510 explodes. If the player made play election 2, the player is eligible to win only one jackpot and the jackpot payout is revealed directly. If the player makes play election 3, 4 or 5, the player is eligible to win two or more jackpots.

In some embodiments, the feature that reveals which jackpot has been won is referred to as a "gold coin" feature. The gold coins in the gold coin feature are different from and should not be confused with cold coins that fall in the bowl 2510 or the enhanced value symbol that may appear as a coin that is gold in the 3×5 matrix of symbols. The jackpot selection is preferably determined by an algorithm that uses weighted probabilities such that the higher value bonuses occur less frequently than the lower value bonuses.

Figure 26:
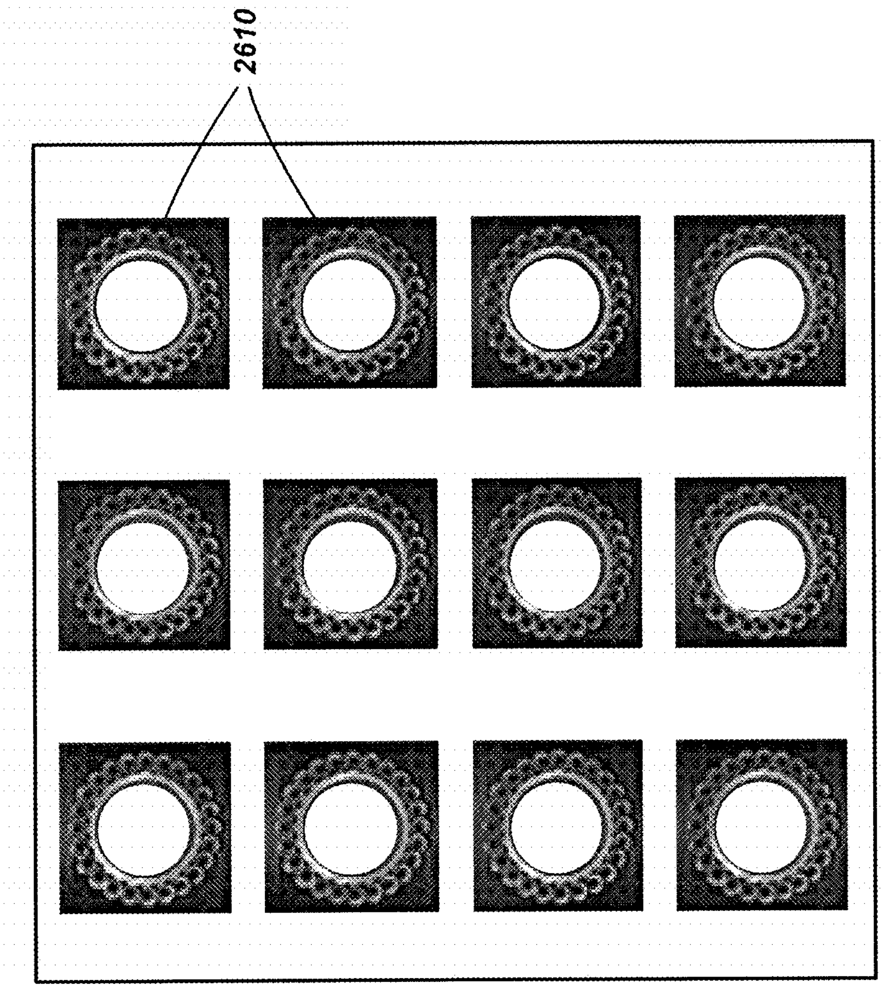
FIG. 26 shows a matrix of gold coins used in a jackpot selection process.

FIG. 26 shows a matrix of gold coins 2610 used in a jackpot selection process. In some embodiments the jackpot selection process may be referred to as the gold coin feature. After the pot explodes, for play election 3, 4 or 5 a new screen is displayed revealing twelve gold coins 2610 as covering symbols. Players are instructed to pick coins by touching coins on a touchscreen to reveal jackpot indicator symbols. In some embodiments, these jackpot indicator symbols may be displayed as Fu Babies. There are four types of Fu Babies, one for each type of jackpot.

Figure 27:
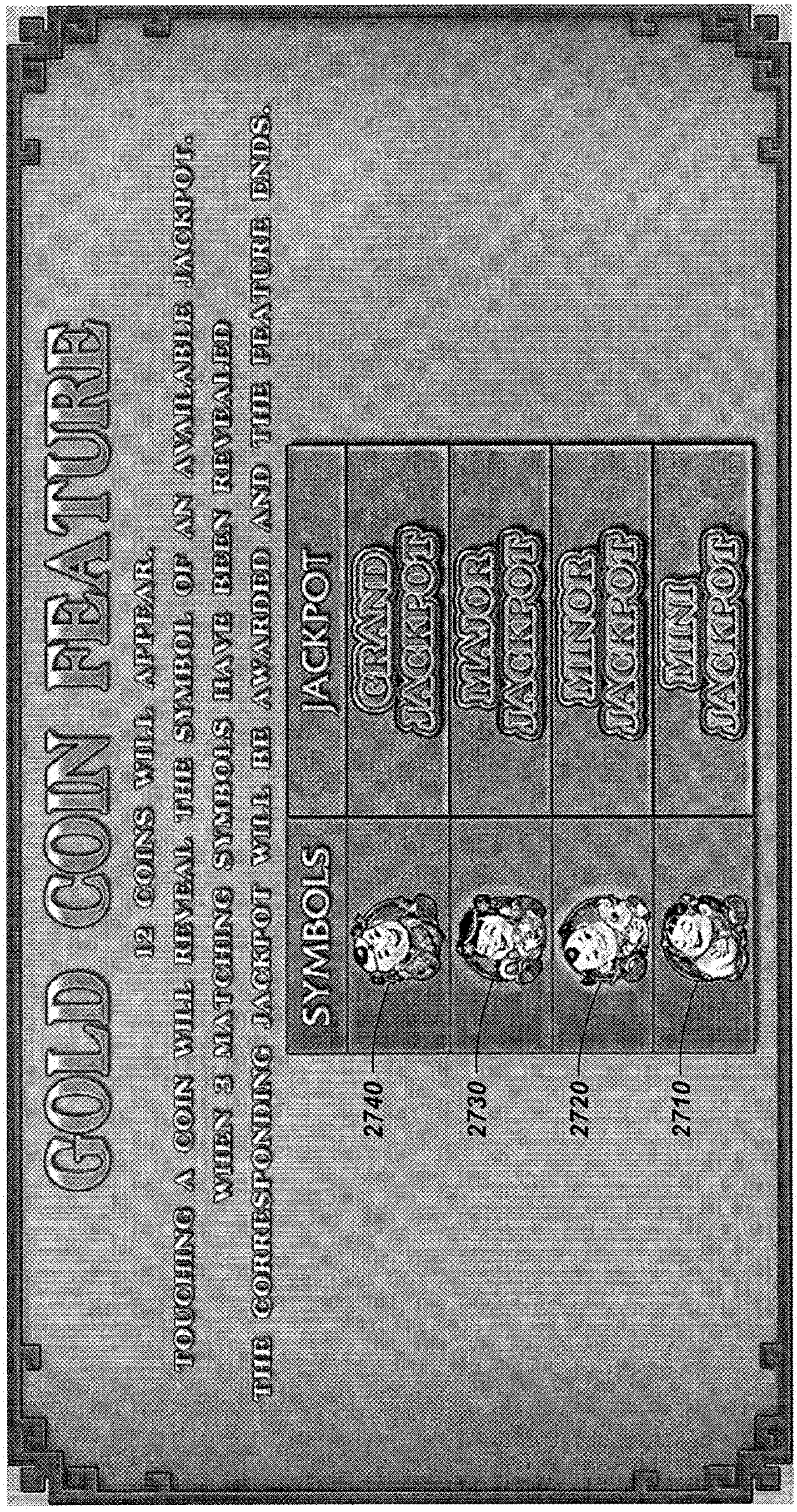
FIG. 27 shows different Fu babies associated with each type of jackpot.

FIG. 27 show different Fu Babies 2710, 2720, 2730, and 2740 associated with each type of jackpot. One Fu Baby is hidden behind each coin. Only the Fu babies that correspond with an eligible jackpot are concealed behind the gold coins 2610. For example, if the player elected play 3, only the Fu Babies corresponding to the two smallest jackpots (MINI and MINOR) appear behind the gold coins 2610. The player then touches gold coins 2610 to reveal the Fu Babies. When three identical Fu Babies are revealed by the player, the jackpot that corresponds to the matching Fu Baby triplets determines which jackpot is won. The Fu Baby symbols only appear in certain predetermined play options. Therefore, they are a type of bonus symbol (like the gold symbols). In some embodiments, the symbols associated with a play option may only appear in a bonus feature. The Fu Baby symbols that are active are indicated in the meter at the top right of the screen with the other enhanced symbols.

In the progressive form of the game, there may be a different probability of winning a jackpot with each play option. For example, the chance a MINI jackpot will be awarded per play option may be defined as:

| | Play option: | | | | |
|---|---|---|---|---|---|
| | 1 | 2 | 3 | 4 | 5 |
| Chances of a win | 0% | 100% | 85% | 78% | 74% |

Note, the player is generally not eligible to win a jackpot if the player elected play option 1. In this example, the win probability does not scale linearly with play option. The point of the above table is that while a player's chance of getting a jackpot may vary linearly, the chance of winning a specific level may not. In other words, the chance of winning a MINI jackpot per credit bet goes down as the bet increases because other jackpots become available.

Players cannot win a jackpot for which they did not qualify. If, for example, a player selected play election 4, the player only qualifies for the MINI, MINOR, and MAJOR jackpots. The Fu Baby 2740 associated with the GRAND jackpot will not be present behind a gold coin 2610. Revelation of the type, number, and order of Fu babies may be made randomly, or may be predetermined. Once play has commenced to the gold coin feature, a jackpot win of some kind is guaranteed.

There may be many options in configuring a game. In some forms of the game, the number of coins going into the bowl does not change, and there are no Fu bat animations. In other non-progressive examples, there is no bowl indicator. In yet other embodiments, Fu Bats and bowls may appear, but the level in the bowl does not change. In progressive forms of the game, there can be a rough correlation between the percentage filled level of the pot and the jackpot turnover. In other forms, it can show in rough increments (i.e., 10% increments) increasing fill levels. Even though a jackpot may reach its theoretical turnover point, the jackpot event is randomly determined. As a result, the graphical depiction is not always a reliable indicator that a jackpot is ripe for a hit.

5. Gamble Option

In some embodiments, for all wins except for progressive wins, the player can risk the final amounts won by wagering the entire amount on the occurrence of either a black or a red card dealt. If the player selects the right color, the player payout is doubled. If the player chooses the wrong color, the entire payout is lost. The player can also wager on the suit of the card dealt. There are four suits. If the player selects the correct suit the player is paid 4× the payout. If the player selects an outcome that does not occur, the payout is lost. Players can repeat the gamble feature multiple times if they win. In some embodiments, there is a maximum number of times a player can sequentially activate the game feature.

6. Other Features

In some embodiments, the credit amounts corresponding to each play option were carefully selected. One consideration is whether there are certain unlucky numbers. The minimum wagers in one embodiment were selected to minimize the display of unlucky number four. The credit amounts in some embodiments were selected based on the sound of the numbers when pronounced. Consideration of the amounts selected also included what players are willing to wager in one game event. The amounts reflect what players are willing to tolerate in terms of increasing credit amounts. Many subjective factors have gone into the selection of credits per play option. The resulting game has great appeal to players, in part because of the credit number selections made.

For one embodiment, the table below shows what the credits are that can be wagered in one spin.

CREDITS WAGERED-Linked Progressive version

| Credits | TOTAL CREDITS | | | | |
|---|---|---|---|---|---|
| Multiple | 1x | 2x | 3x | 6x | 10x |
| 8 | 8 | 16 | 24 | 48 | 80 |
| 18 | 18 | 36 | 54 | 108 | 180 |
| 38 | 38 | 76 | 114 | 228 | 380 |
| 68 | 68 | 136 | 204 | 408 | 680 |
| 88 | 88 | 176 | 264 | 528 | 880 |

If the number 4 is considered an unlucky number, the player can completely avoid seeing the number on the credits wagered meter by choosing 1×, 2× or 10× multiples. The credit wager amounts associated with each play election are designed to minimize the number of 4's appearing in a wager amount made.

All standard symbols pay 50, 10 or 5 credits for 5, 4 or 3 of a kind, left to right at a 1× multiple. Standard pays for the credits wagered in the table above would be:

Payouts for 3 Matching Standard Symbols (5 credits)
Amt. Wagered/Multiples
Base Wager Multiple

| | 1x | 2x | 3x | 6x | 10x |
|---|---|---|---|---|---|
| 8 | 5 | 10 | 15 | 30 | 50 |
| 18 | 5 | 10 | 15 | 30 | 50 |
| 38 | 5 | 10 | 15 | 30 | 50 |
| 68 | 5 | 10 | 15 | 30 | 50 |
| 88 | 5 | 10 | 15 | 30 | 50 |

As can be seen from the above table, when playing with standard symbols or special standard game symbols, the pays do not increase with increasing play options and corresponding wager amounts. Payouts increase in proportion to the selected multiple, but the payouts are less than the amounts wagered in all cases.

6. Substitute Multiplier Symbol

Figure 28:
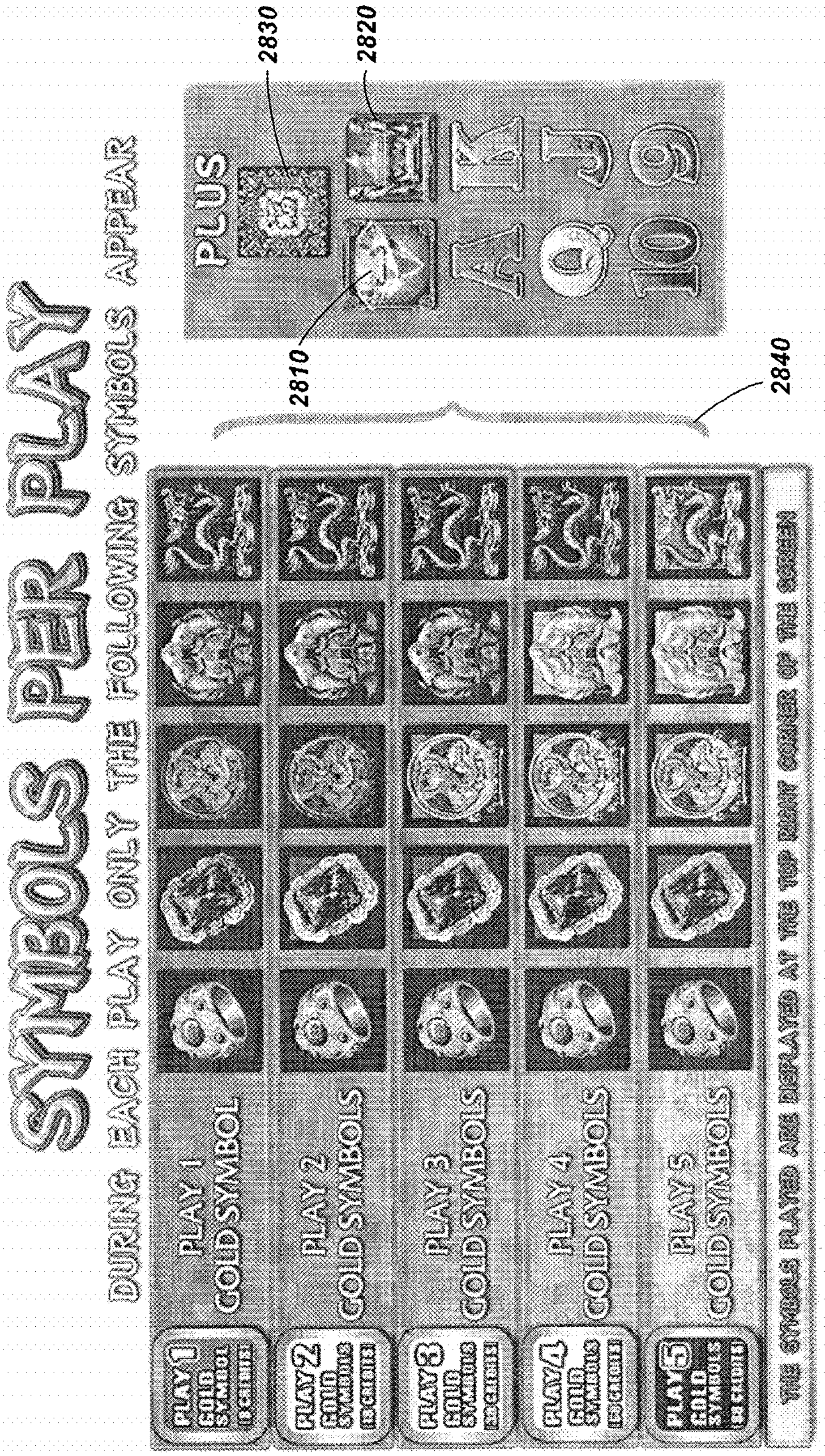
FIG. 28 shows symbols available for game play in one embodiment of the present disclosure that uses a substitute multiplier symbol.

FIG. 28 shows symbols available for game play in one embodiment of the present disclosure that uses a substitute multiplier symbol 2810. Although different symbols are used, the special standard game symbols shown in five-by-five matrix 2840 on the left portion of the screen function similarly to the special standard game symbols discussed above with reference to FIG. 21. As with the embodiment of FIG. 21, the special standard game symbols of FIG. 28 may be configured as an enhanced value symbol wherein the enhanced paytables may replace the paytable corresponding to the standard game symbols and special standard game symbols.

As stated earlier, the enhanced value symbols logically constitute additional game symbols with corresponding special standard game symbols. The enhanced value symbols can be thought of as following a theme in terms of their selection between an enhanced and unenhanced state, according to the particular play option selected. In this manner, the same theme can be maintained between different play options to provide the players with the experience that they are playing the same game, regardless of the particular game option selected, but, in reality, each game play option involves a different bonusing scheme (and thus player experience between the play options) that arises from effectively playing a different game in each play option.

In some embodiments, a scatter symbol 2820 may be included as part of the game design. This scatter symbol 2820 may be configured to function in a manner similar to the gong symbol 2180 in FIG. 21. As a non-limiting example, games may be configured such that the scatter symbol 2820 pays 50:1 for 5 scatter symbols 2820, 10:1 for 4 scatter symbols 2820, and 5:1 for 3 scatter symbols 2820 in a scatter arrangement, left to right. Additional details for the scatter symbol 2820 may be found above in the discussion of FIG. 21 and the gong symbol 2180.

Some embodiments may include a "Fu symbol" 2830 as a wild symbol as well as a trigger symbol 2830. The Fu symbol 2830 may be considered as wild (i.e., matching any symbol) in various reel way combinations. The Fu symbol 2830, when appearing on the 3×5 matrix of displayed symbols, may trigger an animation of Fu Bats that fly from the Fu symbol 2830 to a bowl that retains a collection of gold coins. As the Fu Bats fly into the bowl, the bats turn into gold coins. Additional details of this animation are discussed above with reference to FIGS. 24 and 25. In addition, it is not necessary for the Fu symbol 2830 to be part of a paying combination to trigger the Fu Bat animation. This animation may occur when the Fu symbol 2830 appears, regardless of whether or not it is associated with a paying combination in a regular game play. Additional details for the Fu symbol 2830 may be found above in the discussion of FIGS. 21-25.

The substitute multiplier symbol 2810 is illustrated as a diamond symbol 2810 as one example of a symbol that might be used for the substitute multiplier symbol 2810. The substitute multiplier symbol 2810 may function as a wild symbol. When configured as a wild symbol, the substitute multiplier symbol 2810 acts in a "wild" manner wherein it may have additional functions, such as, for example, substituting for other symbols, functioning as a condition necessary to trigger a bonus payout or bonus selection event, and triggering a Fu Bat animation.

The substitute multiplier symbol 2810 may also be configured to function as a payout multiplier. This payout multiplier is different from the multipliers discussed above. The multipliers discussed above define a multiplier for the number of credits wagered. The substitute multiplier symbol 2810 defines a multiplier for how much the payout will be.

Figure 29:
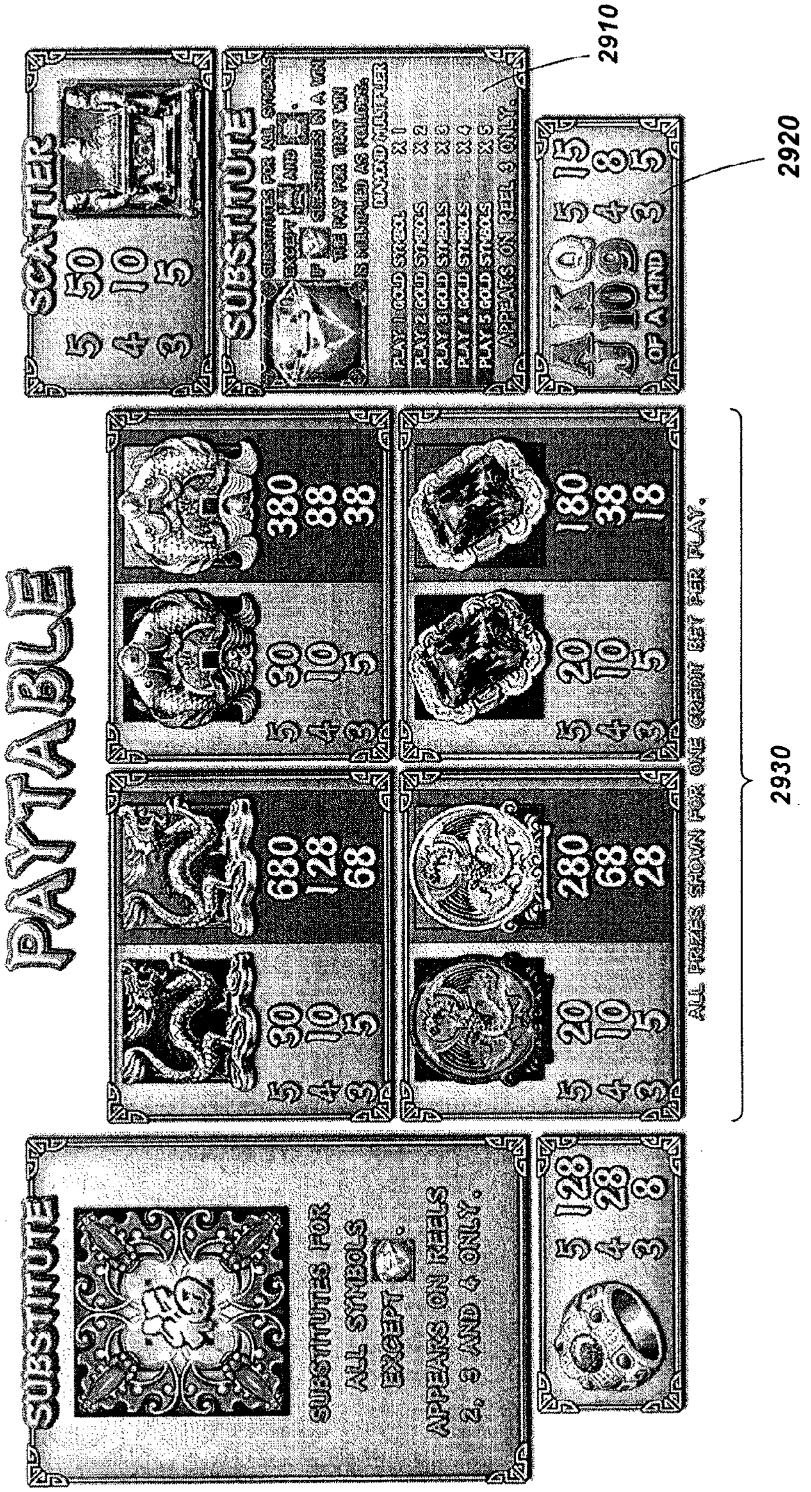
FIG. 29 shows a paytable for one embodiment with payout ratios for standard symbols, bonus symbols, enhanced bonus symbols, scatter symbols, wild symbols, enhanced wild symbols, and a substitute multiplier symbol.

FIG. 29 shows a paytable for one embodiment with payout ratios for standard symbols, bonus symbols, enhanced bonus symbols, scatter symbols, wild symbols, and the substitute multiplier symbol 2810. A paytable section 2910 shows payout and wild functions for the substitute multiplier symbol 2810 in this specific embodiment. Except for paytable section 2910, this paytable is similar in function to the paytable illustrated in FIG. 23.

Each game includes standard symbols (e.g., card symbols A, K, Q, J, 10 and 9) as shown in paytable section 2920. These standard symbols are all of equal value. Some games have four special standard game symbols as illustrated in paytable section 2930. These symbols may appear as normal standard game symbols or enhanced value symbols (e.g., displayed as gold symbols) depending on the game option selected. Normal special standard symbols generate pays that are identical to the standard symbols. Enhanced value symbols have more earning power, and within the set, different enhanced bonus symbols have different earning capacities. Additional details for the paytable in FIG. 29 may be found by referring to the description of similar functions and symbols for the paytable of FIG. 23.

The paytable section 2910 defines wild functions for the substitute multiplier symbol 2810 in this specific embodiment. As a non-limiting example, the substitute multiplier symbol 2810 will substitute (i.e., act as a wild symbol) for all symbols except the scatter symbol 2820 and the Fu symbol 2830.

The paytable section 2910 also defines multiplier functions for the substitute multiplier symbol 2810 in this specific embodiment. As a non-limiting example for this particular paytable, the substitute multiplier symbol 2810 will cause the payout for wins that include the substitute multiplier symbol 2810 to be multiplied by 1×, 2×, . . . , 5× based on the selected play option of 1, 2, . . . , 5 gold symbols.

Figure 30A:
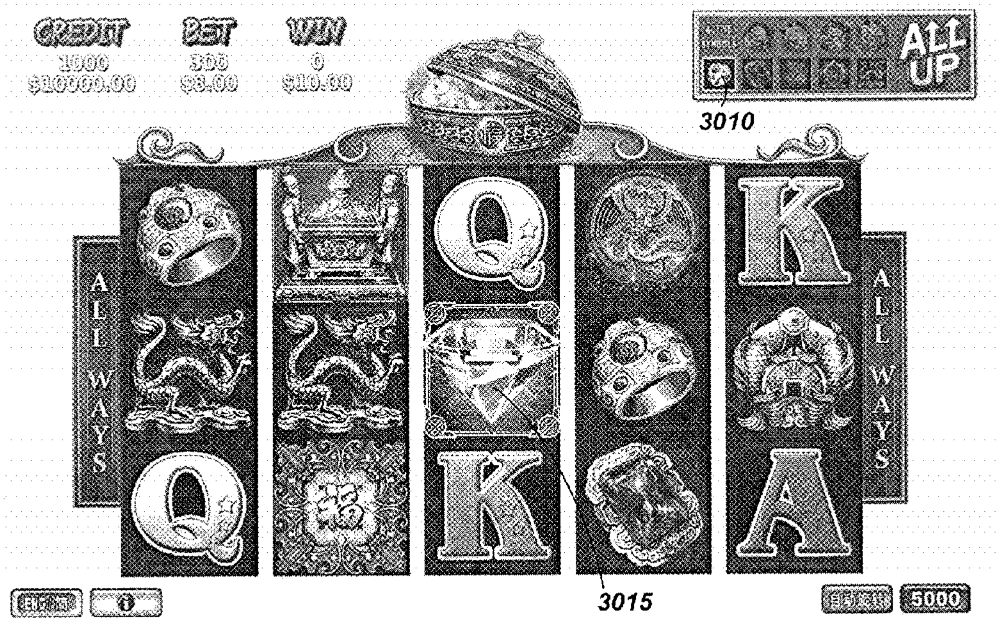
FIGS. 30A-30D show game play results when various numbers of play options are selected.

FIGS. 30A-30D show game play results when various numbers of play options are selected. FIG. 30A shows the selected play option 3010 as one gold symbol. As a result, when the substitute multiplier symbol 3015 appears at a final displayed position, the payout is multiplied by a multiple of one.

Figure 30B:
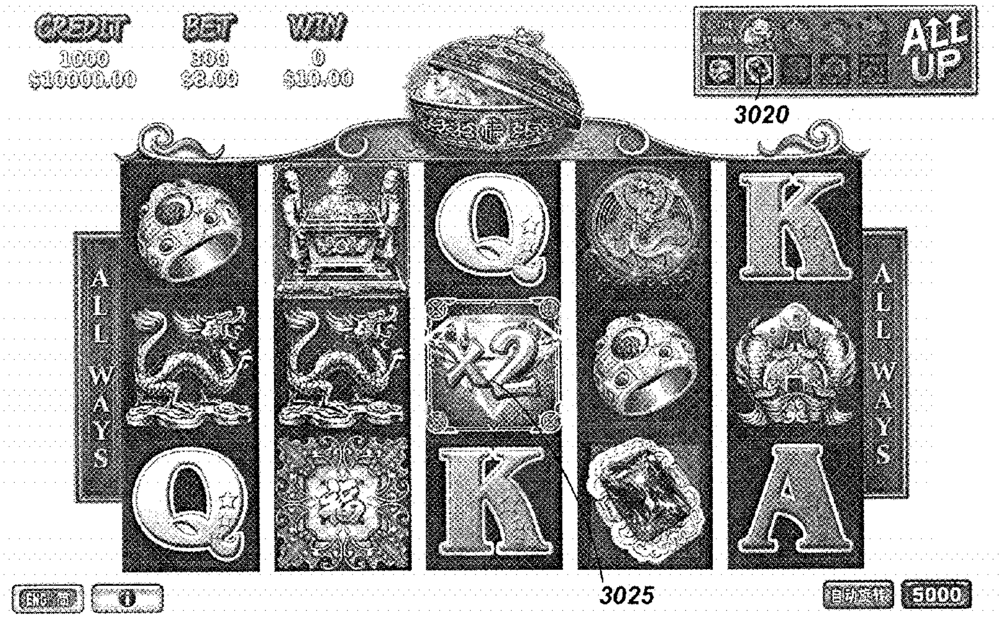

FIG. 30B shows the selected play option 3020 as two gold symbols. As a result, when the substitute multiplier symbol 3025 appears at a final displayed position, the payout is multiplied by a multiple of two.

Figure 30C:
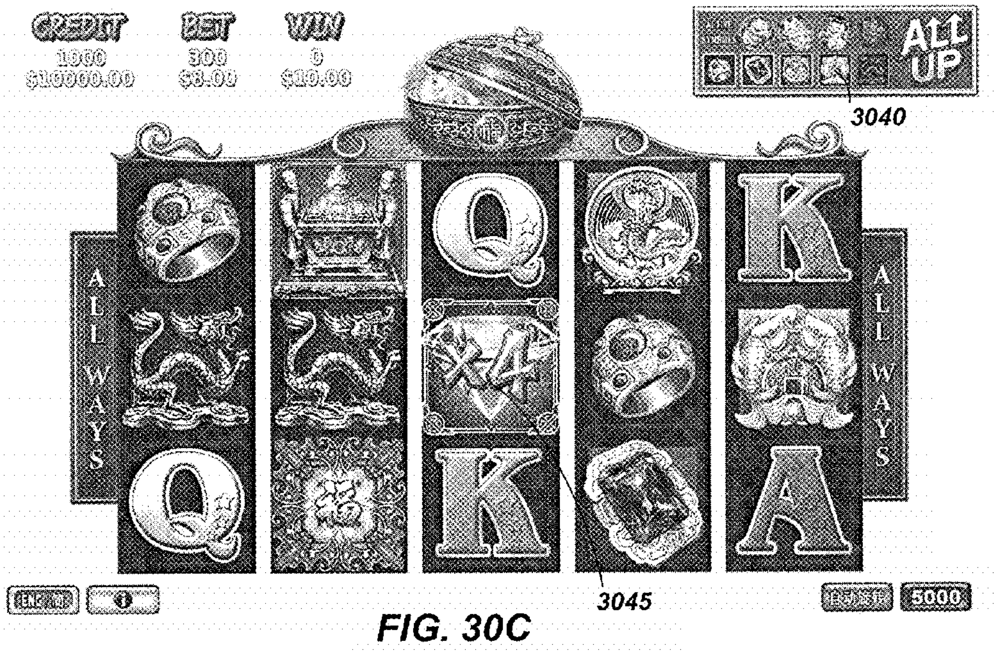

FIG. 30C shows the selected play option 3040 as four gold symbols. As a result, when the substitute multiplier symbol 3045 appears at a final displayed position, the payout is multiplied by a multiple of four.

Figure 30D:
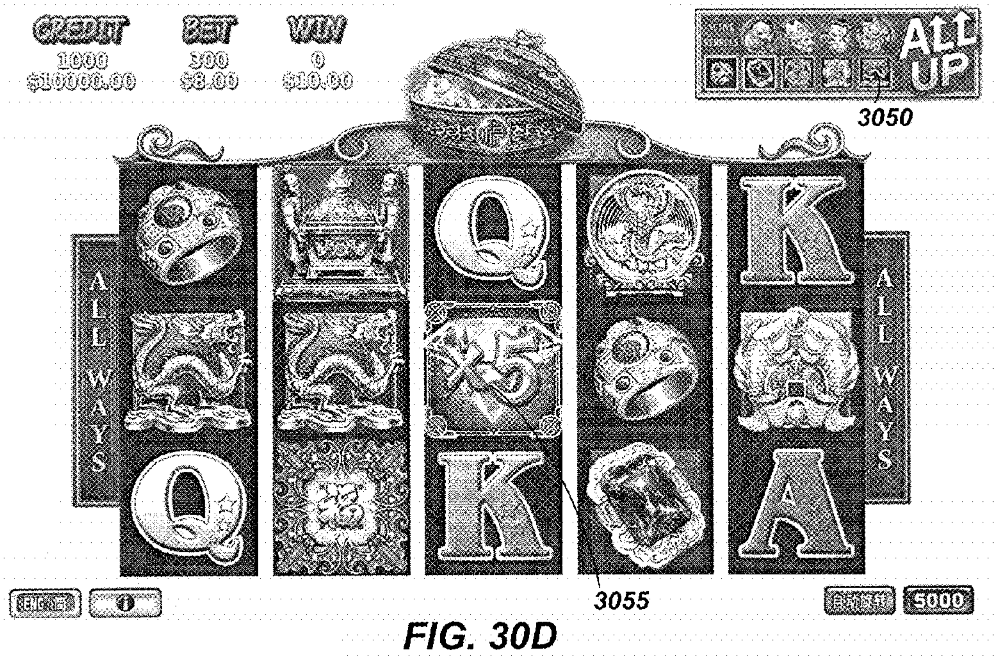

FIG. 30D shows the selected play option 3050 as five gold symbols. As a result, when the substitute multiplier symbol 3055 appears at a final displayed position, the payout is multiplied by a multiple of five.

A selected play option of three gold symbols is not shown in the figures, but is similar to those of FIGS. 30A-30D except using three gold symbols and a payout multiple of three.

Figure 31:
FIG. 31 shows a window indicating free plays that may be awarded responsive to a proper combination of scatter symbols and allowing additional substitute multiplier symbols.

FIG. 31 shows a window indicating free plays that may be awarded responsive to a proper combination of scatter symbols and allowing additional substitute multiplier symbols 2810. Function of the free plays is similar to that discussed above with reference to FIG. 22 except that additional substitute multiplier symbols 2810 may appear during the free plays.

While particular embodiments of this invention have been described, it will be evident to those skilled in the art that the present invention may be embodied in other specific forms without departing from the essential characteristics thereof. The present embodiments and examples are, therefore, to be considered in all respects as illustrative and not restrictive, and all modifications that would be obvious to those skilled in the art are, therefore, intended to be embraced therein.

It will be understood that the invention disclosed and defined herein extends to all alternative combinations of two or more of the individual features mentioned or evident from the text. All of these different combinations constitute various alternative aspects of the invention.

What is claimed is:

1. A method of operating a gaming system, the gaming system including an electronic gaming machine having a processor primarily dedicated to playing at least one casino wagering game on a game display, the electronic gaming machine further including an electronic display device and at least one input device, the method comprising:

detecting, via the at least one input device, a physical item associated with a monetary value that establishes a credit balance;

displaying an electronic reel simulation of a wagering game on the game display, the electronic reel simulation including a multiple reel array;

accepting a user input, via the at least one input device, indicating a selected play option from a plurality of play options based on a wager amount, wherein all play options of the plurality of play options enable all displayed positions of the multiple reel array to be considered in winning outcomes;

initiating the casino wagering game in response to an input indicative of a wager covered by the credit balance;

determining, by the processor, a game outcome and causing the game outcome to be presented on the game display, the game outcome comprising a plurality of game symbols for the displayed positions of the multiple reel array;

determining, by the processor, if one or more winning combinations of the game symbols is presented on the game display, wherein a number of possible winning combinations is fixed across all play options;

determining, by the processor, a payout responsive to the one or more winning combinations and an appearance of a substitute multiplier symbol as one of the plurality of game symbols, wherein the substitute multiplier symbol includes a multiplier having a multiplier value correlated to the selected play option such that the multiplier value increases as the wager amount increases for the selected play option;

multiplying, by the processor, the payout by the multiplier value for winning combinations in which the substitute multiplier symbol is present; and receiving, via the at least one input device a cashout input that initiates the payout from the credit balance.

2. The method of claim 1, wherein the substitute multiplier symbol further comprises a wild symbol to be considered in the one or more winning combinations.

3. The method of claim 2, wherein the multiplier multiplies the payout by the multiplier value only for winning combinations of the one or more winning combinations that include the substitute multiplier symbol as the wild symbol.

4. The method of claim 1, wherein the substitute multiplier symbol defines the multiplier value between one and five depending on the selected play option.

5. The method of claim 1, further comprising determining, by the processor, the one or more winning combinations of the game symbols where at least two combinations of three or more matching game symbols appear on three or more adjacent reels and the at least two combinations include at least one matching game symbol that is not shared by the other combination.

6. The method of claim 1, wherein each of the one or more winning combinations includes between three and five matching symbols appearing in displayed positions on a corresponding number of adjacent reels.

7. The method of claim 1, further comprising:

including at least one scatter symbol in the game symbols; and awarding one or more free plays when three or more scatter symbols appear on any three or more adjacent reels.

8. The method of claim 1, wherein each play option of the plurality of play options has a corresponding set of possible bonus prizes associated therewith and further comprising:

triggering a bonus event responsive to a wild symbol appearing on at least one of the displayed positions; and determining a jackpot prize responsive to the bonus event when the set of possible bonus prizes associated with the selected play option includes a single bonus prize.

9. An electronic gaming machine primarily dedicated to playing at least one casino wagering game, comprising:

a gaming cabinet;

at least one input device coupled to the gaming cabinet;

a game display coupled to the gaming cabinet; and a processor disposed within the gaming cabinet, and operably coupled to the at least one input device and the game display, wherein the processor is configured to execute computing instructions to cause the electronic gaming machine to:

detect, via the at least one input device, a physical item associated with a monetary value that establishes a credit balance;

display an electronic reel simulation of the wagering game on the game display, the electronic reel simulation including a multiple reel array;

accept a user input, via the at least one input device, indicating a selected play option from a plurality of play options, wherein all play options of the plurality enable all displayed positions of the multiple reel array to be considered in winning outcomes;

initiate the casino wagering game in response to an input indicative of a wager covered by the credit balance;

determine a game outcome and cause the game outcome to be presented on the game display, the game outcome comprising a plurality of game symbols for the displayed positions of the multiple reel array;

determine if one or more winning combinations of the game symbols is presented on the game display, wherein a number of possible winning combinations is fixed across all play options;

determine a payout responsive to determining that the one or more winning combinations is presented on the game display, wherein the payout is multiplied by a multiplier value correlated to the selected play option when a substitute multiplier symbol is displayed as one of the plurality of game symbols such that the multiplier value increases as a wager amount increases corresponding to the selected play option; and receive, via the at least one input device, a cashout input that initiates a payout from the credit balance.

10. The electronic gaming machine of claim 9, wherein the processor is further configured to execute the computing instructions to cause the electronic gaming machine to determine the one or more winning combinations of the game symbols where the substitute multiplier symbol further comprises a wild symbol to be considered in determining the one or more winning combinations.

11. The electronic gaming machine of claim 10, wherein the processor is further configured to execute the computing instructions to cause the electronic gaming machine to determine the payout only for winning combinations of the one or more winning combinations that include the substitute multiplier symbol as the wild symbol.

12. The electronic gaming machine of claim 9, wherein the substitute multiplier symbol defines the multiplier value to be between one and five depending on the selected play option.

13. The electronic gaming machine of claim 9, wherein the processor is further configured to execute the computing instructions to cause the electronic gaming machine to determine the one or more winning combinations of the game symbols where at least two combinations of three or more matching game symbols appear on three or more adjacent reels and the at least two combinations include at least one matching game symbol that is not shared by the other combination.

14. The electronic gaming machine of claim 9, wherein the processor is further configured to execute the computing instructions to cause the electronic gaming machine to determine the one or more winning combinations of the game symbols where each of the one or more winning combinations includes between three and five matching symbols appearing in displayed positions on a corresponding number of adjacent reels.

15. The electronic gaming machine of claim 9, wherein the processor is further configured to execute the computing instructions to cause the electronic gaming machine to:

include at least one scatter symbol in the game symbols; and award one or more free plays when three or more scatter symbols appear on any three or more adjacent reels.

16. The electronic gaming machine of claim 9, wherein each play option of the plurality of play options has a corresponding set of possible bonus prizes associated therewith and wherein the processor is further configured to execute the computing instructions to cause the electronic gaming machine to:

trigger a bonus event responsive to a wild symbol appearing on at least one of the displayed positions; and determine a jackpot prize responsive to the bonus event when the set of possible bonus prizes associated with the selected play option includes a single bonus prize.

17. The method of claim 1, wherein the one or more winning combinations are based on a payline structure.

18. The method of claim 1, wherein the one or more winning combinations are based on an all ways structure.

19. The method of claim 1, wherein each winning combination comprises:

three or more matching game symbols appearing in the displayed positions on each of three or more adjacent reels; and at least one of the three or more matching game symbols is not used in another winning combination.

20. The electronic gaming machine of claim 9, wherein the one or more winning combinations are based on a payline structure.

21. The electronic gaming machine of claim 9, wherein the one or more winning combinations are based on an all ways structure.

22. The electronic gaming machine of claim 9, wherein each winning combination comprises:

three or more matching game symbols appearing in the displayed positions on each of three or more adjacent reels; and at least one of the three or more matching game symbols is not used in another winning combination.

23. The electronic gaming machine of claim 9, wherein the at least one input device includes:

a credit input device coupled to the gaming cabinet, and configured to detect the physical item; and a player input device coupled to the gaming cabinet, and configured to accept the user inputs.

24. The electronic gaming machine of claim 23, wherein the player input device is selected from the group consisting of one or more player input buttons, a touch screen interface, or a combination thereof.

* * * * *